(12) United States Patent
Rubin

(10) Patent No.: US 8,199,027 B1
(45) Date of Patent: Jun. 12, 2012

(54) SYSTEMS AND METHODS FOR UTILITY METER READING

(76) Inventor: Jack Rubin, Brooklyn, NY (US)

(*) Notice: Subject to any disclaimer, the term of this patent is extended or adjusted under 35 U.S.C. 154(b) by 455 days.

(21) Appl. No.: 12/620,556

(22) Filed: Nov. 17, 2009

Related U.S. Application Data

(60) Provisional application No. 61/116,240, filed on Nov. 19, 2008.

(51) Int. Cl.
*G08C 15/00* (2006.01)

(52) U.S. Cl. .......... 340/870.03; 455/256; 455/258; 455/39; 455/42; 455/63.1; 707/802; 701/428; 701/430; 702/62; 702/188; 370/320; 379/106.03; 340/870.02; 340/870.29; 340/521; 340/584; 340/632

(58) Field of Classification Search .......... 340/870.03, 340/870.02, 870.29, 521, 584, 632, 540, 340/577; 379/106.03; 370/320; 702/62, 702/188; 707/802; 701/24, 428, 430; 705/412, 705/7.13; 455/42, 256, 258, 39, 63.1
See application file for complete search history.

(56) References Cited

U.S. PATENT DOCUMENTS

| | | | | | |
|---|---|---|---|---|---|
| 4,119,948 | A | * | 10/1978 | Ward et al. | 340/870.02 |
| 4,213,119 | A | * | 7/1980 | Ward et al. | 340/870.02 |
| 4,489,384 | A | * | 12/1984 | Hurley et al. | 702/61 |
| 4,540,849 | A | * | 9/1985 | Oliver | 379/106.07 |
| 4,757,456 | A | * | 7/1988 | Benghiat | 705/412 |
| 5,719,564 | A | * | 2/1998 | Sears | 340/870.02 |
| 5,801,643 | A | * | 9/1998 | Williams et al. | 340/870.02 |
| 6,333,975 | B1 | * | 12/2001 | Brunn et al. | 379/106.03 |
| 7,288,062 | B2 | * | 10/2007 | Spiegel | 600/9 |
| 7,516,026 | B2 | * | 4/2009 | Cornwall et al. | 702/63 |
| 7,729,852 | B2 | * | 6/2010 | Hoiness et al. | 701/428 |
| 7,994,933 | B2 | * | 8/2011 | Cahill-O'Brien et al. | 340/870.02 |

* cited by examiner

*Primary Examiner* — Lam T Mai

(57) ABSTRACT

The present disclosure is directed to systems and methods for utility meter reading. The present disclosure provides inexpensive, easy to install, devices that can collect and report utility usage data from a remote location automatically, or on-demand. The disclosed systems may be used to monitor up to sixty-four meters per system, wherein each of the sixty-four meters is monitored at least once per second. Methods for using the disclosed systems also are disclosed.

16 Claims, 39 Drawing Sheets

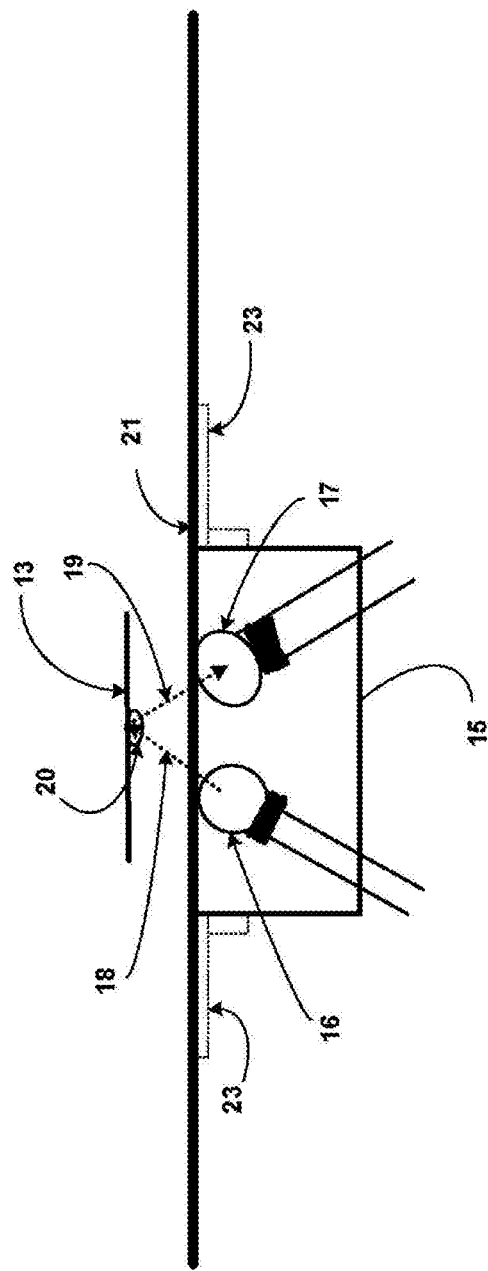

SYSTEMS AND METHODS FOR UTILITY METER READING

RELATED APPLICATION

This application claims priority to U.S. Provisional Patent Application Ser. No. 61/116,240, filed Nov. 19, 2008, the entirety of which is hereby incorporated by reference.

TECHNICAL FIELD

The present disclosure relates generally to utility meter reading and, more particularly, the present disclosure relates to systems and methods for utility meter reading.

BACKGROUND

Consumption of utilities such as water, gas, and electricity, is often measured using utility meters. Utility meters often have a sweep hand, the revolution of which represents consumption of a particular unit of utilities. Additional counters or wheels are incremented by the sweep of the sweep hand, and the total consumption as measured by the meter is typically available at almost any time to one with knowledge as to how the meter is read. To that end, utility companies often employ utility meter readers who periodically travel to the service location to read the utility meter associated with a utility service at the service location. Often, the meters are located within the service location, so a meter reader needs access, in some cases, to the premises to read the meter. For various reasons, such access is sometimes difficult, dangerous, or at best, time consuming and inefficient.

Remote meter reading systems have been developed to address some of these problems. Remote meter reading systems allow remote monitoring of utility meters, thereby obviating the need for meter readers to access service location premises. Unfortunately many remote meter reading systems require replacement of a conventional meter reader with a remotely monitored meter reader, for example, a meter with built-in wireless networking capability. A meter reader travels proximate to the remote meters, and a meter reader connects to the meter and downloads or otherwise receives data indicating the utility usage. Additionally, replacement of the old utility meter equipment is expensive and, sometimes, unpredictable as the meter design can vary with age and varied replacement designs may be required to retrofit such meters.

SUMMARY

The present disclosure relates generally to meter reading and more specifically it relates to a microprocessor controlled, electro-optical meter reading device ("electro-optical meter reader," hereinafter "EOMR") for reading multiple utility meters thus providing an inexpensive, easy to install, electro-optical, digital micro-computer controlled, device that perform, from a remote location-typically a utility billing office, the accurate collection of utility-usage data from multiple electric meters or gas meters or water meters. In some embodiments, the EOMR monitors from one to sixty-four meters.

The present disclosure is directed to systems and methods for reading utility meters. One embodiment of the present disclosure is directed to an electro-optical microprocessor controlled device, the EOMR, for reading one or more utility meters. An EOMR built and/or used in accordance with the various principles of the present disclosure can be employed to provide an inexpensive, easy-to-install, electro-optical, digital micro-computer controlled, device that performs, from a remote location-typically a utility billing office, the accurate collection of utility-usage data from multiple electric meters or gas meters or water meters. In some embodiments, an EOMR built and/or used in accordance with the systems and methods of the present disclosure can be used to read and/or report meter readings for up to sixty-four meters at a time.

In some embodiments, the EOMR includes one or more electro-optical reflective infrared sensors (EORIS's) configured to detect when a pointer of a meter dial of an electricity, gas, and/or water utility meter makes a complete rotation. EOMR's in accordance with the principles of the present disclosure accommodate two or more levels for the number of meters being monitored. In what is referred to herein as a "basic installation," an EOMR utilizes from one to eight EORIS's, one EORIS for each meter monitored. In what is referred to herein as a "large installation," the EOMR utilizes from one to sixty-four EORIS's, one for each meter being monitored.

There has thus been outlined, rather broadly, some of the features of the present disclosure in order that the detailed description thereof may be better understood, and in order that the present contribution to the art may be better appreciated. There are additional features of the disclosure that will be described hereinafter.

An object of the present disclosure is to provide an EOMR capable of reading utility-usage data from multiple, i.e., from one to sixty-four, electric meters, gas meters, and/or water meters. Automatic collection of utility-usage can be performed from a remote utility billing-office location using a simple two-way telephone interface or other communications hardware and/or media. As such, EOMR's made and/or used according to the principles of the present disclosure may reduce or even eliminate the need for each utility company to send a person to collect usage data from a particular meter.

Another object of the present disclosure is to provide an EOMR for reading multiple utility-meters, thereby allowing collection of utility-usage data to be initiated by the utility billing-office. As such, the utility-usage data may be collected at frequencies that can be supported by the utility companies, and that are acceptable to a responsible governmental agency. Use of EOMR's in accordance with the principles of the present disclosure can help significantly increase the positive cash-flow for the utility companies using this disclosure.

Another object of the present disclosure is to provide an EOMR capable of accommodating two installation levels of meter monitoring coverage. A "basic installation" level can provide simultaneous monitoring of one to eight meters, while the "large installation" level can provide for expanded simultaneous monitoring of one to sixty-four meters.

Another object of the present disclosure is to provide an EOMR that features an installation at each monitored meter. The installation according to the present disclosure is extremely straight forward and, unlike other previously offered meter readers, does not require the modification of the existing meter in any way. Furthermore, after an EORIS or equivalent is attached to a meter glass/plastic dial-cover across from or facing the dial, or attached to a face-plate over the dial, should it ever be necessary, it is still possible to easily read the utility-usage shown on the meter in a conventional manner.

Other objects and advantages of the present disclosure will become obvious to one of ordinary skill in the art upon reading the present disclosure. As such, it should be understood that these objects and advantages are within the scope of the present disclosure. To the accomplishment of the above and related objects, this disclosure may be embodied in the form illustrated in the accompanying drawings, attention being called to the fact, however, that the drawings are illustrative only, and that changes may be made in the specific construction illustrated and described within the scope of this application.

Various other objects, features and attendant advantages of the present disclosure will become fully appreciated as the same becomes better understood when considered in conjunction with the accompanying drawings, in which like reference characters designate the same or similar parts throughout the several views, and wherein:

BRIEF DESCRIPTION OF THE DRAWINGS

FIGS. 4a and 4b illustrate exemplary installation details for an EORIS, according to exemplary embodiments of the present disclosure.

DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
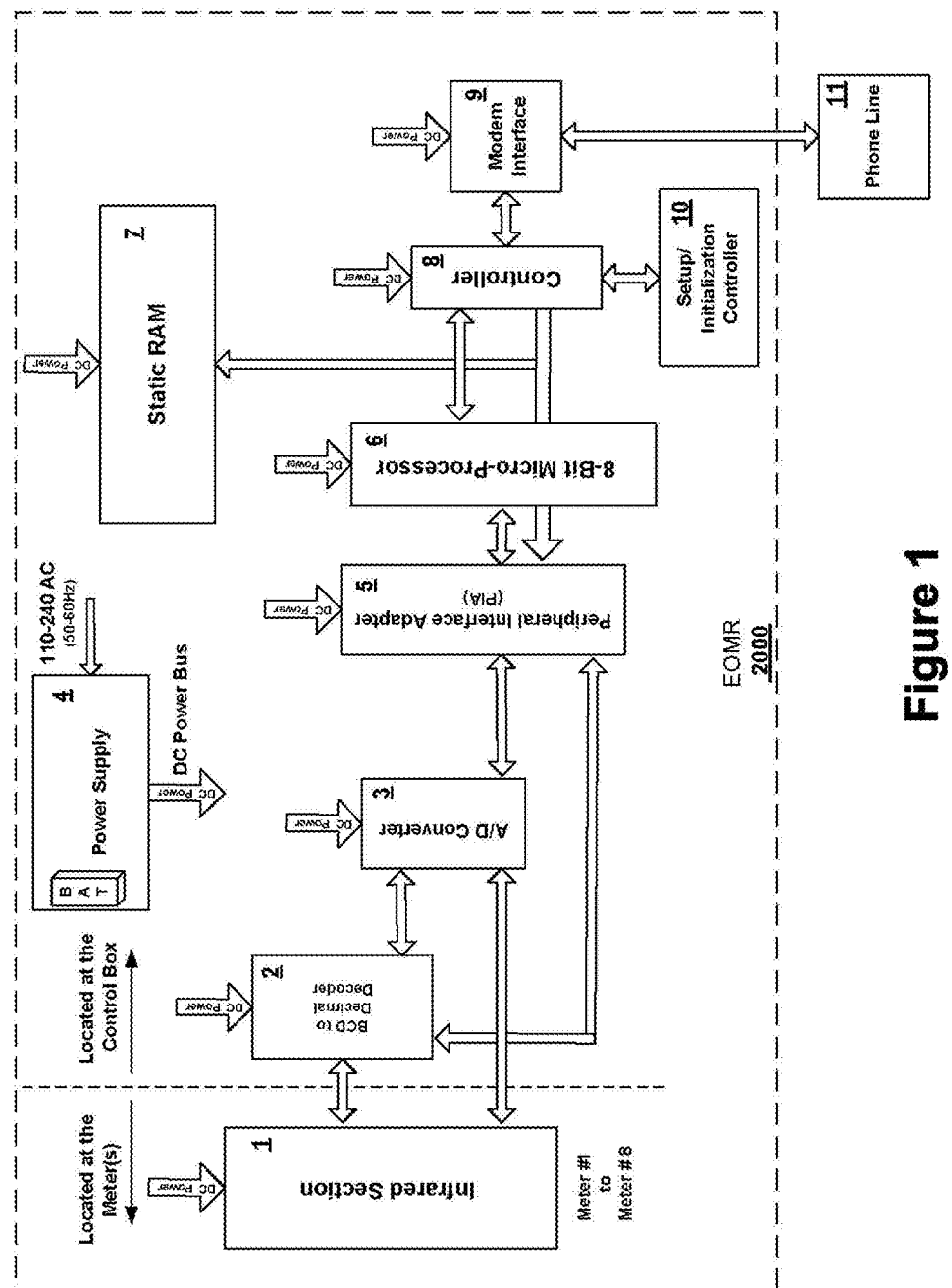
FIG. 1 illustrates a "basic installation" of an EOMR, according to an exemplary embodiment of the present disclosure.

FIG. 1 illustrates block diagram of all an EOMR 2000 as used in the "basic" eight meter installation. The EOMR 2000 includes an infrared section 1 that contains one or more EORIS devices 15 (EORIS). It is important to note for this for this "basic installation," the infrared section 1 can contain up to eight EORIS's 15, or equivalent devices, and that the EORIS's are the only components used multiple times in the 'basic' EOMR 2000.

As such, for n meters being monitored, the EOMR 2000 may include up to n EORIS's 15, though no additional blocks as depicted in FIG. 1 would be needed. Continuing with the block diagram shown in FIG. 1, the EOMR 2000 includes a BCD to decimal decoder 2, an analog-digital (N/D) Converter 3, a peripheral interface adapter 5, an 8-bit microprocessor 6, a static RAM 7, a controller 8, a modem interface 9, and a setup/initialization controller 10. In some embodiments, all circuitry of the EOMR 2000 is powered by a battery-supported unit, that is, in some embodiments, constantly trickle-charged such as, for example, the power supply 4.

Figure 2:
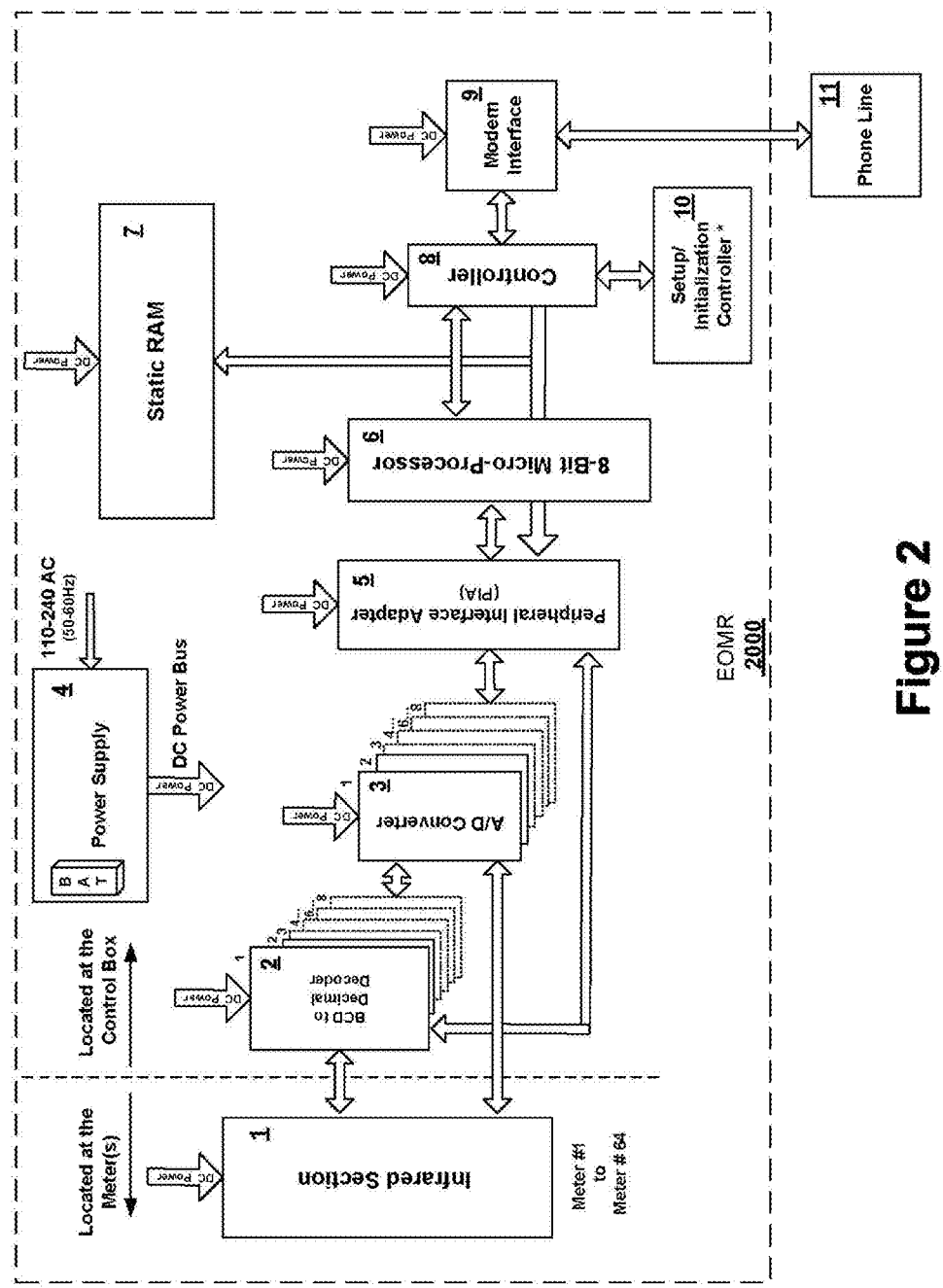
FIG. 2 illustrates a "large installation" of an EOMR, according to an exemplary embodiment of the present disclosure.

FIG. 2 is a block diagram illustrating a "large installation" of an EOMR 2000, according to an exemplary embodiment of the present disclosure. In some embodiments, the "large installation" is used when the number of meters being monitored is from nine through sixty-four meters, though substantially the same setup may be used for monitoring one to eight meters as well. The EOMR 2000 includes one or more expanded infrared sections 1 that contain up to sixty-four EORIS's 15, or equivalent devices. Thus, for n meters being monitored, n EORIS's 15 may be included in the infrared section 1 and some additional blocks shown in FIG. 2 would also be needed.

The EOMR 2000 additionally may include up to eight BCD to decimal decoders 2, one for each group of eight EORIS's 15, and up to eight additional N/D converters 3, one for each group of eight BCD to decimal decoders 2. For the remainder of the elements illustrated in FIG. 2, the basic processing and units remain consistent with the embodiment illustrated FIG. 1, and are virtually unchanged for a "large installation," relative to a "basic installation." This is best understood with the realization that for the processing intensive portion units of the block diagrams shown in FIG. 1 and in FIG. 2, there is no hardware needed when transitioning from a "basic" eight meter installation to the expanded "large" sixty-four meter installation.

This may be assured because as peripheral interface adapter 5, the 8-bit microprocessor 6, the static RAM 7, and the controller 8 are high-speed devices that easily can accommodate additional processing-time load required in going from eight to sixty-four meters. Furthermore, for the modem interface 9, the only impact related to the increased number of meters being queried is in that it may take somewhat longer to transfer the updated utility-usage meter information to the utility-billing office. However, since this update to the utility billing office is done off-line, any additional transfer time is of no consequence as an EOMR 2000 according to the present disclosure will continuously monitor utility-usage during these off-line transfers.

Figure 3:
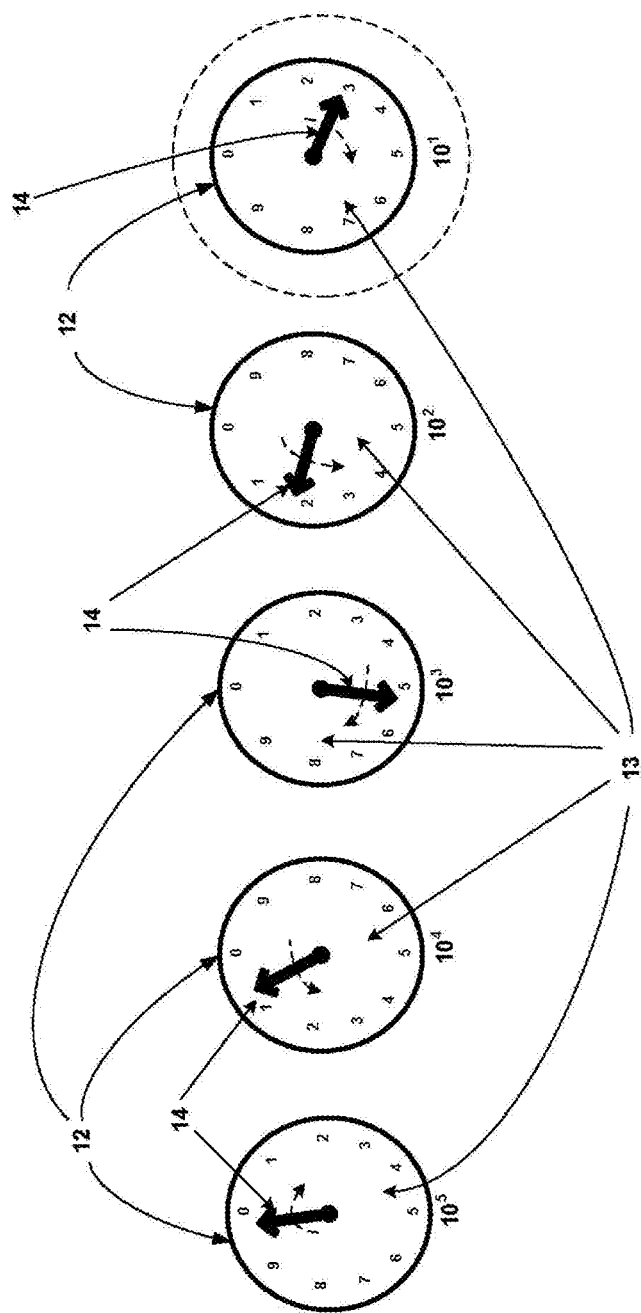
FIG. 3 is a front-view of a typical utility meter.

FIG. 3 is a front-view of a typical utility meter, e.g., an electricity, gas, and/or water meter. FIG. 3 shows a series of rotating dials 12, from right to left, each representing an increase in the power of 10. As an illustrative example, FIG. 3 shows a front-view of five dials 12. The dials 12 shown, from right to left, are; the 10's dial 12, the 100's dial 12, the 1,000's dial 12, the dial 12 and the 100,000's dial 12. It is hereby emphasized that the present disclosure works with less than and/or more than the illustrated five dials 12, e.g., four, three, two, and/or even one dial(s) 12 is/are acceptable, and that the selection of five such dials 12 is made merely for descriptive purposes, i.e., to describe the general case. FIG. 3 also shows the pointers 14 for each of the dials 12, as well as a fixed face-plate 13 that is typically white or silver in color that is found on all the dials 12 below the rotating pointers 14.

Typically, these dials 12 also show ten graduations (from 0 to 9), but the presence or absence of such markings is of no consequence as EOMR's built or used according to the principles of the present disclosure work with either configuration.

As is generally known to one of ordinary skill in the art, for dial-type meters, these dials 12 are geared together so that when the pointer 14 on the last dial 12 complete one complete rotation, the pointer 14 on the adjacent dial 12 moves one graduation. Similarly, one complete rotation of the pointer 14 on this adjacent dial 12 will result in the next pointer 14 on the adjacent dial 12 moving one graduation. This sequence of geared interlocking between a pointer 14 of a dial 12 to a pointer 14 of an adjacent dial 12 continues as utility-usage is recorded and accumulated. The major, unique, and greatly simplifying feature of EOMR's built or used in accordance with the principles of the present disclosure is that the EOMR of the present disclosure relies solely upon monitoring the rotation of a single pointer 14, in particular, the pointer 14 associated with the last dial 12. Since utility-usage is measured by, and accumulated on, the gear-linked rotations of the pointers 14 on the banks of these dials 12, by the EOMR 2000 monitoring and accumulating the number of full rotation of the pointer 14 of the last dial 12, and adding the number of complete rotations of the pointer 14, to the initial value of this meter # as read and inserted into the EOMR 2000 during initial installation, it is directly possible in a straight forward manner to determine the total utility usage that has been recorded by a meter.

Also, the actual orientation of these dials 12, i.e., in-line or up-down, is of no consequence. All of these various configurations or combinations of these configurations are fully compatible and fully acceptable with systems and methods made and/or used according to the present disclosure. The only requirement of the EOMR is that the meter is of the "dial" type and that access to the meter glass/plastic dial-cover plate 21 is available. In reviewing the data available on the number of such rotary-dial utility that have been installed in both home homes, apartment houses and commercial and industrial facilities, a conservative estimate is there are many, many millions of such meters installed that fully meet the above-described criteria, i.e., being "dial" type, and having access to the meter glass/plastic dial-cover plate 21. As such, the EOMR's disclosed herein would be excellent candidates for upgrading many millions of installed utility meters.

Figure 4B:
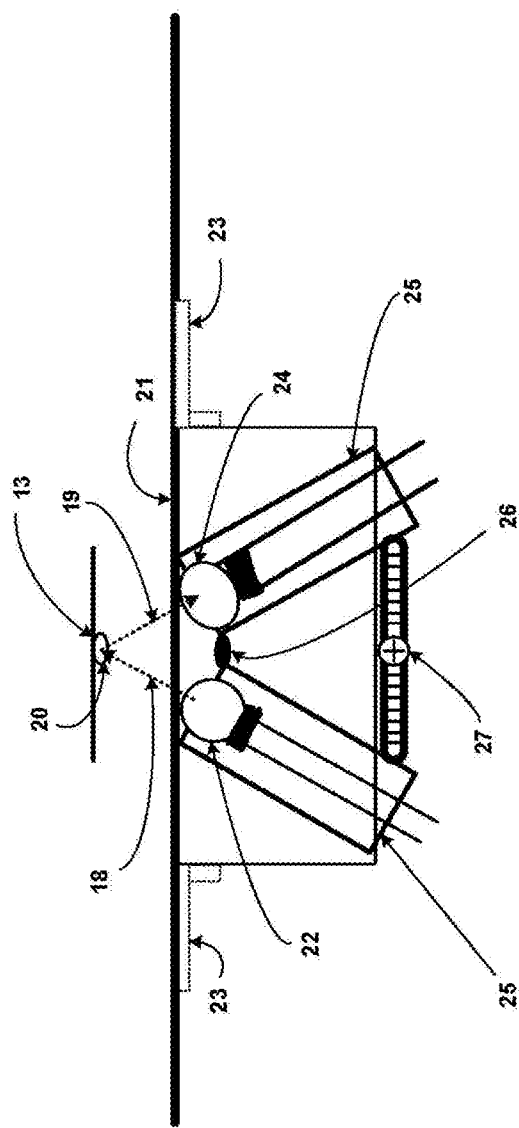

FIGS. 4a and 4b show, respectively, two possible installation details for an infrared emitter/infrared detector device. FIG. 4a depicts an EORIS 15 where both the infrared illuminating diode 16 and the infrared phototransistor 17 are part of a single module. This module is mounted on the outside of the meter glass/plastic dial-cover 21, across from the last dial 12, using strong two-sided tape 23. From this location on the meter glass/plastic dial-cover 21, an infrared emitting diode 16 (IED) emits pulsating stream of short, narrow infrared pulses called the illuminating IR beam 18 which are aimed at a small area on the face-plate 13 called the illuminated area 20. FIG. 4a further shows that from the illuminated area 20 on the face-plate 13, a reflected IR beam 19 is generated and that this reflected IR beam 19 is detected by the infrared phototransistor 17.

FIG. 4b depicts a case wherein the infrared diode 22 and the infrared detector 24 are separate devices. In this installation, a single outer plastic [or equivalent] case is provided to house these individual devices and this case is mounted/attached to the meter glass/plastic dial-cover 21 using strong two-sided tape 23. Within this exterior case, both the infrared diode 22, and the infrared detector 24 devices are housed in two separate small plastic, or equivalent, cases 25 connected on one end with a very short plastic, or equivalent, strap 27 and on the other end with a screw-type device that allows the adjusting of the angle of separation of these two devices. From this location on the meter glass/plastic dial-cover 21, the infrared diode 16 emits a pulsating stream of short narrow infrared pulses called the illuminating IR beam 18, which are aimed at a small area on the face-plate 13 called the illuminated area 20. FIG. 4*b* further shows that from the illuminated area 20 on the face-plate 13, a reflected IR beam 19 is generated and that this reflected IR beam 19 is detected by the infrared phototransistor 17.

It is noted that while the subsequent sketches and explanatory material that follow assume use of the illustrative examples illustrated in FIG. 4*a*, an identical explanation for the case shown in FIG. 4*b* is fully applicable. It is hereby emphasized, that the selection of the configuration shown in FIG. 4*a* was made solely for purposes of simplifying the description, and not for limiting the scope of this disclosure in any way. Furthermore, it is also hereby emphasized that any and all of the features, benefits and advantages of the present disclosure shown and discussed with regard to FIG. 4*a*, are equally and fully available in the alternate configuration illustrated in FIG. 4*b*, which shows the case of a separate devices for the infrared illuminating source, the infrared diode 22 and a separate device for the infrared illumination detector, the infrared detector 24.

Figure 5:
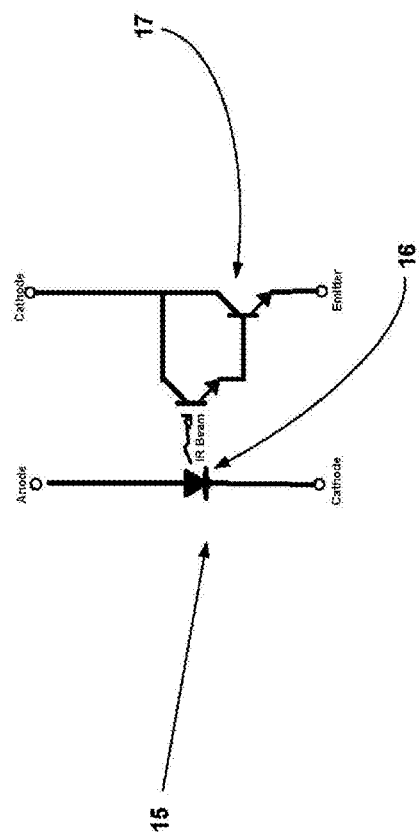
FIG. 5 illustrates interior electronic components, in a basic simplified manner, of an EORIS, according to an exemplary embodiment of the present disclosure.

FIG. 5 shows the interior electronic components, in a basic simplified manner, of the EORIS 15. The source of the infrared beam is provided by the infrared emitting diode (IED) 16 and the infrared beam detection is provided by the infrared phototransistor 17. In this sketch the phototransistor shown is of Darlington-configuration type. This Darlington configuration is the standard method used achieving additional current drive. There is a large number of such very inexpensive devices commercially available, for example, the HOA1180-003, and the present disclosure can use any of them or an equivalent to achieve the intended operation described herein. It is also noted that a standard non-Darlington configuration is fully acceptable, and that an EOMR employing a standard non-Darlington configuration, for example the HOA1180-002, will operate in the intended normal fashion.

Figure 6A:
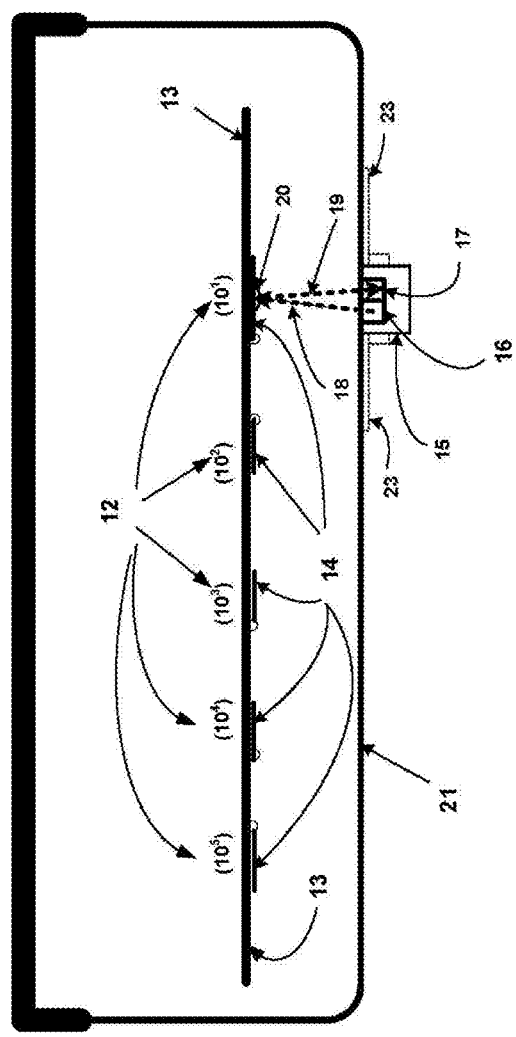
FIGS. 6a and 6b schematically illustrates top views of possible EOMR installation schemes according to exemplary embodiments of the present disclosure.
Figure 6B:
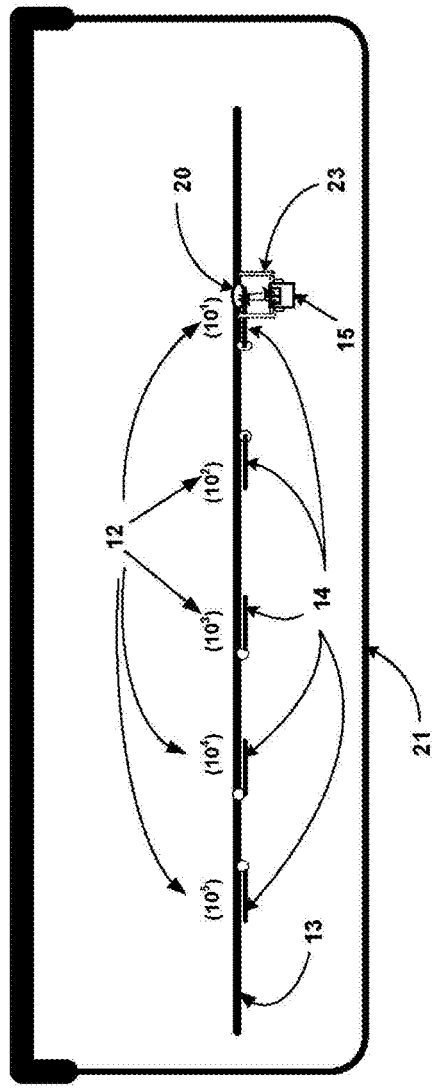

FIGS. 6*a* and 6*b* schematically illustrate, respectively, top-views of two possible installation approaches for the EOMR 2000. FIG. 6*a* shows the installation approach wherein the EORIS 15 is mounted or attached outside or on the meter glass/plastic dial-cover 21. FIG. 6*a* shows a front view of a typical utility meter, e.g., an electricity meter, a gas meter, and/or a water meter. As explained earlier, it is hereby also emphasized that the proposed disclosure will work with more than or less than five dials 12 and that the selection of five dials 12 is made solely for purposes of simplifying this description.

FIG. 6*a*. also shows the pointers 14 for each dial 12 as well as the fixed face-plate 13 that is typically white or silver in color and is found on all the dials 12 below the rotating pointers 14. The EORIS 15, or equivalent, is shown mounted on the meter glass/plastic dial-cover 21, across from the last dial 12, and secured with two-sided tape 23. Within this EORIS 15, are the IED 16 and the infrared phototransistor 17. The IED 16 emits a pulsating stream of short, narrow infrared pulses called the illuminating IR beam 18, which are aimed at a small area called the illuminated area 20 on the face-plate 13. From the illuminated area 20 bouncing back from the face-plate 13, a reflected IR beam 19 is generated, and this reflected IR beam 19 is detected by the infrared phototransistor 17, which in turn produces an analog voltage. It should be understood that there is a direct relationship between the intensity of the reflected IR beam 19 and the amplitude of the analog voltage that is produced by the infrared phototransistor 17.

FIG. 6*b* shows an installation approach wherein the EORIS 15 is mounted or attached, for example with two-sided tape 23, inside the enclosure of the meter glass/plastic dial-cover 21. This approach means that the EORIS 15 is mounted on face-plate 13 over the last dial 12. Since for all other aspects of the present disclosures shown in FIG. 6*b* are substantially identical to those shown and described in FIG. 6*a*, they will not be repeated herein.

Figure 7:
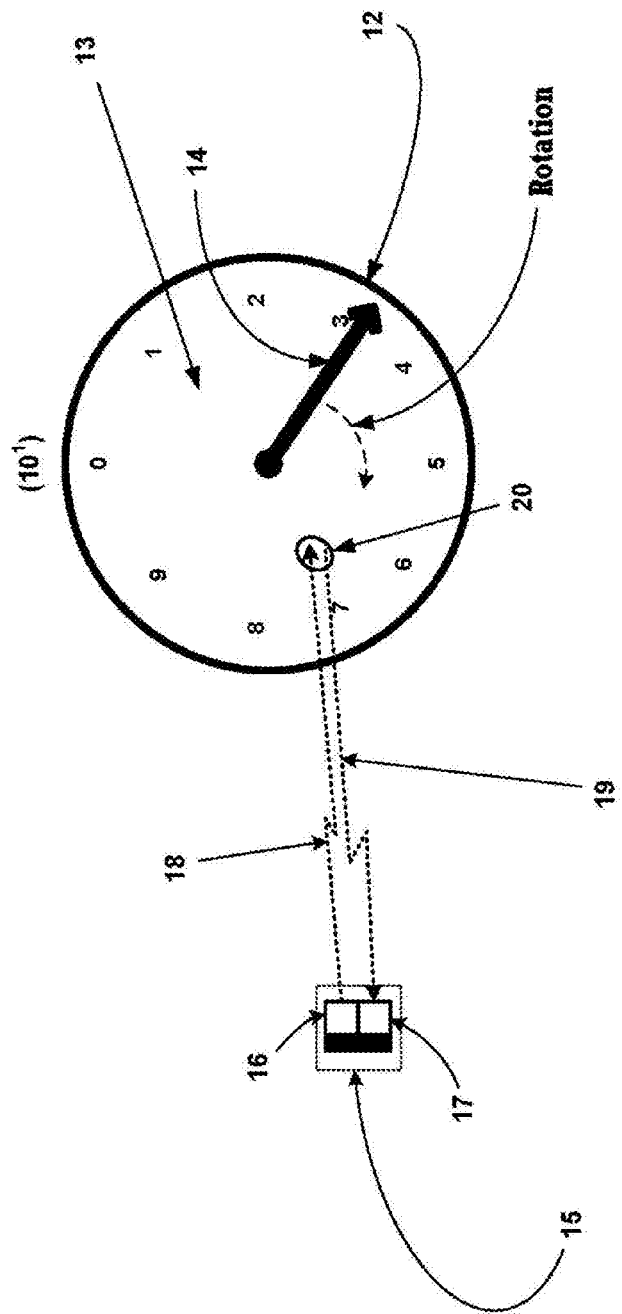
FIGS. 7-10 are enlarged front views of an EOMR, showing the infrared illumination and reflection as the pointer rotates around the dial, according to an exemplary embodiment of the present disclosure.

FIG. 7 is an enlarged front view of the EOMR 2000 to help in understanding how an EOMR 2000 according to the present disclosure determines that a pointer 14 has made the equivalent of one rotation. In FIG. 7, the last [$10^1$] dial 12, the face-plate 13, the pointer 14, the EORIS 15, the IED 16, the infrared phototransistor 17, the illuminating IR beam 18, the reflected IR beam 19, and the illuminated area 20 are shown.

The EOMR 2000 can accurately detect two distinct "electro-optical" states that are created as the pointer 14 rotates around the dial 12. These two states are distinguishable from one another, and thus are measurable.

The first state detected by the EOMR 2000 is where the pointer 14 is not blocking the illuminating IR beam 18 from striking the illuminated area 20 and thus it strikes the reflective white/silver surface of the face-plate 13 which has good IR reflectivity and therefore the resultant intensity of the reflected IR beam 19 will be relatively high. This high level of the reflected IR beam 19 striking the detector area of the infrared phototransistor 17 will, in turn, result in the amplitude of its output analog voltage being relatively high. The second state detected by the EOMR 2000 is the one where the pointer 14 is blocking the illuminating IR beam 18 from striking the illuminated area 20 and instead, the illuminating IR beam 18 strikes the black pointer 14, which has poor IR reflectivity relative to the illuminated area 20. Because of the pointer's 14 poor reflectivity of the illuminating IR beam 18, the resultant reflected IR beam 19 striking the detector area of the infrared phototransistor 17 will, in turn, result in the amplitude of its output analog voltage being relatively low. Clearly, as additional utility-usage occurs and the pointer 14 continues to rotate the present disclosure will again detect the first state described above.

This is then the basic mechanism of by which an EOMR 2000 made or employed in accordance with the present disclosure functions. As the utility-usage is accumulated by the meters being monitored, the respective pointers 14 continue to rotate around the dials 12 and furthermore going through the two states described above. The number of these rotations accumulate and may be tracked, which in turn is directly related to the accumulated utility-usage since installation. This accumulated utility-usage can then be added to the original utility-usage value stored in the EOMR during initial installation to develop, current, utility-usage.

Figure 8:
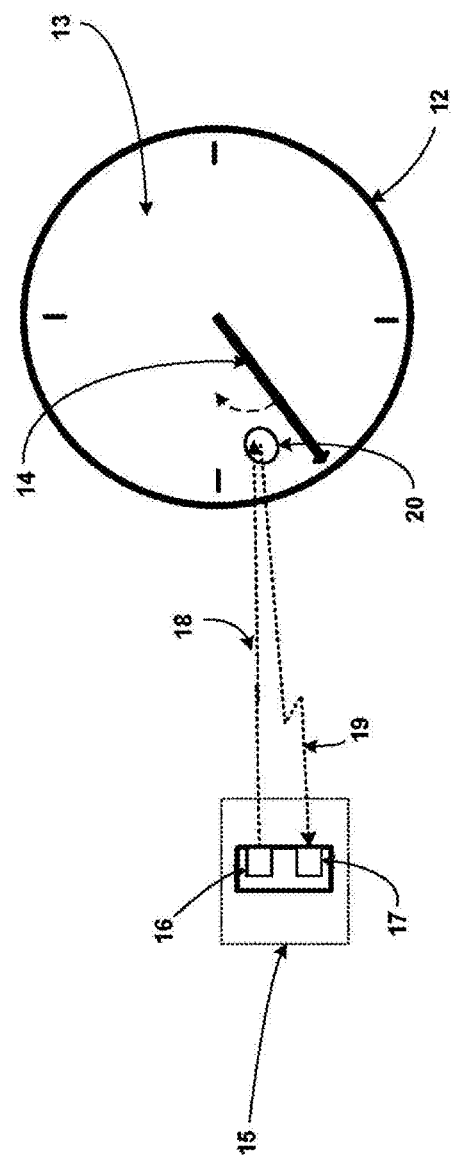

FIG. 8 illustrates a case wherein the pointer 14 is in a position before the illuminated area 20. In this position the illuminated area 20 strikes the reflective white/silver surface of the face-plate 13. The reflective white/silver surface of the face-plate 13 has a high reflectivity, relative to black pointer 14. As such, illumination of the reflective white/silver surface of the face-plate 13 results in the generating of a strong reflected IR beam 19 that strikes the infrared detector area of the infrared phototransistor 17, which in turn results in a relatively high amplitude analog voltage being generated at the output of the infrared phototransistor 17. In the illustrated embodiment, the pointer 14 rotates in a clockwise direction.

Figure 9:
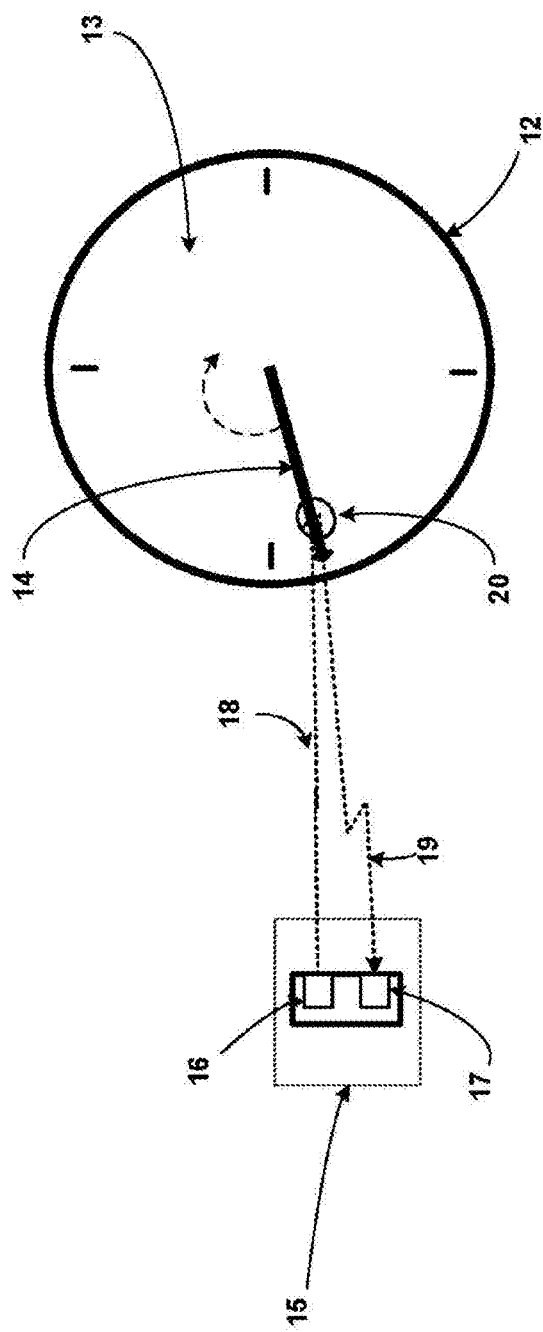

FIG. 9 depicts a case wherein the pointer 14 continues to rotate as a result of additional utility-usage and is now in a position over, i.e., covering, the illuminated area 20. In this position, there is blockage to the illuminating IR beam 18, thereby preventing the illuminating IR beam 18 from striking the illuminated area 20 on the reflective white/silver surface of the face-plate 13. As such, the illuminating IR beam 18 strikes the black pointer 14 which has relatively poor infrared reflection characteristics, as explained above, and therefore absorbs most of illuminating IR beam 18 infrared energy resulting in a relatively weak reflected IR beam 19 that strikes the infrared detector area of the infrared phototransistor 17, which in turn results in a relatively weak amplitude analog voltage being generated at the output of the infrared phototransistor 17. It is noted that in this embodiment, the pointer 14 rotates in a clockwise direction.

Figure 10:
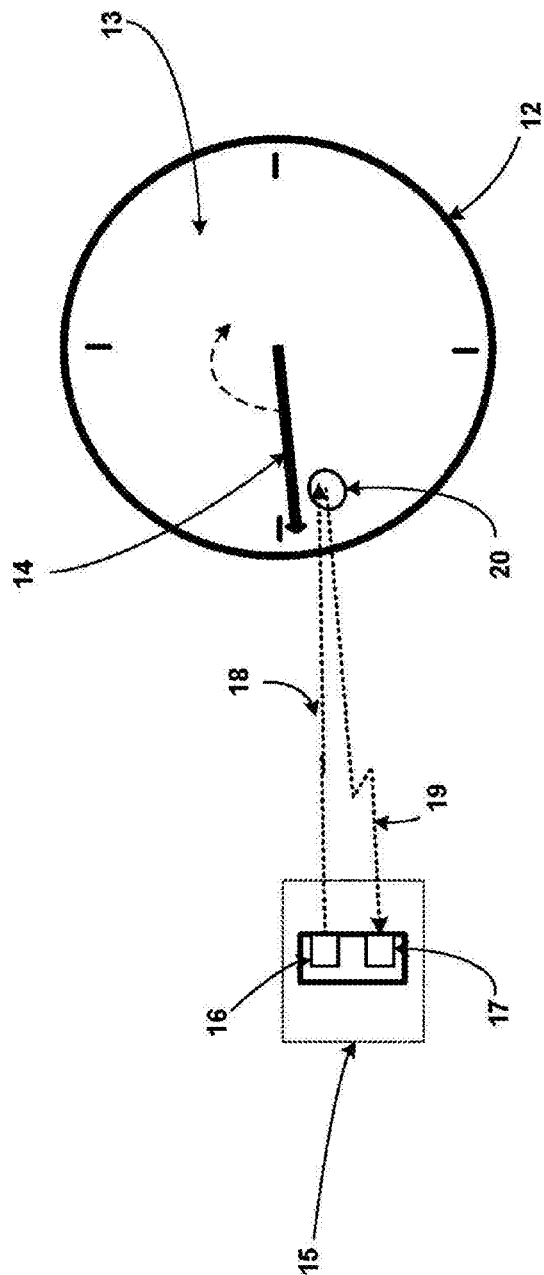

FIG. 10 depicts a case wherein the pointer 14 continue to rotate as a result of further utility-usage and is now again in a position after the illuminated area 20. In this illustrated position, the illuminated area 20 again strikes the reflective white/silver surface of the face-plate 13 generating a relatively strong reflected IR beam 19. The reflected IR beam 19 strikes the infrared detector area of the infrared phototransistor 17, which in turn results in a relatively high amplitude analog voltage being generated at the output of the infrared phototransistor 17. It is noted that in this embodiment, the pointer 14 rotates in a clockwise direction.

Figure 11A:
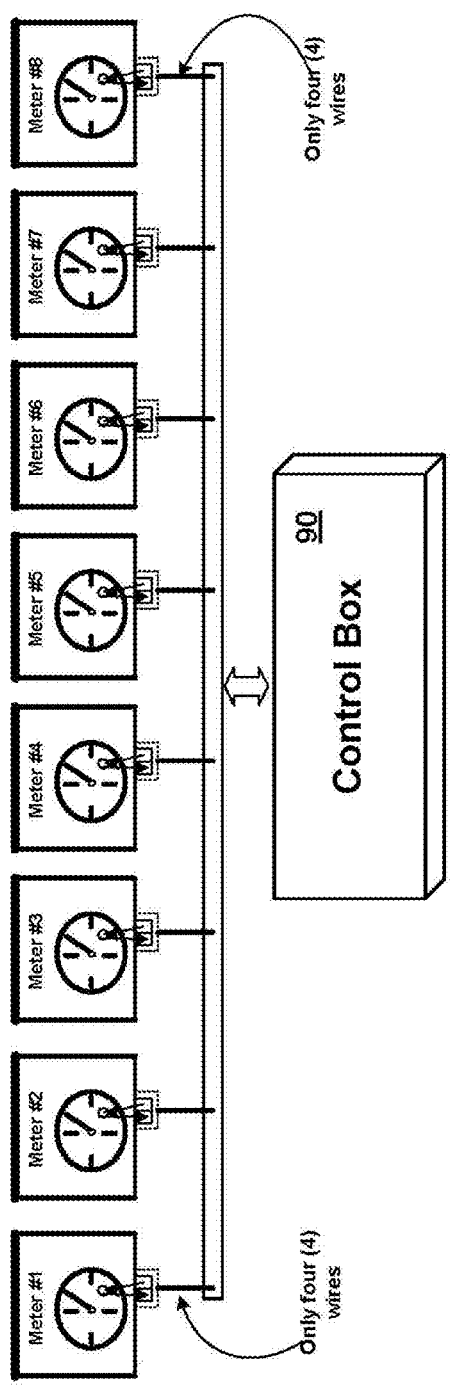
FIGS. 11a and 11b schematically illustrate two exemplary installation of the 'basic' and 'large' installations according to exemplary embodiments of the present disclosure.
Figure 11B:
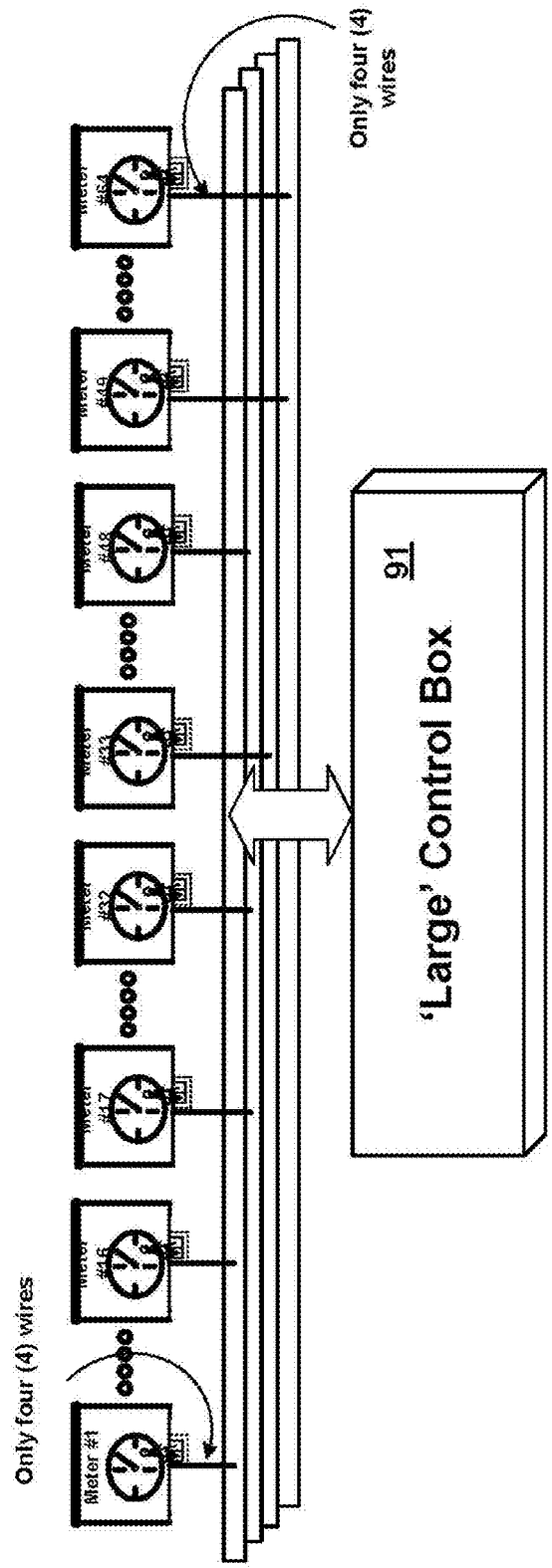

FIGS. 11a and 11b are block diagrams illustrating two installation levels for EOMR's according to the present disclosure. FIG. 11a shows the "basic installation" level, as described above with reference to FIG. 1, which can accommodate utility-usage monitoring for up to eight meters. As shown, only the "infrared sensor" portion is attached at each electricity meter, gas meter, and/or water meter, and only four wires go from the sensor portion at each meter to the control box 90. The infrared sensor portion as been described above with reference to FIGS. 4-6.

Similarly, FIG. 11b shows the "large installation" level, as described above with reference to FIG. 2, which can accommodate utility-usage monitoring for up to sixty-four meters. Again, as shown above, only the "infrared sensor" portion is attached at each electricity meter, gas meter, and/or water meter, and only four wires go from the sensor portion at each meter to the large control box 91. The infrared sensor portion as been described above with reference to FIGS. 4-6.

Figure 12:
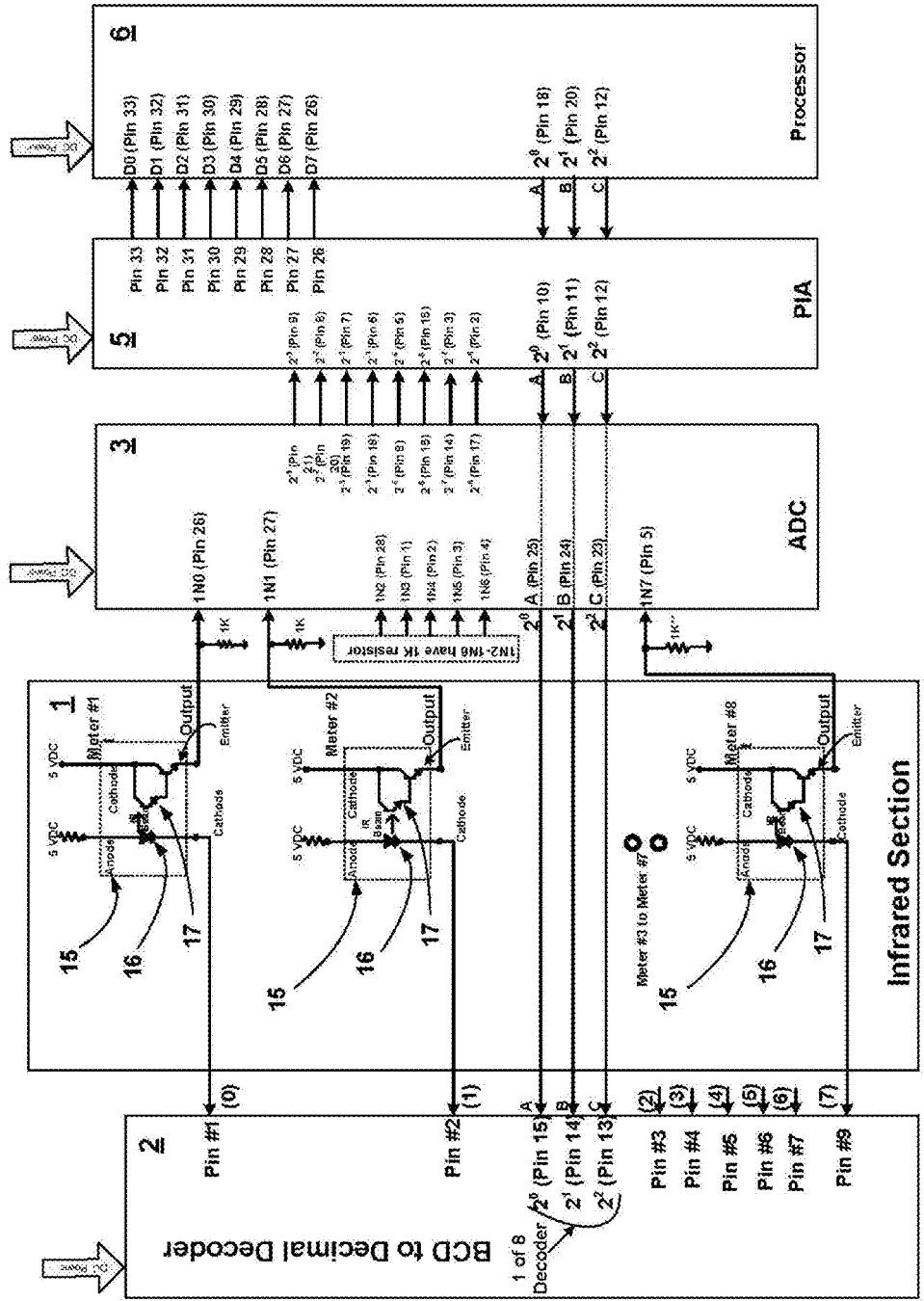
FIG. 12 schematically illustrates an EOMR, according to an exemplary embodiment of the present disclosure.

FIG. 12 illustrates an overview schematic of an EOMR 2000, according to an exemplary embodiment of the present disclosure. FIG. 12 illustrates a descriptive electronic schematic of most major data and control interfaces of an EOMR 2000 according to the present disclosure. FIG. 12 illustrates the "basic installation," and as described earlier, which can monitor up to eight utility meters concurrently. The sequence of all activity in illustrated in FIG. 12 is under the control of the 8-bit microprocessor 6. The two-way control between the BCD to decimal decoder 2, the A/D converter 3, and the 8-bit microprocessor 6, is managed by the peripheral interface adapter 5.

Included in FIG. 12 is the BCD to decimal decoder 2, which is sequentially connected to one of eight EORIS's 15. This sequence is under the control of the 8-bit microprocessor 6, which, via the PIA 5, provides a specific address code, e.g., $A=2^0$, $B=2^1$, $C=2^2$, which directly translates into a 1 of 8, directing the BCD to decimal decoder 2 as to which of the eight IED's 16 is to be taken to "ground." In the time domain, this very short or narrow "ground" is applied to the cathode of the selected IED's 16, part of the EORIS 15, causing it to emit a short burst of infrared energy called the illuminating IR beams 18. These short narrow illuminating IR beams 18 are focused to strike on or bounce-off the illuminated area 20 of the face-plate 13 of the meter being monitored. As shown in FIG. 9, occasionally these illuminating IR beams 18 strike the pointer 14, for example if the pointer 14 is over or blocking the illuminated area 20. After bouncing off of or reflecting from the illuminating area 20, or bouncing off of or reflecting from the pointer 14, the reflected IR beams 19 are sensed by the infrared detector area of the infrared phototransistor 17 and converted to analog voltages. These analog voltages, directly proportional to the intensity of the reflected IR beam 19, are fed into the A/D converter 3 for digitization and subsequently loading to the 8-bit microprocessor 6 for signal processing, further analysis, and storage. As explained with reference to FIGS. 8-10 above, changes in the amplitude voltage from a relatively high voltage to a relatively low voltage, and vice versa, are directly related to the rotation of the pointer 14 and to a position of the pointer 14 relative to the illuminated area 20. As such, these measured voltage changes represent a very direct indication of how many rotations the pointer 14 has made.

It is hereby noted, that although there are specific 'part-numbers' shown in FIG. 12, they are to be viewed as representative examples that have been selected in order to provide a clear example of how the present disclosure works. In all cases, there are many equivalent parts that are completely acceptable and can be freely substituted. The present disclosure in not dependent on any of these parts specifically and EOMR's 100 made and/or used in accordance with present disclosure will work equally well if one substitutes equivalent parts.

Figure 13:
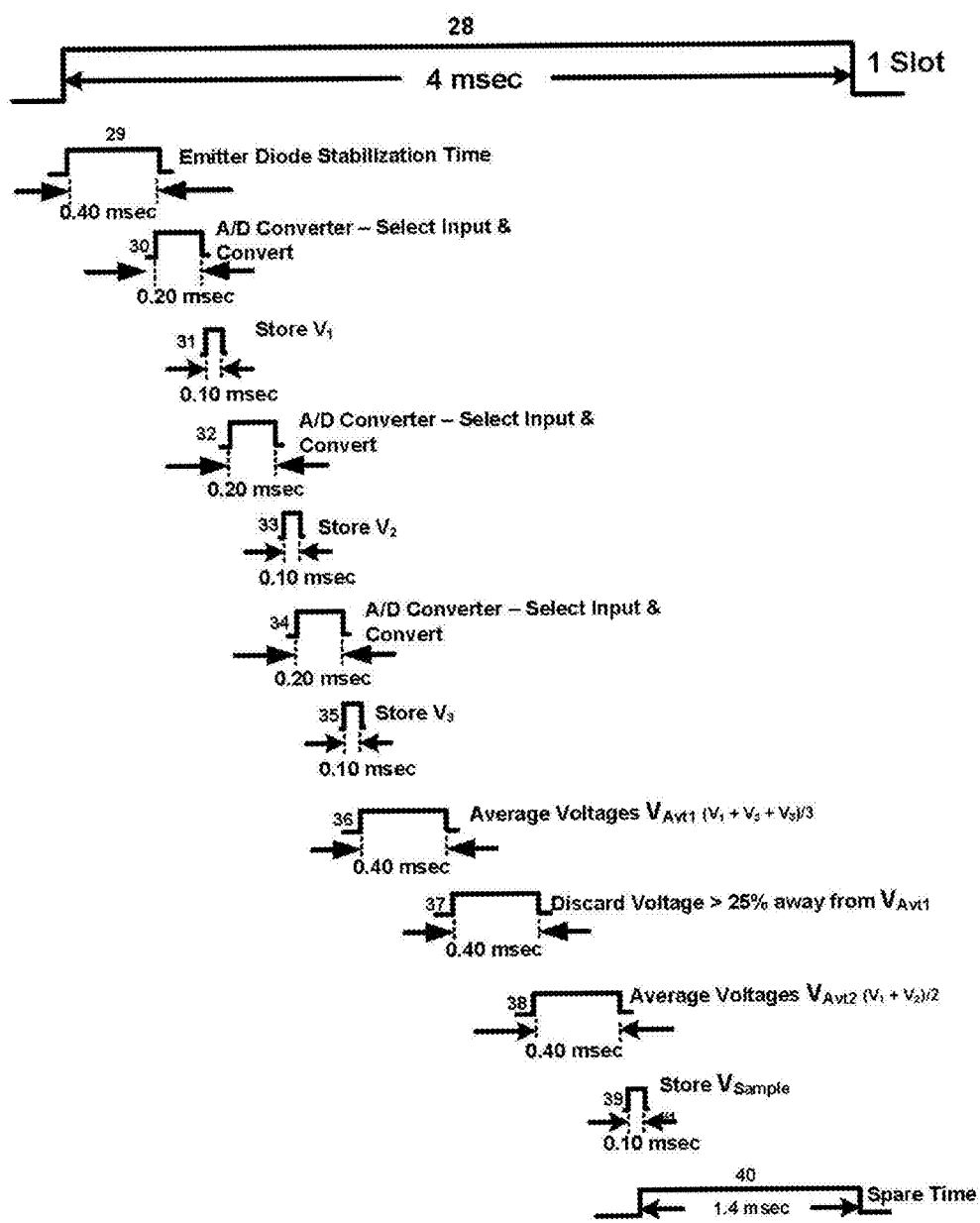
FIG. 13 is a timing diagram for a slot-timing detail, within a single slot, according to an exemplary embodiment of the present disclosure.

FIG. 13 is a timing diagram for the slot-timing detail of the present disclosure. It forms the first in a series of such timing diagrams for the steps involved in the EOMR 2000 processing of the electro-optical signals that are used to monitor the rotation of the pointer 14. All steps needed from stabilizing the IED 16 and converting the analog voltage outputted from the infrared phototransistor 17 to its digital equivalent via the A/D Converter 3 and storing this result in the 8-bit microprocessor 6. This is repeated for a total of three times. A reasonable check is then made and the voltage with a highest variance is discarded. The average of the remaining two voltages is computed and the result is stored in the 8-bit microprocessor 6 is provided. This is depicted in the slot-timing-detail timing chart shown in FIG. 13. The processing time leaves 1.4 milliseconds (ms), or 35%, of spare time 40.

Figure 14:
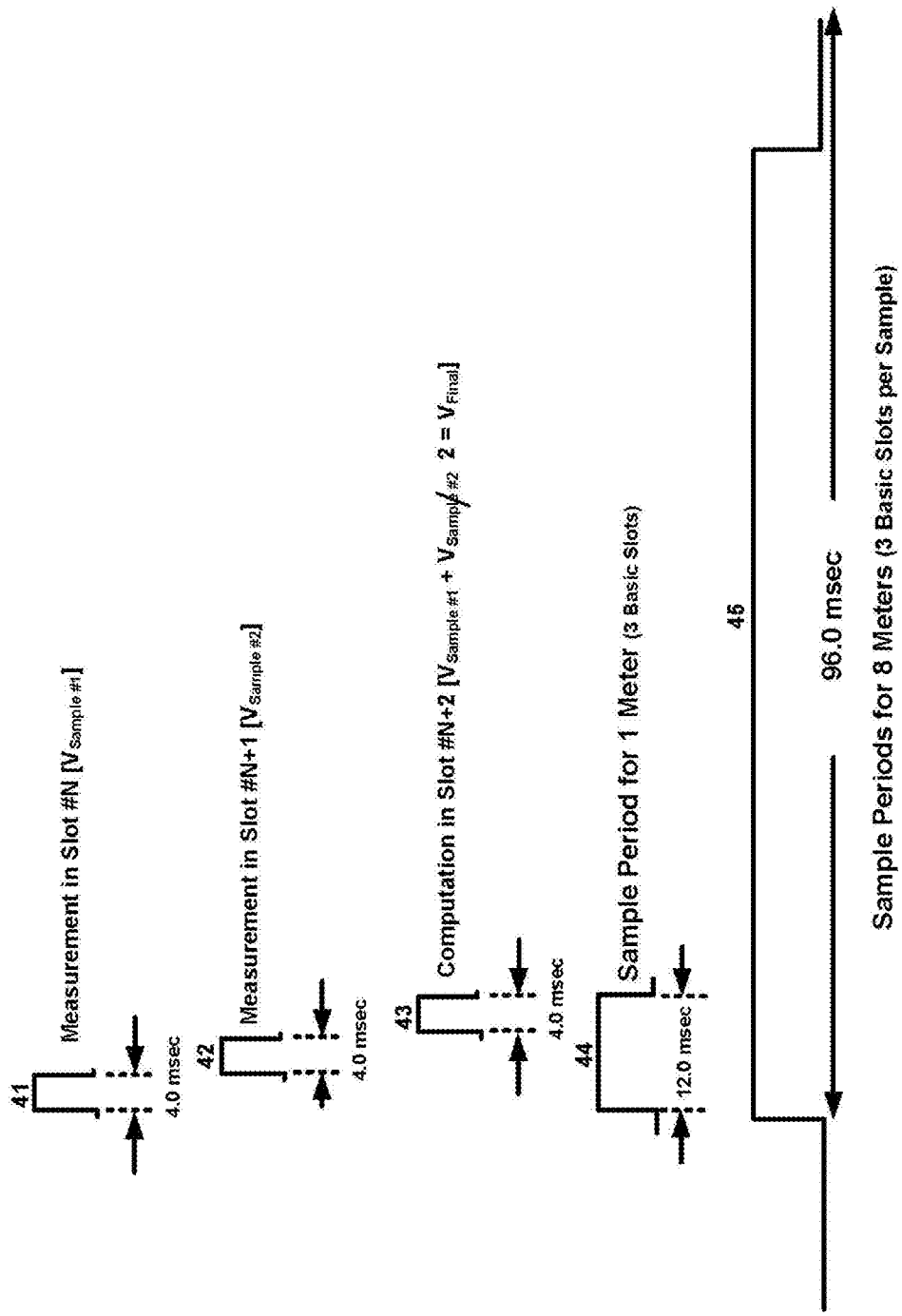
FIG. 14 schematically illustrates sample-timing details for the three-slot average utilized for eight slots, according to an exemplary embodiment of the present disclosure.

FIG. 14 shows the sample-timing details for the voltage 'samples' developed in the previous slot 28. These two voltage samples are referred to herein as $V_{Sample\ \#1}$ and $V_{Sample\ \#2}$. The voltage samples $V_{Sample\ \#1}$, $V_{Sample\ \#2}$ are averaged to obtain $V_{Final}$. This entire process takes three slots 28, which takes 12 ms.

Figure 15:
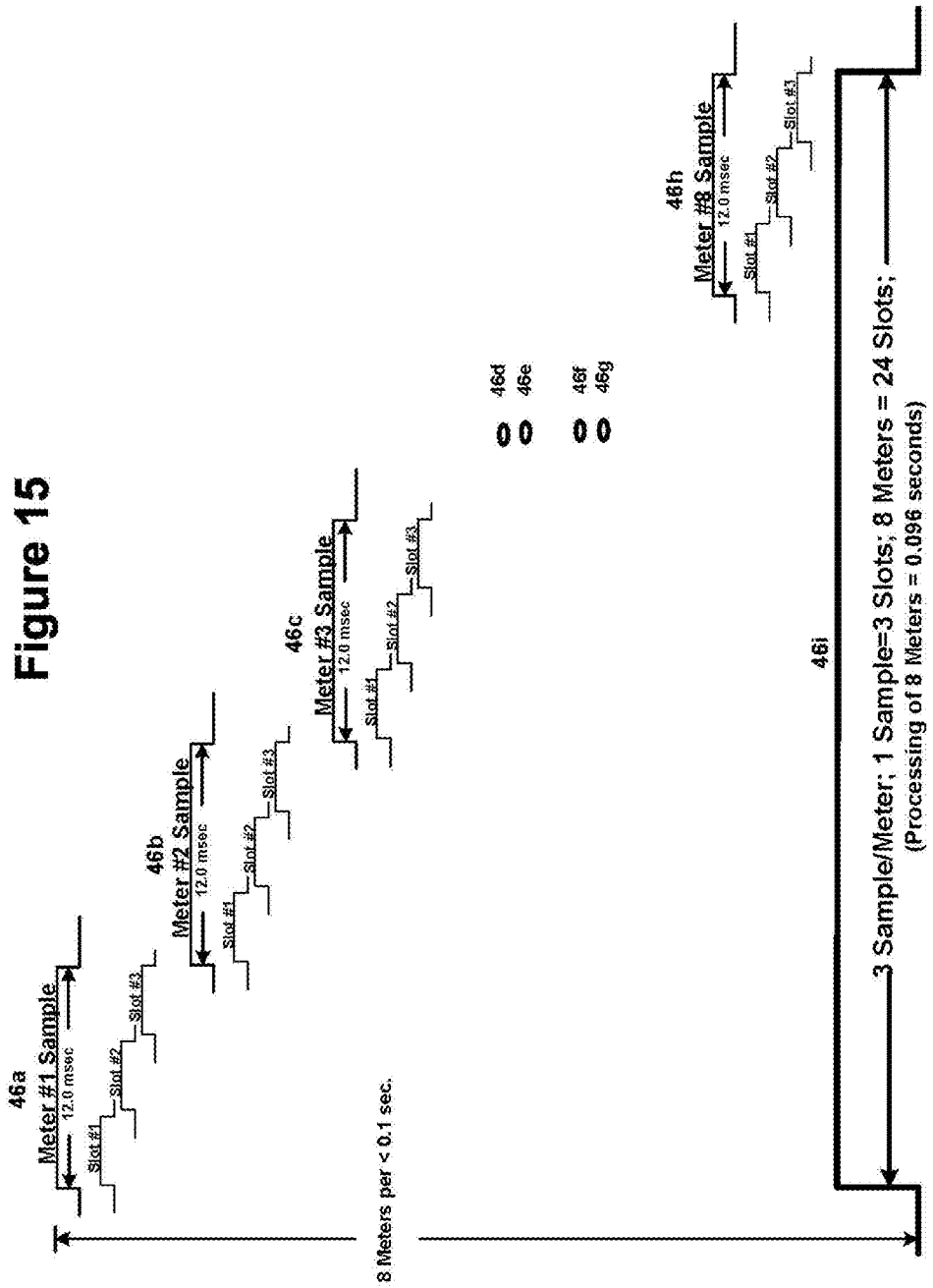
FIG. 15 schematically illustrates a timing diagram for a "basic installation" of eight EOMR's, according to an exemplary embodiment of the present disclosure.

FIG. 15 shows the overall multiple-meter slot timing for the "basic-installation" which accommodates eight meters. As explained above in FIG. 14, EOMR's 100 made or used in accordance with the present disclosure provide for multiple sampling and averaging of all data collected thereby significantly reducing the effects of electrical noise inherent in all data sampling systems. FIG. 15 provides a simplified overview for eight meters being monitored and as each of these meters being monitored has an identical processing-time sequence. Timing trace 46i summarized the total timing needed for processing eight electric, gas or water meters as 8×12 milliseconds=96 milliseconds (0.096 sec.).

Figure 16:
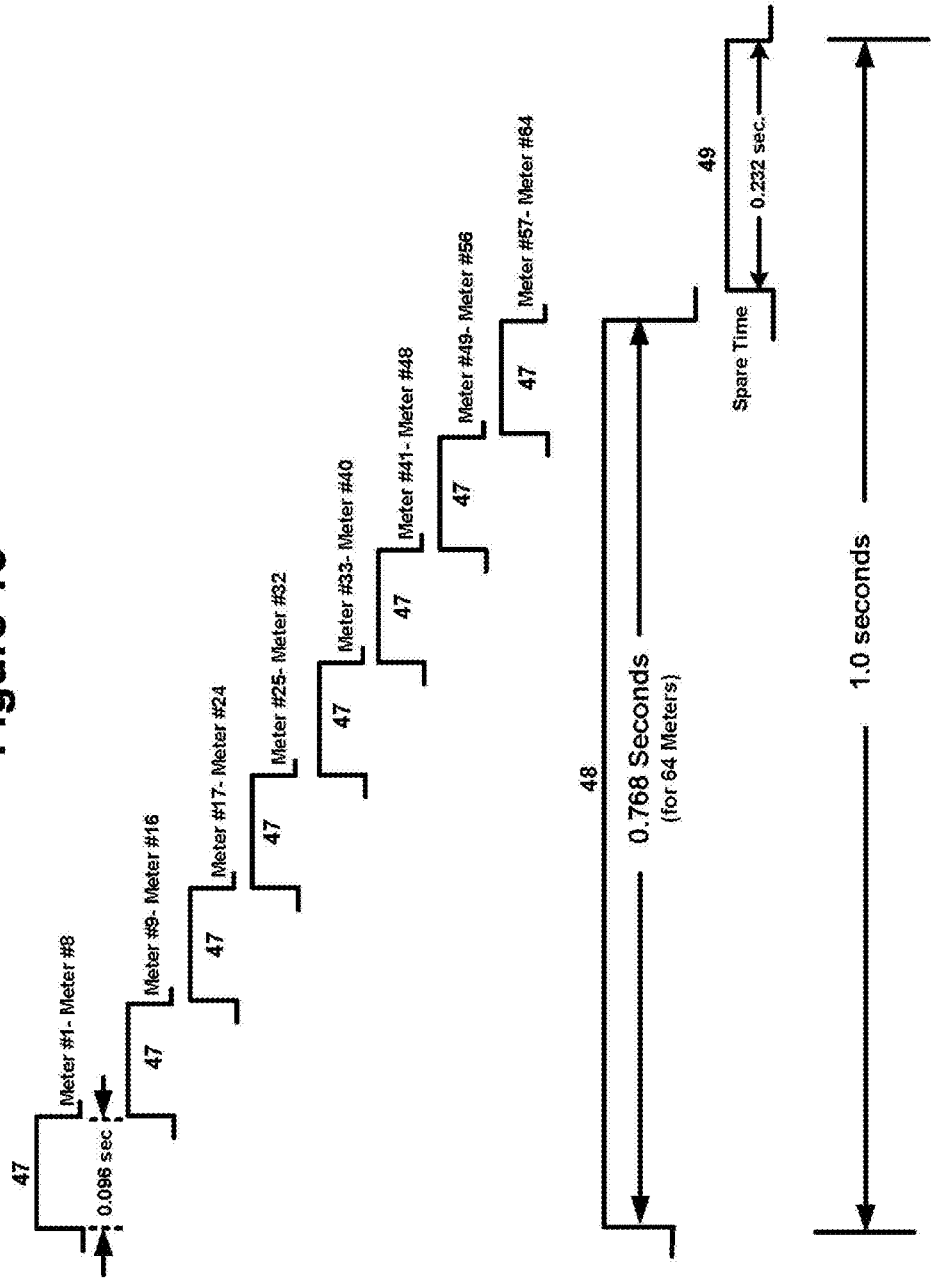
FIG. 16 schematically illustrates a timing diagram for a "large installation" of sixty-four EOMR's, according to an exemplary embodiment of the present disclosure.

FIG. 16 shows a timing diagram for the "large installation" of sixty-four meters, as described above with reference to FIG. 2. The total sampling time for each group of eight meters, e.g., meter #1 through meter #8, requires a total of 0.096 sec. Each additional group of eight meters, e.g., meter #9 through meter #16; meter #17 through meter #24; —meter #57 through meter #64, each require an additional 0.096 sec. Therefore, the total processing time for sixty-four meters, each requiring an identical timing trace of 0.096 sec. as shown in timing trace 48, would require 8×0. 096 seconds for a total of 0.768 seconds. On the basis of a one 1 second processing-time baseline, the processing-time margin, or spare time 49 of 0.232 milliseconds, or 23.2%, remains.

In summary, although the timing traces detailed in FIGS. 13-16 are precise, they are derived from using a reasonable and readily available set of digital devices. It is fully recognized that there are many other similar devices that may/will have slightly different processing time thorough-puts and this could therefore result in somewhat different timing-traces. However, as this set of four timing-traces shows, the present disclosure assures that there is a very significant processing-time margin even in the "large installation" of sixty-four meters. Thus, the EOMR 2000 can and will work in a substantially similar manner if some or all of the specific devices shown are replaced with an equivalent set of other similar devices. The exact devices shown and described herein have been selected to provide an easily understood and coherent example for a reasonable implementation of the present disclosure.

FIGS. 17-23 show logic flow diagrams (LFD) of various software sections of the EOMR, according to exemplary embodiments of the present disclosure. It must be understood that these various LFD's show typical logical implementation sequences, and that other equivalent and/or substantially equivalent logical implementation LFD sequences are possible and contemplated. All such implementation sequences are herein ally included as being acceptable in an equivalent exemplary embodiment of the disclosure.

Figure 17:
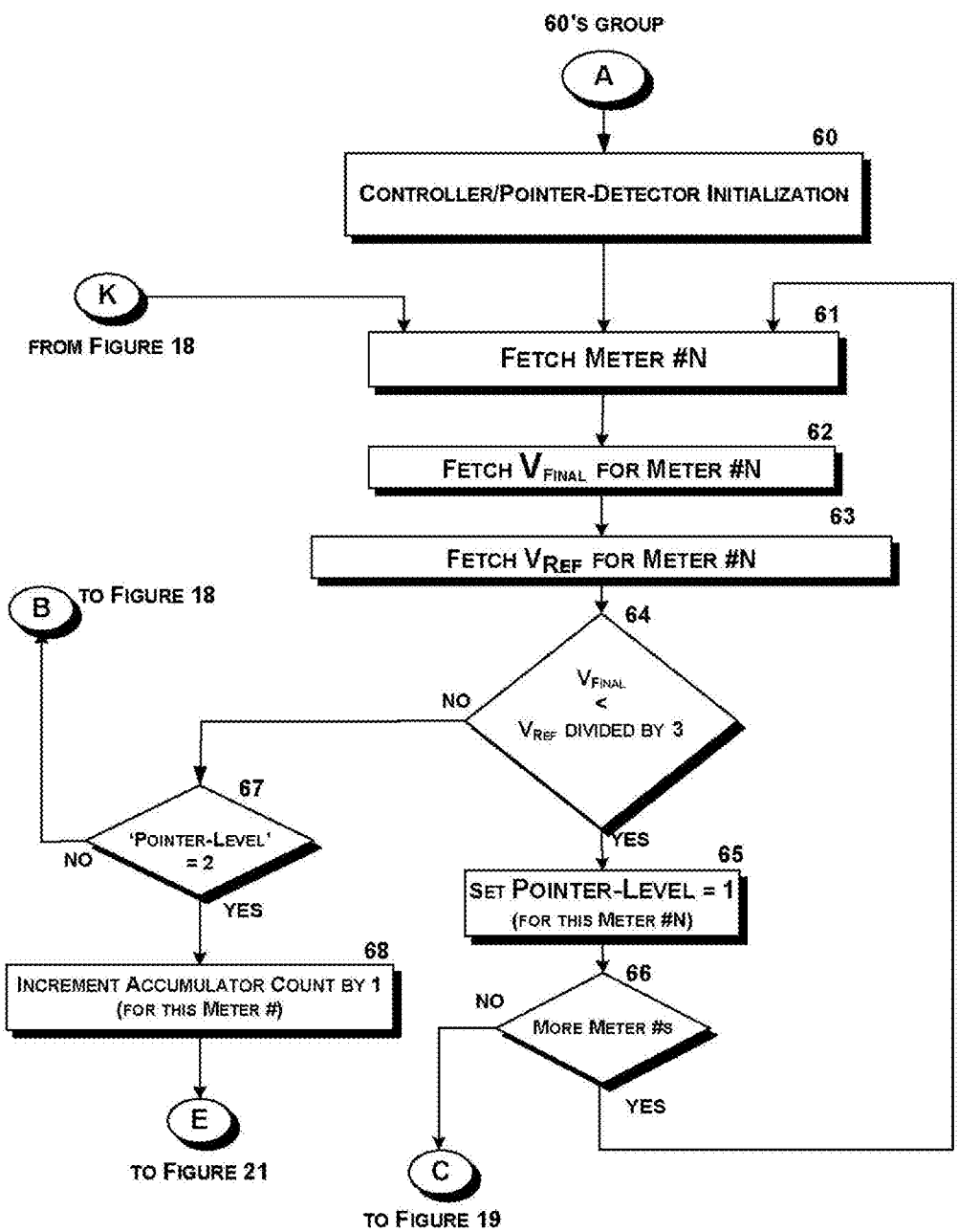
FIG. 17 schematically illustrates a Logic Flow Diagram (LFD) of a software section of the EOMR, a pointer crossing detector subroutine.

FIG. 17 depicts a logic flow diagram (LFD) of a software section of an EOMR 2000, the pointer crossing detector subroutine. The pointer crossing detector subroutine begins with controller/pointer-detector initialization 60. This step inputs the "initial-value" of the current utility (electric, gas or water) prior to the activation of the EOMR 2000 monitoring usage into the 8-bit microprocessor 6. In addition, this step sets up all the needed variables to begin the subroutine. The next step 61 fetches the meter # that is currently being monitored. It is noted that in the "basic installation" this meter # can be anywhere from #1 to #8 and in the "large installation" this meter # can be anywhere from #1 to #64. The next step 62 fetches the final voltage measured, $V_{Final}$ that was previously stored for this meter #. The next step 63 fetches the reference voltage, $V_{Ref}$, previously stored for this meter #. This previously stored $V_{Ref}$ was developed from averaging many 'high' voltage samples from the infrared phototransistor 17 indicative that the reflected IR beam 19 is being reflected from the white/silver face-plate 13. The next step 64 is to determine whether $V_{final}$ is less that $V_{Ref}$ divided by three. This step is to determine if the voltage out of the infrared phototransistor 17 is significantly low enough, e.g., less than one-third of the stored value of $V_{Ref}$, thereby indicating that the reflected IR beam 19 is being reflected from the black/absorbing pointer 14. If the answer to this inquiry is "yes," "true," or otherwise indicated as being affirmative, then at the next step 65, subroutine sets the pointer-level=1 for this meter # and checks for more meters. If there are more meters, the subroutine cycles back to step 61 in order to set the pointer-level count to "1" for all the monitored meters. If the answer is "no," "false," or otherwise negatively indicated, the subroutine exits to point C which is at the start of the subroutine illustrated in FIG. 19. If the answer is "no," etc., at point 64, the subroutine proceeds to step 67 to ascertain whether the pointer-Level=2. This check is to determine if this subroutine has already been to step 104 in the pointer-crossing completion check described in FIG. 19, which indicates that the pointer 14 has already been under the illuminating IR beam 18. If the answer is "yes," or the like, the accumulator count is incremented by 1, as shown at step 68 for this meter #, and the subroutine exits at point E, which is at the start of the subroutine illustrated in FIG. 21. If the answer is "no," or the like, the subroutine exits at point B, which is at the start of the subroutine illustrated in FIG. 18. It is noted that step B in FIG. 18 updates $V_{Ref}$ for all the meters being monitored.

Figure 18:
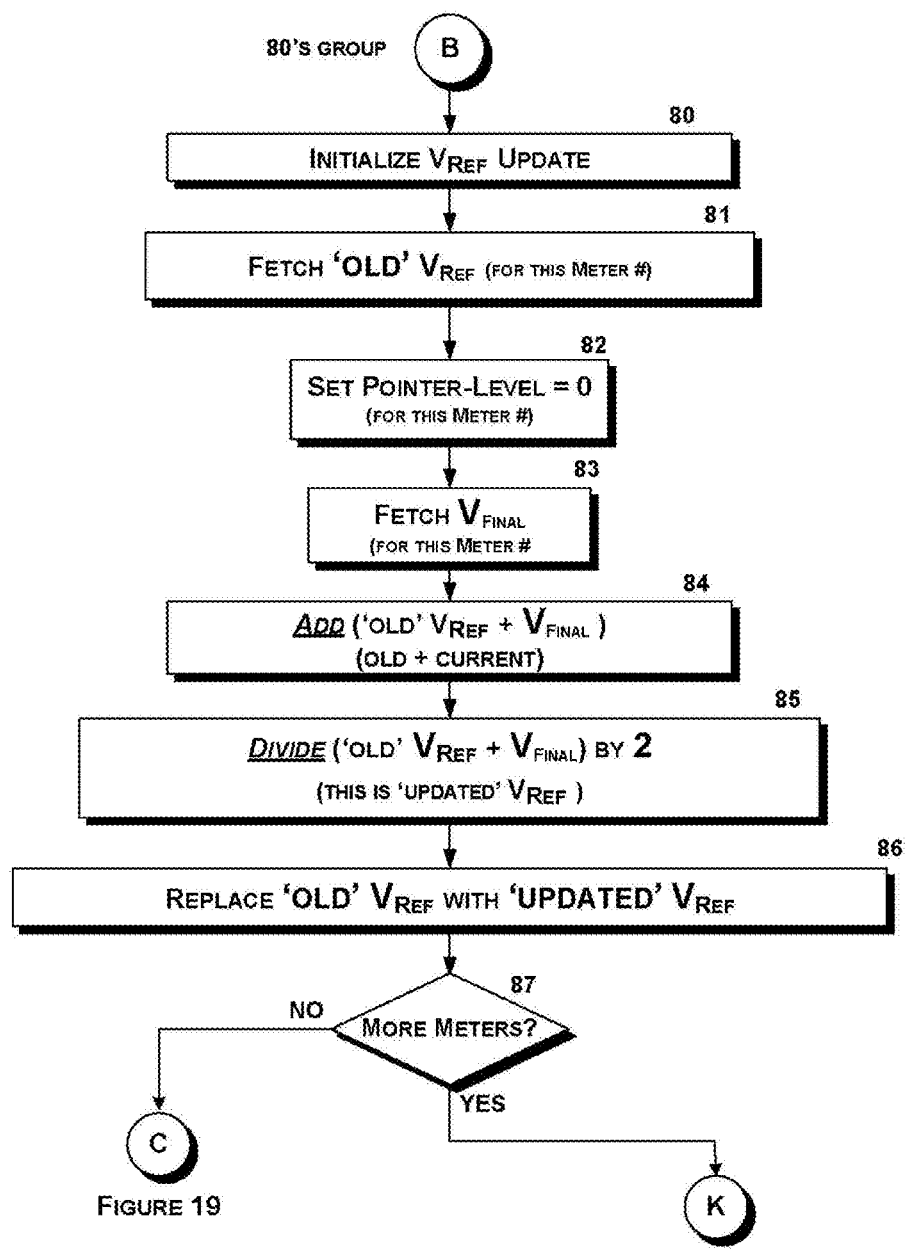
FIG. 18 schematically illustrates another LFD of a software section of the EOMR, a reference-voltage update subroutine.

FIG. 18 depicts another logic flow diagram (LFD) of a software section of an EOMR 2000, the reference-voltage update subroutine. The reference-voltage update subroutine begins with the initialization of the reference-voltage update subroutine as shown at step 80. During initialization, all the needed variables to begin the subroutine are set up. It is noted the only way to reach this point B, is the case when the $V_{final}$ is not a low value ($V_{final}$ is not less than $V_{Ref}$ divided by three making this a good case to update $V_{Ref}$). In the first step 81 of this sub-routine, the stored value of the 'old' $V_{Ref}$ for this meter # is fetched. At the next step 82, the pointer-level is set back to zero for this meter #. At the next step 83, the stored value of $V_{final}$ is fetched. At the next step 84, the old $V_{Ref}$ is added to $V_{final}$. At the next step 85, $(V_{Ref}+V_{final})/2$ is computed as the 'updated' $V_{Ref}$. At step 86, the 'old' $V_{Ref}$ is replaced with the 'updated' $V_{Ref}$. At step 87, the subroutine determines if there are more meters. If the answer is "yes," or the like, the subroutine exits and goes to step K of the subroutine illustrated in FIG. 17. If the answer is "no," or the like, the subroutine exists and goes to step C of the subroutine illustrated in FIG. 19.

Figure 19:
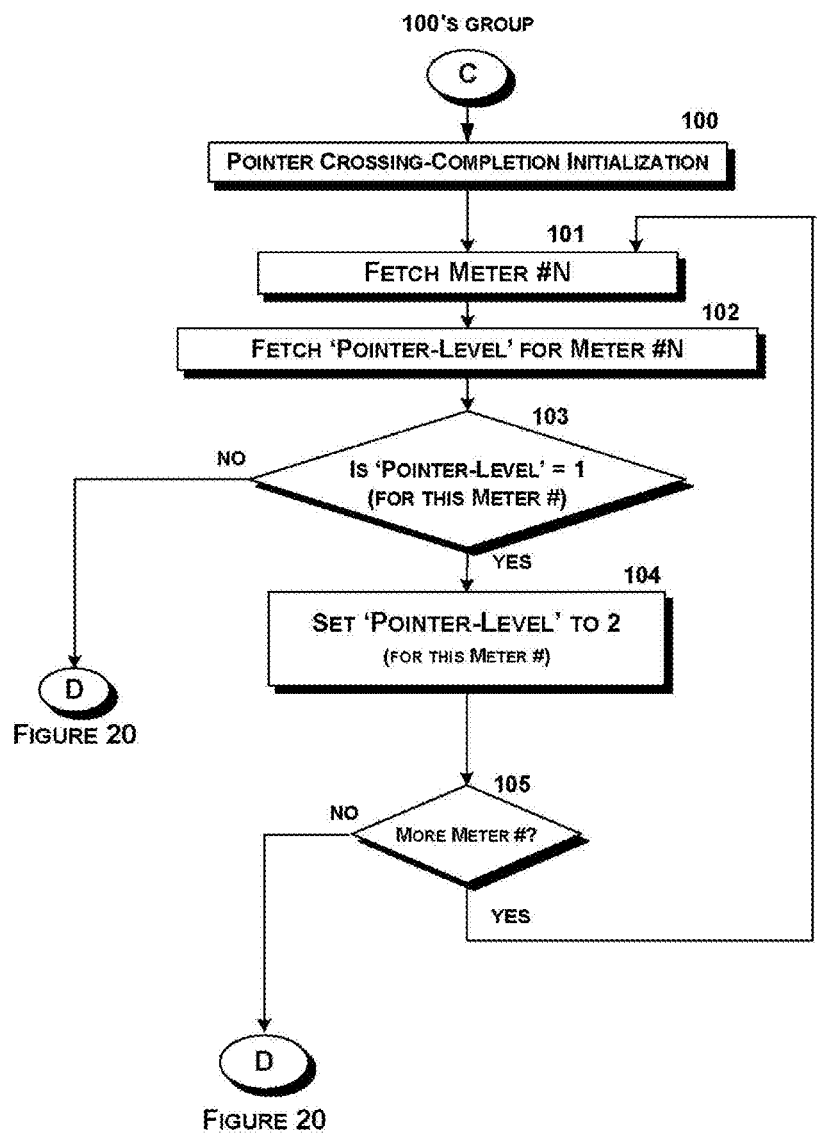
FIG. 19 schematically illustrates another LFD of a software section of the EOMR, a pointer-crossing completion check subroutine.

FIG. 19, depicts a logic flow diagram (LFD) of a software section of an EOMR 2000, the pointer-crossing completion check subroutine. The pointer-crossing completion check subroutine begins with the initialization of the pointer crossing-completion initialization 100. At the next step 101, the subroutine fetches the current meter # being monitored. At the next step 102, the subroutine fetches the pointer-level for this meter #. At the next step 103, the subroutine checks if the pointer-level is equal to "1." If the answer is "no," or the like, the subroutine exits to D of the subroutine illustrated in FIG. 20. If the answer is "yes," or the like, the subroutine proceeds to step 104, at which the pointer-level is set equal to two. At the next step 105, the subroutine checks if there are more meter #s to be updated. If the answer is "yes," or the like, the subroutine cycles back to step 101 in order to repeat this process. If the answer is "no," or the like, the subroutine exits to D of the subroutine illustrated in FIG. 20.

Figure 20:
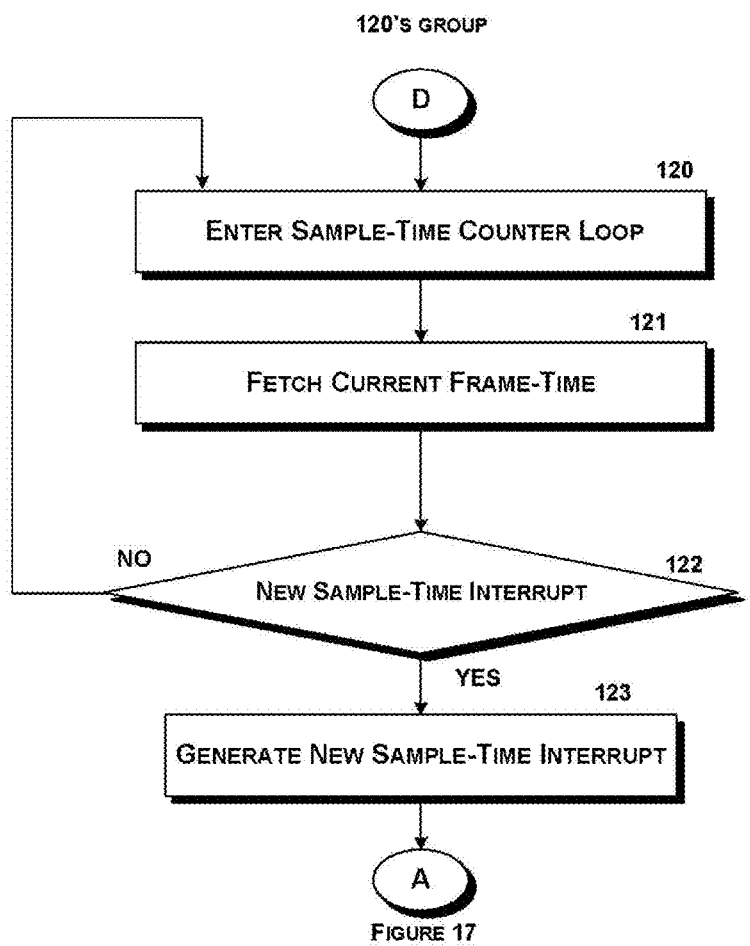
FIG. 20 schematically illustrates another LFD of a software section of the EOMR, a sample-time loop subroutine.

FIG. 20 depicts a logic flow diagram (LFD) of a software section of an EOMR 2000, the basic sample-time loop subroutine. The basic sample-time loop subroutine begins with entering the sample-time counter loop 120. The next step is the fetch current sample-time step illustrated at step 121. At the next step 122, the subroutine determines if this is new frame-time interrupt 122. If the answer is "yes," or the like, the subroutine creates a generate new sample-time interrupt at step 123, and exits to step A of the subroutine illustrated in FIG. 17. If the answer is "no," or the like, the subroutine cycles back to step 120 to continue monitoring sample-time.

Figure 21:
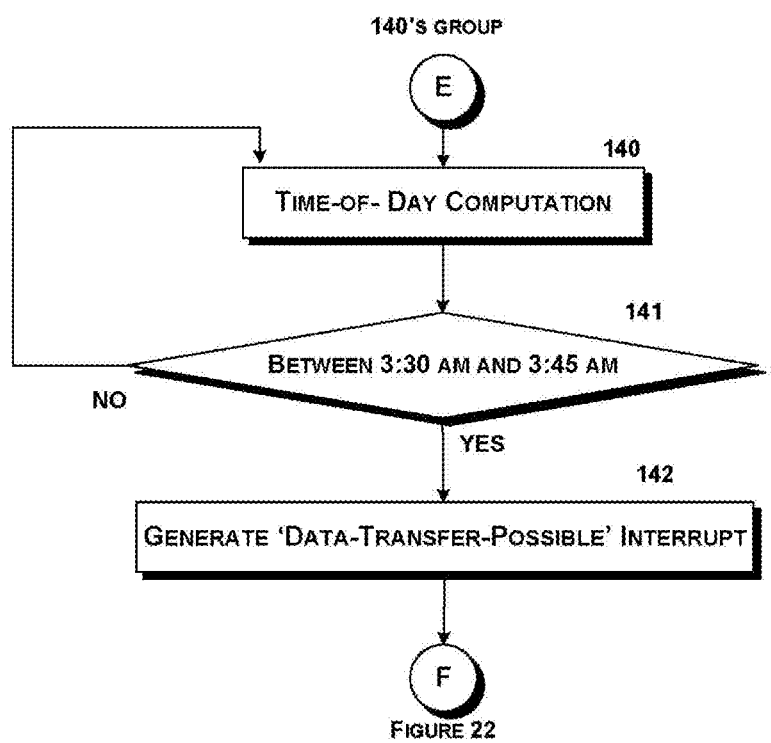
FIG. 21 schematically illustrates another LFD of a software section of the EOMR, a time of day timing loop subroutine.

FIG. 21 depicts a logic flow diagram (LFD) of a software section of an EOMR 2000, the time of day timing loop subroutine. The time of day timing loop subroutine begins with entering the time-of-day computation, as shown at step 140. At the next step 141, the subroutine checks a current time-ofday to determine if the current time of day is between 3:30 am and 3:45 am. If the answer is "yes," or the like, the subroutine creates a data-transfer-possible interrupt at step 142 and exists to step F of the subroutine illustrated in FIG. 22. If the answer is "no," or the like, the subroutine cycles back to step 140 to continue monitoring the time-of-day computation.

Figure 22:
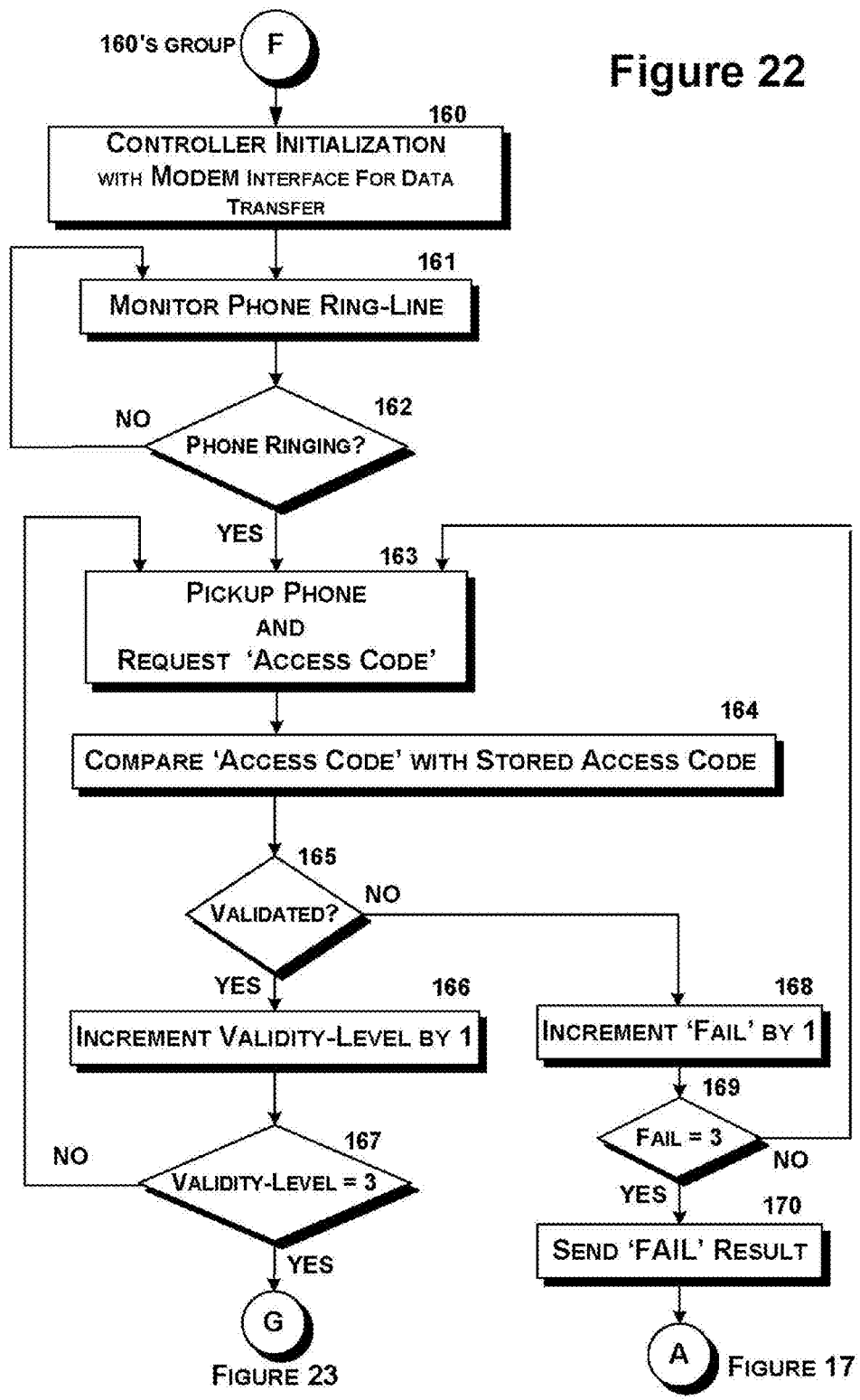
FIG. 22 schematically illustrates another LFD of a software section of the EOMR, a validate external phone access code subroutine.

FIG. 22 depicts a logic flow diagram (LFD) of a software section of an EOMR 2000, the validate external phone access code subroutine. As shown at step 160, the validate external phone access code subroutine begins with the initialization of the controller 8 for interfacing with the modem interface 9 to prepare (if so requested) for a data transfer to the utility billing-office. At the next step 161, the subroutine monitors the phone ring-line to determine if a phone associated with the phone ring-line is ringing, as shown at step 162. If the answer is "no," or the like, the subroutine cycles back to step 161 and continues monitoring the phone ring-line. If the answer is "yes," or the like, the subroutine picks up the phone and requests an access-code, as illustrated at step 163. At the next step 164, the subroutine compares the received access-code to a previously validated stored access codes 16. It should be understood that each utility company can have a unique access code.

As illustrated at step 165, the subroutine then checks to determine if the received access-code is validated. If the answer is "yes," or the like, the validity-level is incremented by one, as shown at step 166. At the next step 167, the subroutine checks to see if the validity-level is equal to three. This check is inserted to assure that the received access-code is valid and is done three times thereby validating that the request is legitimate. If the answer is "yes," or the like, the subroutine exits to step G of the subroutine illustrated in FIG. 23. If the answer is "no," or the like, the subroutine cycles back to step 163 to request an access-code again. If the answer is "no," or the like, at step 165, the next step 168 increments 'Fail' by "1" indicating that received access-code is not equal to the stored access-code. At the next step 169, the subroutine checks if 'Fail'=3. If answer is "no," or the like, the subroutine cycles back to step 163 and request an access-code again. If the answer is "yes," or the like, the subroutine sends 'FAIL' via the controller 8 to the modem interface 9 for transmission to the utility billing office indicating that the EOMR 2000 did not, after three tries, receive a valid access-code. The subroutine then exits to step A of the subroutine illustrated in FIG. 17.

Figure 23:
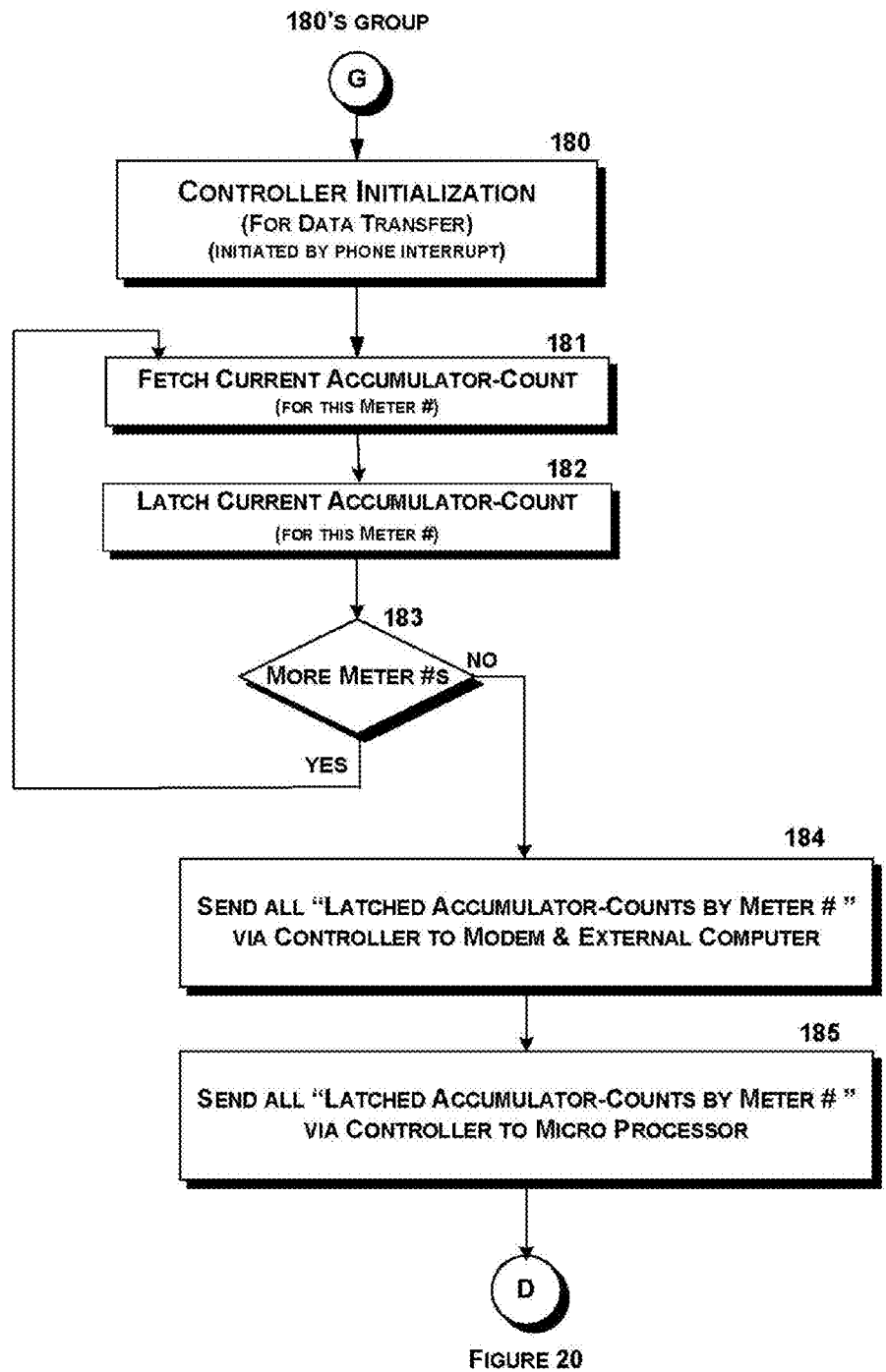
FIG. 23 schematically illustrates a LFD of a software section of the EOMR, a response to external-update request subroutine.

FIG. 23 depicts a logic flow diagram (LFD) of a software section of an EOMR 2000, the response to external-update request subroutine. It is noted that the only way to reach this point is for the EOMR 2000 having successfully received three 3 valid access-codes from the utility billing office. The response to external-update request subroutine begins with the initialization of the controller 8 for data transfer through the modem interface 9, as illustrated at step 180. At the next step 181, the subroutine fetches the current accumulator-count for this meter #. At the next step, the subroutine latches the current accumulator-count 182 for this meter #. At the next step 183, the subroutine checks if there are more meters. If the answer is "yes," or the like, the subroutine cycles back to step 181 in order to fetch and latch the accumulator-counts for all of the meters being monitored. If the answer is "no," or the like, since at this point in the subroutine the EOMR 2000 has collected all the utility-usage for the rest of the meters being monitored the next step 184 sends the latched accumulators-counts [by individual meter #], via the controller 8 for data transfer through the modem interface 9, to the utility billing-office. The next step 185 sends the latched accumulators-counts, by individual meter #, via the controller 8 to the 8-bit microprocessor 6. At the next step 184, the subroutine exists to step D of the subroutine illustrated in FIG. 20.

Figure 24:
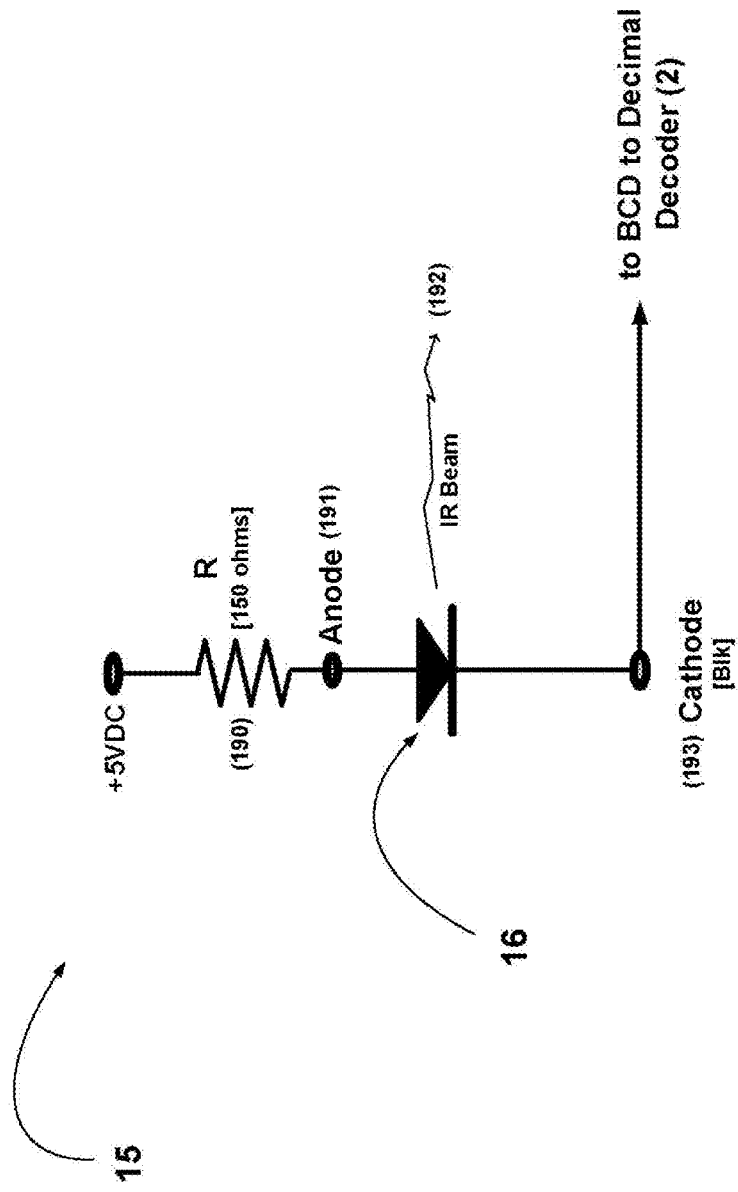
FIGS. 24-25 schematically illustrate an EORIS, according to an exemplary embodiment of the present disclosure.
Figure 25:
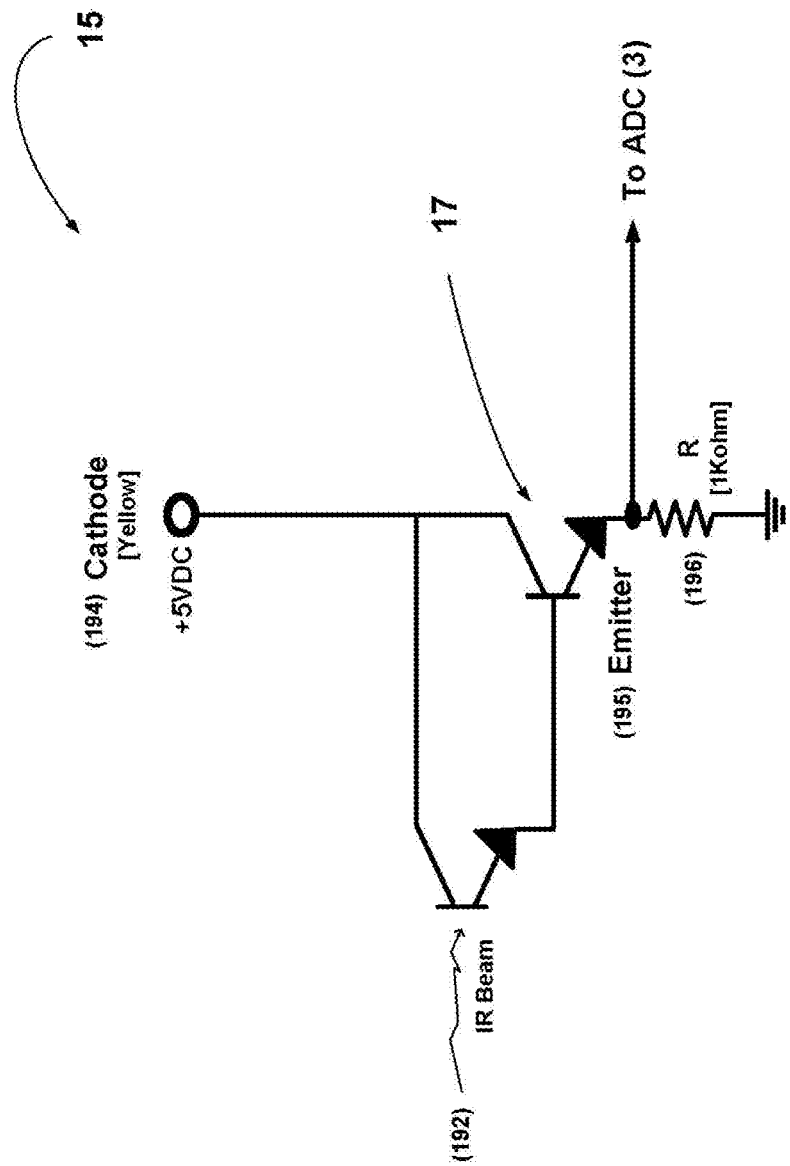

FIGS. 24-25 are simplified schematics of the EORIS 15 which contains the IED 16. As shown in FIG. 24, the EORIS 15 includes a current limiting resistor R 190 which is connected at one end to +5 VDC and at the other end is connected to the anode 191. The cathode 193 of this part is connected to the BCD to decimal decoder 2. Whenever the BCD to decimal decoder 2 applies a 'ground' to this cathode 193, the IED 16 emits an infrared (IR) beam 192, which in turn generates an illuminating IR beam 18.

As shown in FIG. 25, the detector portion of the EORIS 15 contains the infrared phototransistor 17. The illustrated configuration shown is the 'Darlington' type which is the preferred implementation since it provides additional drive. The cathode 194 is connected directly to the +5 VDC. The emitter 195 is connected to one end of a resistor R 196 and the other side of this resistor R 196 is connected directly to 'ground.' The analog voltage across R 196 is sent to the A/D Converter 3 for conversion to its 8-bit digital equivalent.

Figure 26:
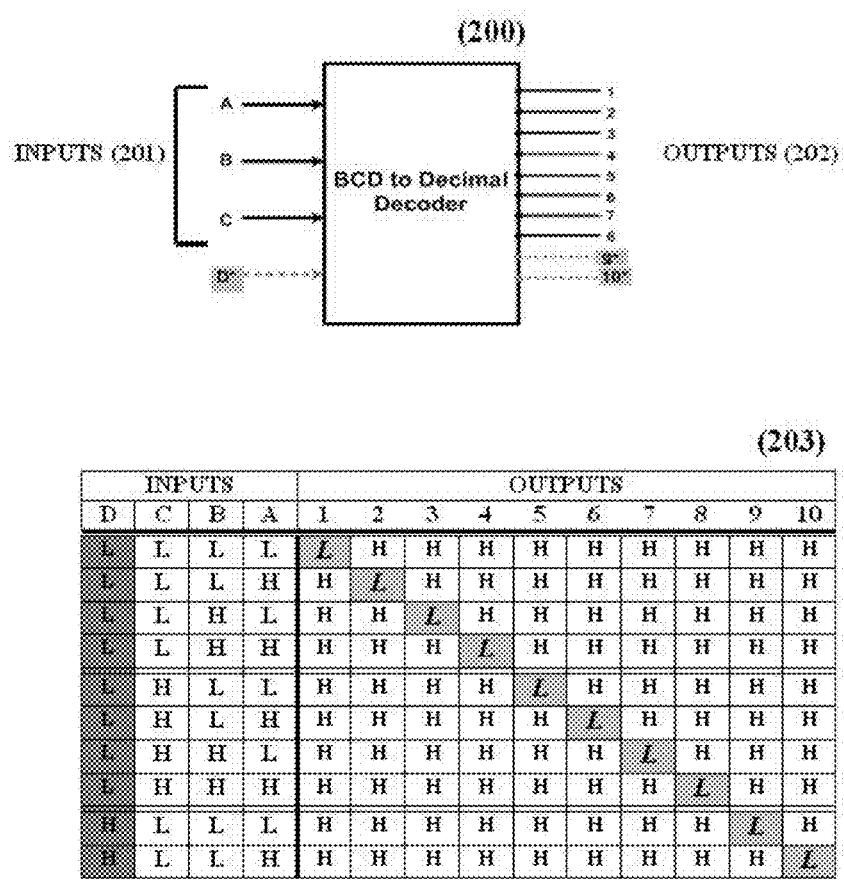
FIG. 26 schematically illustrates some details of a BCD to Decimal Decoder input and output, according to an exemplary embodiment of the present disclosure.

FIG. 26 illustrates the BCD to Decimal Decoder I/O 200. In the present disclosure, only one of eight outputs need to be selectable. This is shown in the provided table where only three {A-B-C [not D]} of the INPUTS 201 are used to select to provide selection of one of the eight outputs {1 of 8 [not 9 or 10]} OUTPUTS 202. The table 203 shows the precise relationship between the three 3 control-inputs {A-B-C} to the one 1 to eight outputs. As shown, that depending on the control inputs, one, and only one, of the possible outputs cycles to provide a "ground." During the sampling of a given meter #

Figure 27:
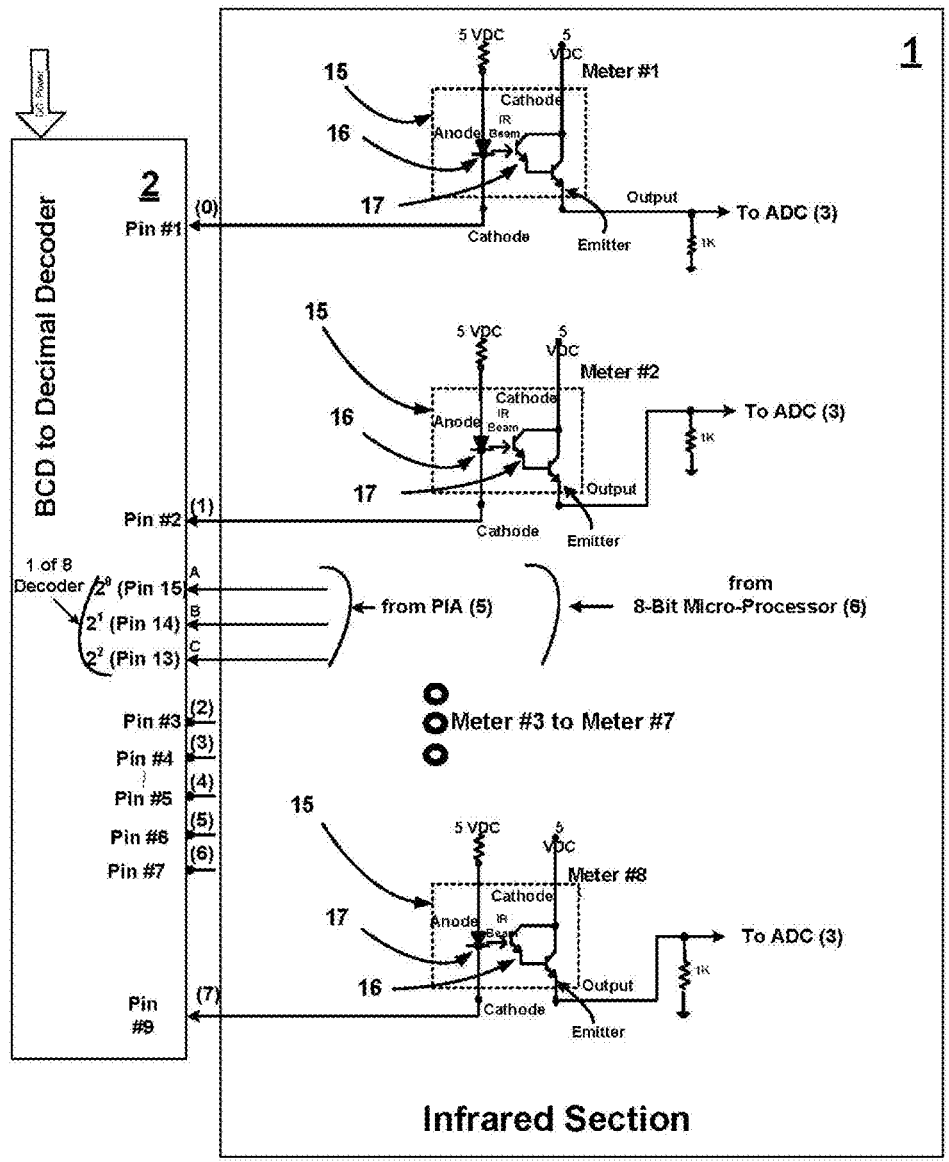
FIG. 27 schematically illustrates an interface between a BCD to Decimal Decoder and up to eight EORIS's, according to an exemplary embodiment of the present disclosure.

FIG. 27 is a simplified schematic and interface of the present disclosure that depicts the major interfaces between the BCD to decimal decoder 2 and the EORIS's 15. In the present disclosure control lines from the PIA 5 select which of the Infrared Emitter Diodes 16 is activated via 'ground'. As shown in FIG. 27, for the "basic installation," up to eight IED's 16 will thus be controlled. Although not explicitly shown, it is clear to those familiar with art, that with additional EORIS's 15 and additional BCD to decimal decoders 2, and the addition of additional A/D converters 3, the proposed disclosure is the first step toward the "large installation" In this "large installation" up to sixty-four utility-meters can be monitored.

Figure 28:
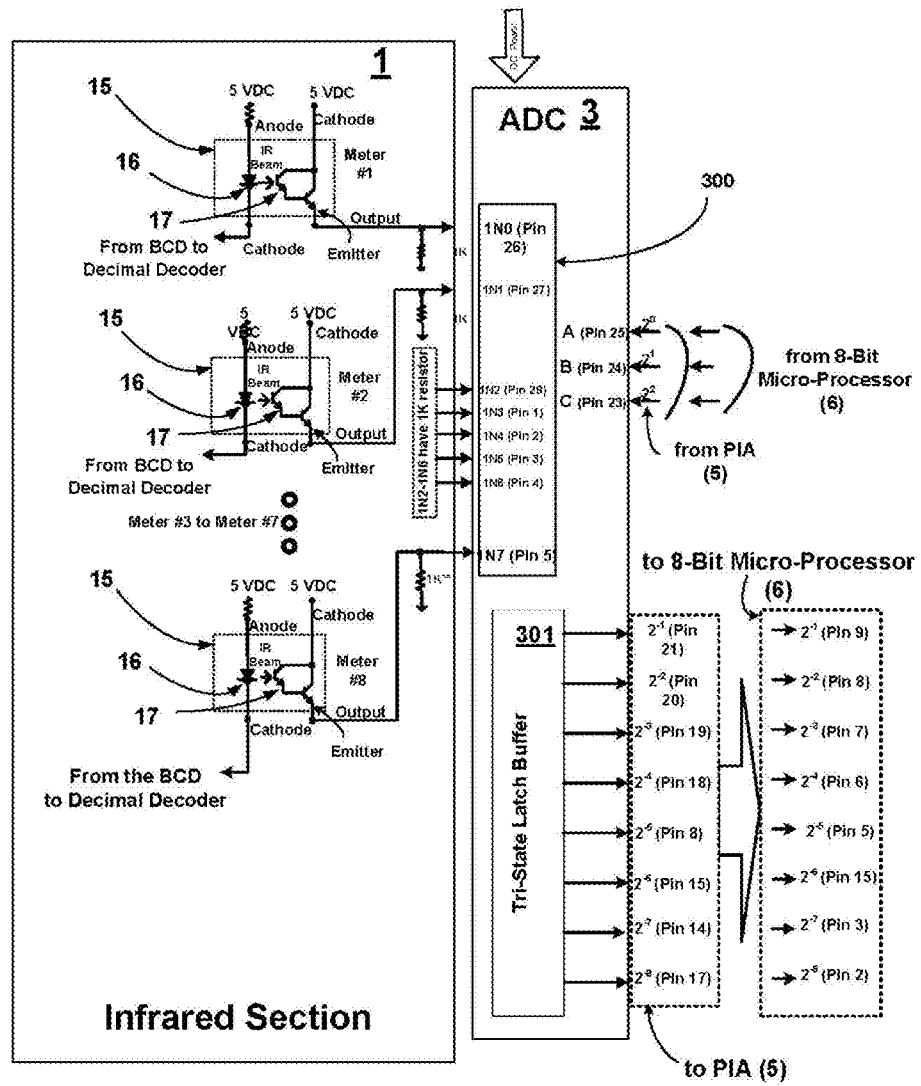
FIG. 28 schematically illustrates an interface between up to eight EORIS's and an A/D converter, according to an exemplary embodiment of the present disclosure.

FIG. 28 is a simplified schematic and interface of an EOMR 2000 that depicts the major interfaces between the EORIS 15 and the A/D Converter 3. In the present disclosure the analog voltage presented by the infrared phototransistor 17 are converted into their digital equivalents by the A/D converter 3. The control lines from the PIA 5 are processed by the 8 channel multiplexing analog switch 300 to select which of the analog voltage presented by the infrared phototransistor 17 are sequentially presented as inputs of the A/D Converter 3. Having completed the conversion, the tri-state latch buffer 301 sends these digitized voltages to the 8-bit microprocessor 6. As shown in FIG. 28, in the "basic installation," up to eight analog voltages from up to eight infrared phototransistors 17 will be sequentially presented to the A/D converter 3. As discussed in FIG. 27, with additional EORIS's 15, additional BCD to decimal decoders 2, and additional A/D converters 3, the EOMR 2000 transitions from a "basic installation" to the "large installation." In this "large installation" up to sixty-four utility meters can be monitored.

Figure 29:
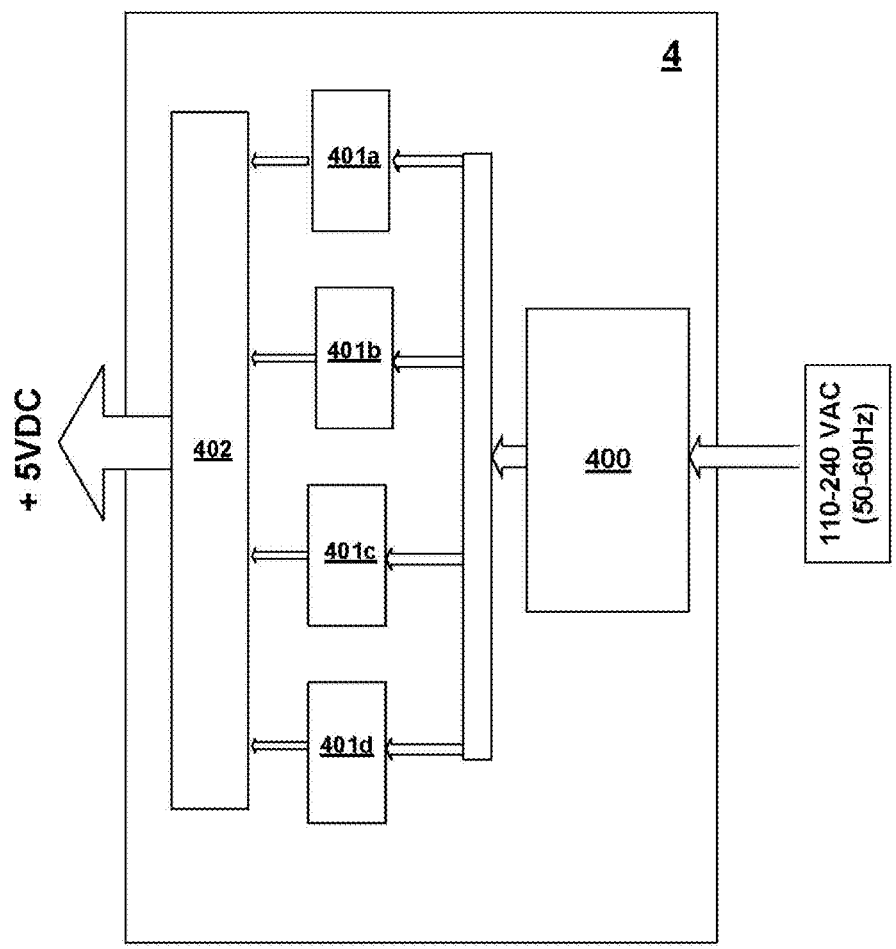
FIG. 29 schematically illustrates a power supply for an EOMR, for both the 'basic' and the 'large' installation, according to an exemplary embodiment of the present disclosure.

FIG. 29 is a block diagram illustrating a support unit of an EOMR 2000, the power supply 4. The power supply 4 unit is a battery-supported power supply that provides all necessary DC power for all the circuitry in the EOMR 2000. The power supply 4 has an input of 115 VAC to 240 VAC, operating over a frequency range of 50 Hz to 60 Hz. that feeds an automatic battery charger 400 which provides a continuous charge to the internal 12 VDC batteries. In the "basic installation," the control box 90 contains a single battery and in the event of a power outage, the proposed disclosure can maintain normal operation for over one hundred thirty hours, i.e., five and one half days. Similarly, in the "large installation," when monitoring the full complement of sixty-four meters, although, the large control box 91 has space for a total of four batteries, when operated with only with a single battery installed, in the event of a power outage, the proposed disclosure can maintain normal operation for one hundred ten hours, i.e., over four and a half days.

Furthermore, for installations in areas where there is high probability for frequent periods of extended power outages, the EOMR 2000 has the optional use of a large control box 91 with internal space for up to three additional internal batteries. In the "basic installation" that elects to use the large control box 91, with each additional battery, an additional 132 hours, or 5.5 days, of full operation is provided in the case of a loss of AC power.

Thus for the "basic installation," with the maximum of four total additional internal batteries, 401b, 401c, 401d, normal, full operation for up to eight meters can be maintained for approximately 530 hours or 22 days. As noted earlier, in the "large installation" only several of the units in the proposed disclosure are replicated as shown in FIG. 2 and as also noted earlier, the proposed disclosure utilizes a time-shared design approach thereby reducing the drain on the batteries. Therefore, for the "large installation" which utilizes the full space in the larger control box 91 for a total of four internal batteries, normal, full operation for up to sixty-four meters can be maintained for approximately 440 hours or approximately 18.3 days.

Figure 30:
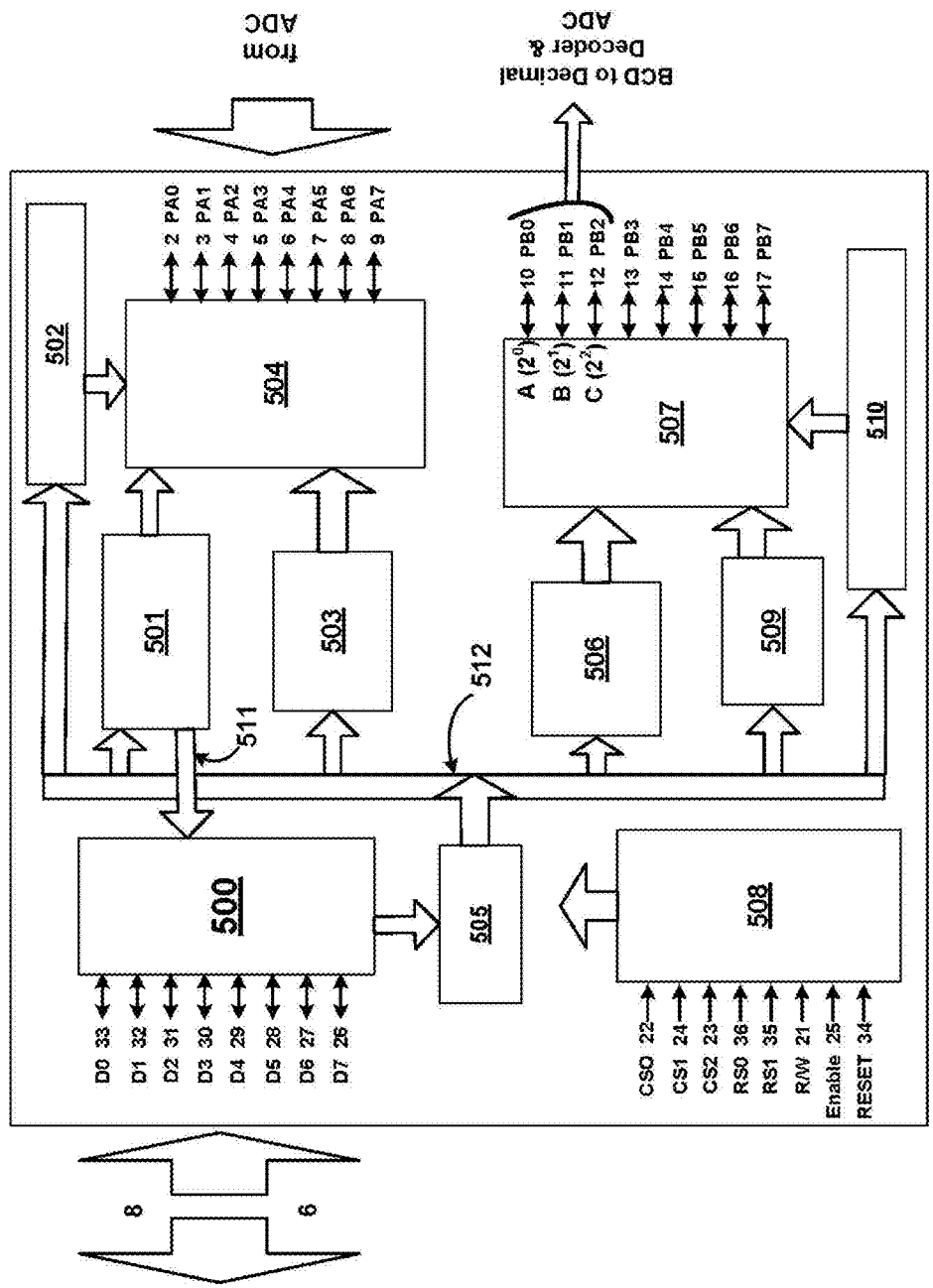
FIG. 30 schematically illustrates a peripheral interface adapter (PIA) for an EOMR, according to an exemplary embodiment of the present disclosure.

FIG. 30 is a block diagram illustrating a support element of an EOMR 2000, the peripheral interface adapter (PIA) 5. An example of such a device is the Motorola 6821. This device is especially well suited for use as an 8-bit input/output interface for the 8-bit microprocessor 6. On the input side, a peripheral interface A 504 receives the digitalized voltage data from the A/D Converter 3 utilizing Pin 2 through Pin 9 for PA0 through PA7.

On the output side, the data bus buffer 500 is connected directly to the output bus 511 and feeds the 8-bit microprocessor 6 and the controller 8 utilizing Pin 26 through Pin 33 for D0 through D7. In addition on the output side, the PIA 5 routes the three 3 bit control lines utilizing Pin 10 through Pin 12 for PB0 through PB2 to: (a) select from the one to eight BCD to decimal decoder 2 outputs to "ground," thus activating the appropriate IED 16, which in turn generates the IR Beam 192, and (b) select from the one to eight analog voltages outputted from the infrared phototransistor 17 as an input to the A/D Converter 3. A control register A 502 and a control register B 509 are fed by the input bus 512 and feed the peripheral interface A 504 and the peripheral interface B 507. Data direction is controlled by a data direction register A 501, and by a data direction register B 510. The bus input register 505 controls data from the data bus buffer to the input bus 512. The output register A 503 and the output register B 506 interface with the peripheral interface A 504 and with the peripheral interface B 507. Overall read-write control is provided by the chip select and R/W control 508.

Figure 31:
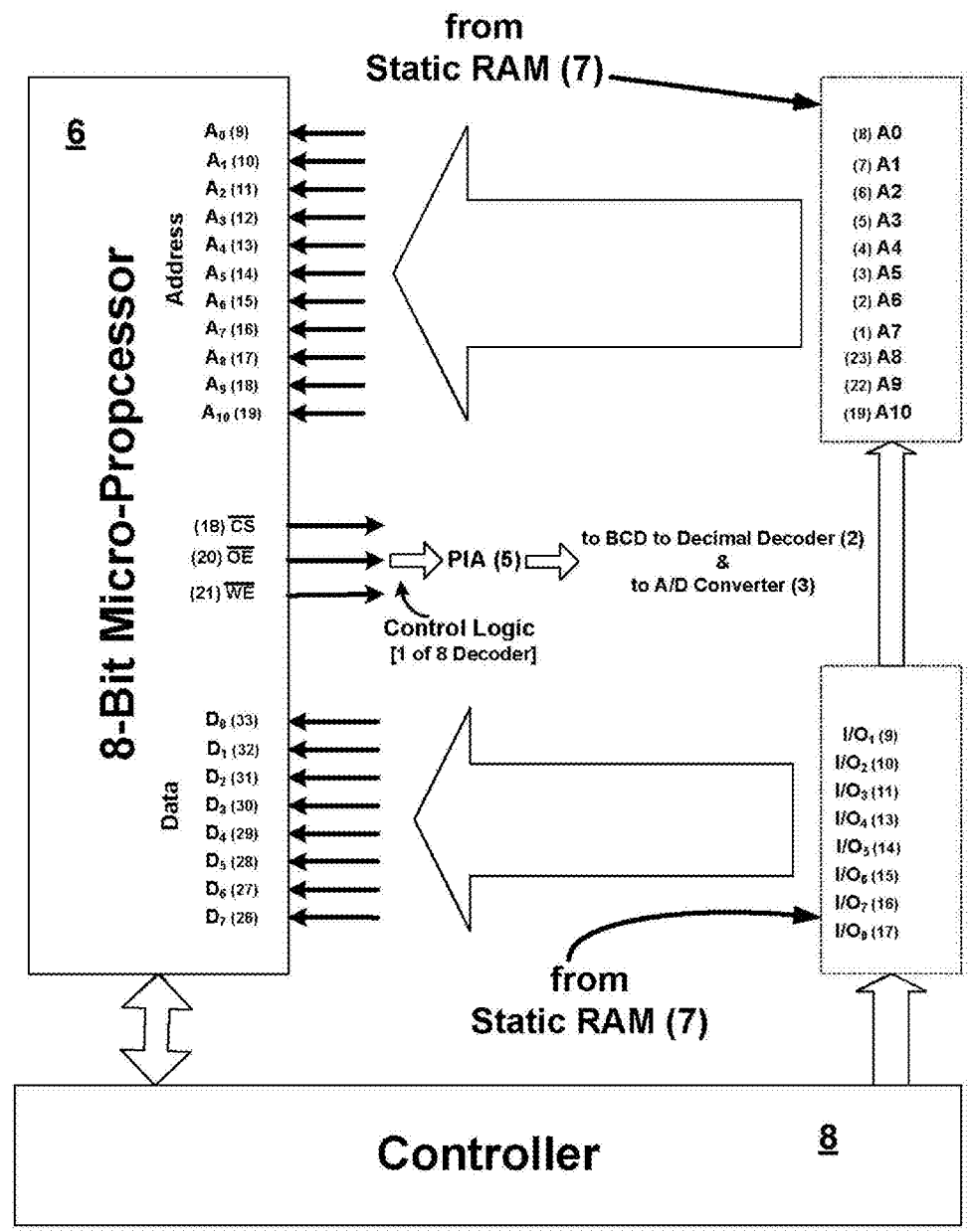
FIG. 31 schematically illustrates Input/Output (I/O) interfaces for an 8-bit microprocessor, according to an exemplary embodiment of the present disclosure.

FIG. 31 illustrates input/output (I/O) interfaces for the 8-bit microprocessor 6 of an EOMR 2000, according to an exemplary embodiment of the present disclosure. After initialization, the majority of the interfaces shown in FIG. 31 are the "ADDRESS" interface with the static RAM 7 utilizing Pins 9 through Pin 19 for addresses lines A0 though A10 and the "DATA" interface with the static RAM 7 utilizing Pin 33 through Pin 26 for data lines D0 through D7. In addition, FIG. 31 shows the 3-Bit "control-logic" signal that the 8-bit microprocessor 6 send to the PIA 5 for use in the BCD to decimal decoder 2 and the A/D converter 3 to the select one of eight signals for further processing.

Figure 32:
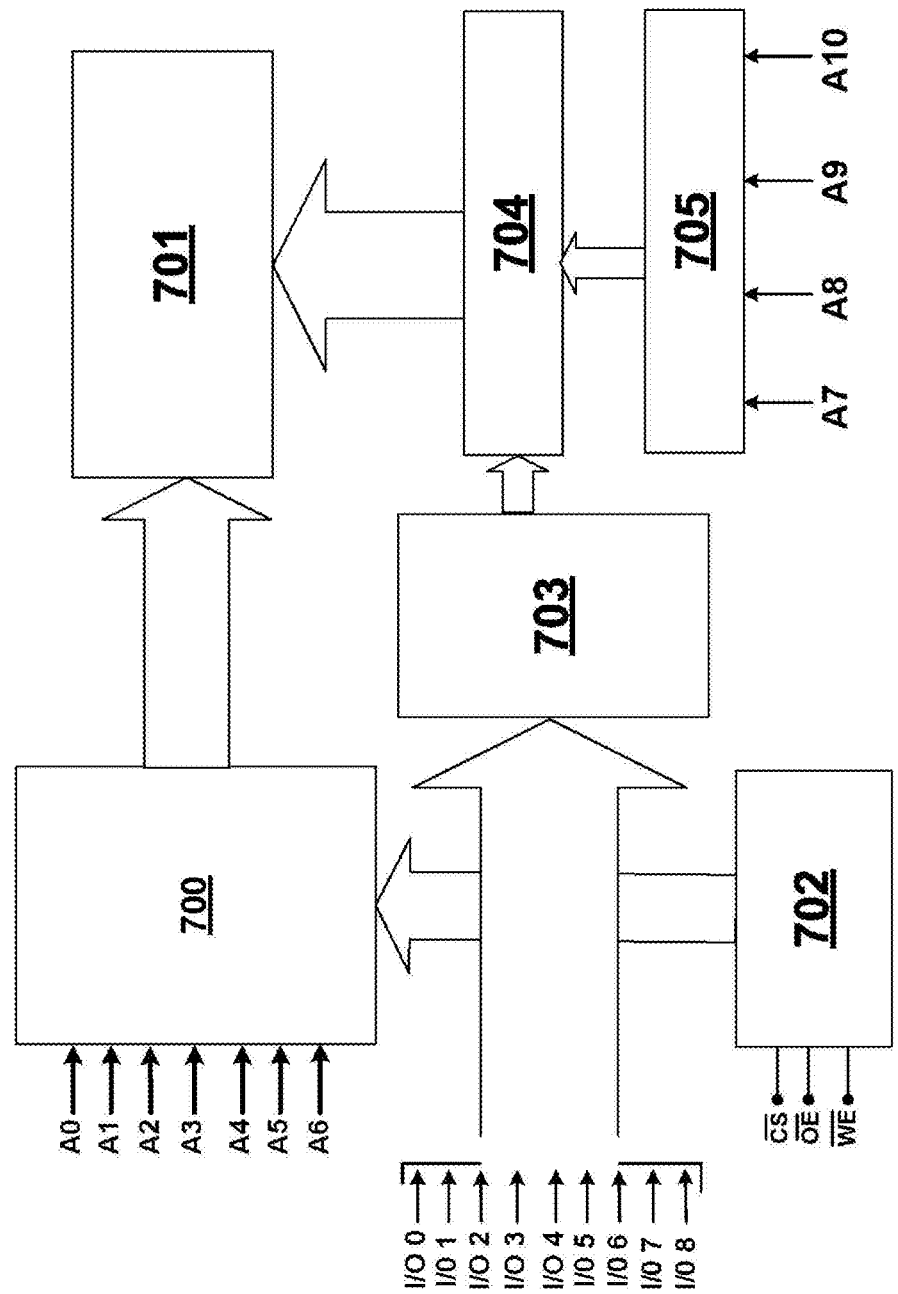
FIG. 32 schematically illustrates a functional block diagram of a static RAM, according to an exemplary embodiment of the present disclosure.

FIG. 32 is a block diagram of the static RAM 7 of an EOMR 2000, according to an exemplary embodiment of the present disclosure. The static RAM 7 is the main memory location for all the software subroutines described above with reference to FIGS. 17-23. The main memory location is in the 128×128 memory matrix 701 block. Row inputs to the row decoder 700 are shown as A0 through A6 and column inputs to the column decoder 706 block, which drives the column I/O 704 block, are shown as A7 through A10. Control logic and input data control is provided by the control logic 702 and input data control 703 blocks. As a result of its 'static' nature, the static RAM 7 does not require a "clock" or a "timing strobe" to operate. The static RAM 7 also is pin-out compatible with the 8-bit microprocessor 6. This pin-out compatibility is shown in FIG. 33.

Figure 33:
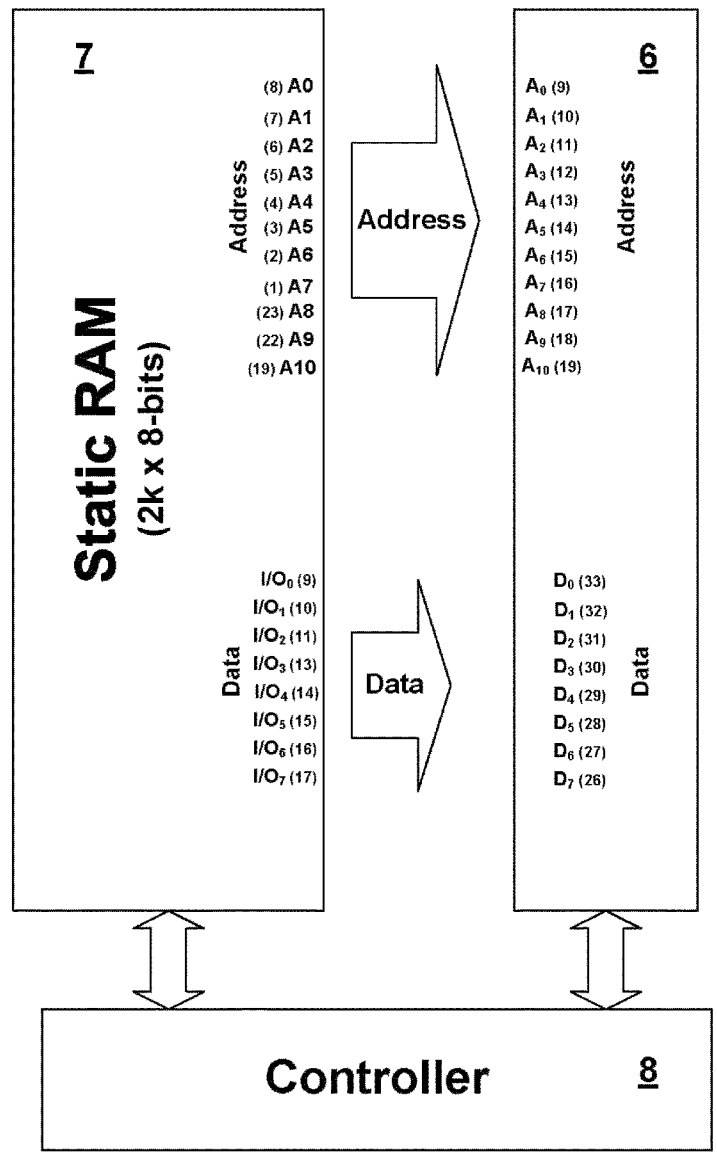
FIG. 33 schematically illustrates output interfaces for the static RAM, according to an exemplary embodiment of the present disclosure.

FIG. 33 schematically illustrates the output interfaces for the static RAM 7 of the EOMR 2000, according to an exemplary embodiment of the present disclosure. The interfaces shown are for the "ADDRESS" lines with the 8-bit microprocessor 6 utilizing Pins 1 through Pin 8 for addresses lines A7 though A0, for Pin 23 for A8, Pin 22 for A9, and Pin 19 for A10. Similarly, for the "DATA" interface utilizing Pin 9 through Pin 11 for I/O 0 through I/O 2 and Pin 13 through Pin 17 for I/O 3 through I/O 7.

Figure 34:
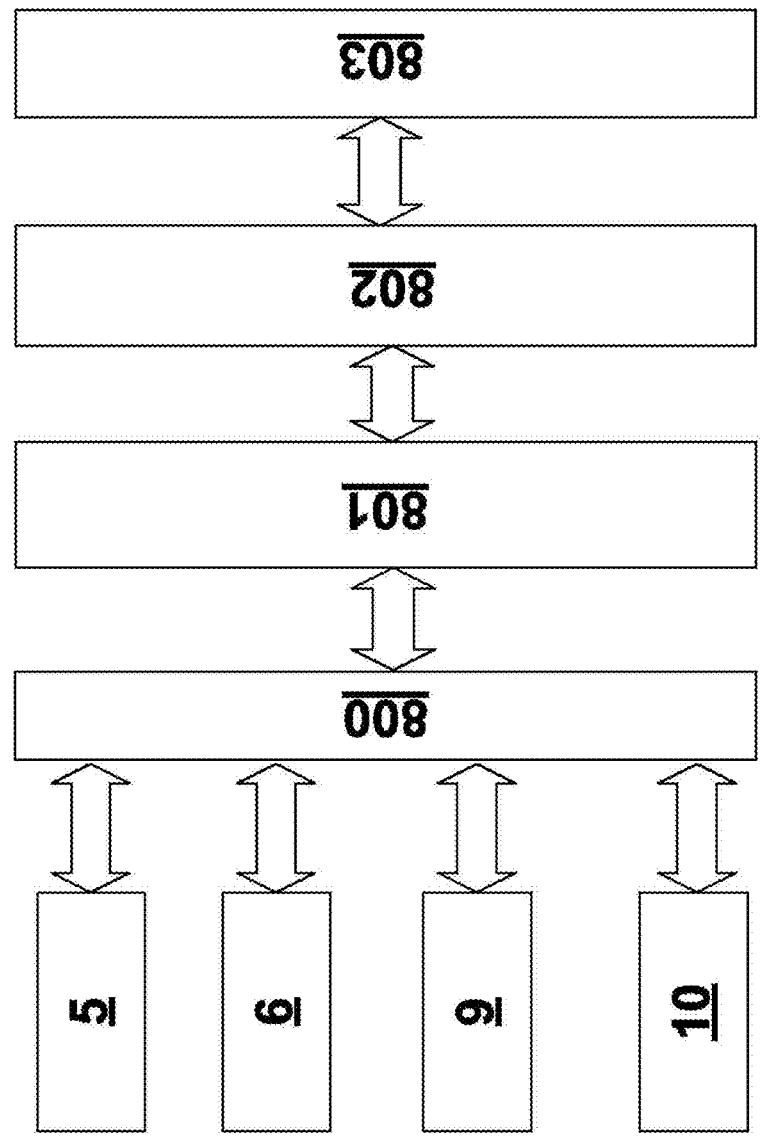
FIG. 34 schematically illustrates a controller for an EOMR, according to an exemplary embodiment of the present disclosure.

FIG. 34 illustrates the input/output control 800 of an EOMR 2000, according to an exemplary embodiment of the present disclosure. The I/O control 800 has bidirectional interfaces with: the peripheral interface adapter (PIA) 5, the 8-bit microprocessor 6, the modem interface 9, and the setup/initialization controller 10. The next module is the read/write control 801. The next module is the address register 802. The next module is the data register 803. As shown, each of these blocks has a bidirectional interface with the preceding and following block.

Figure 35:
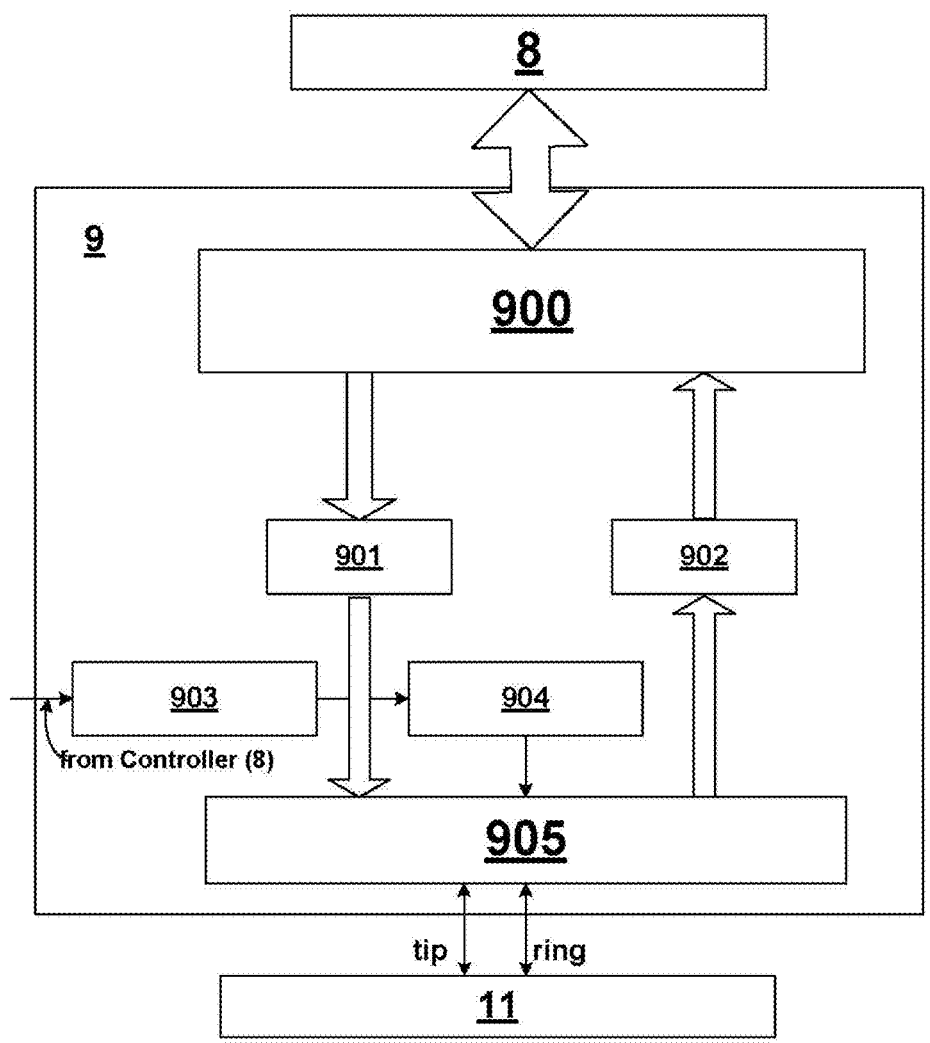
FIG. 35 schematically illustrates a modem interface for the EOMR, according to an exemplary embodiment of the present disclosure.

FIG. 35 is a block diagram illustrating a modem interface 9 of an EOMR 2000, according to an exemplary embodiment of the present disclosure. The accumulated utility usage from the monitored meters is transmitted via a communications medium, for example, a conventional phone line, to the utility billing-office only upon the receipt a validated "access-code" from this same utility billing-office. Therefore, the present disclosure acts 'to-pick-up-the-phone-line-only' upon a simultaneous occurrence of two conditions. Specifically, (a) this usage update-request occurs between a specific, pre-arranged time interval, for example between 3:30 am and 3:45 am, and (b) the update request is preceded by the transmission of a previously agreed to 'access-code.' Limiting usage of a phone line as described herein can help mitigate or eliminate any potential interference between normal uses of the telephone for the time needed to process the utility-usage update which, depending on the number of meters being monitored, can take from one minute to three minutes.

It is further noted that the selection of a specific time internal is totally arbitrary, for illustration purposes only, the time interval as been selected as the 3:30 am to 3:45 am interval, though other times are contemplated and are possible. In some embodiments, the middle of the night, as used in our examples, is a preferred time interval. FIG. 35 shows some interfaces between the controller 8 and the standard phone lines 11. In the 'send-receive' mode, this module is in a static waiting-state until an enable pulse detector interrupt 903 is received from the controller 8. Upon receipt of this interrupt, the ring/tip interface 904 is activated to pick-up the phone line, send a command to the ring/tip interface 905, directing it to send the analog data receive to the demodulator 902, and then to the R/W Address and data control 900 for transmission to the controller 8. The data received will check for a correct access-code, which will validate the request for a utility-usage update. In the reverse 'data-send' mode, the totality of the accumulated utility-usage data for all the monitored meters, meter# by meter #, as received from the controller 8 will be sent to the R/W address and data control 900 and then to the modulator 901, then to the ring/tip interface 905 for transmission to the standard phone line 11 for final reception by the utility company billing-office.

Figure 36:
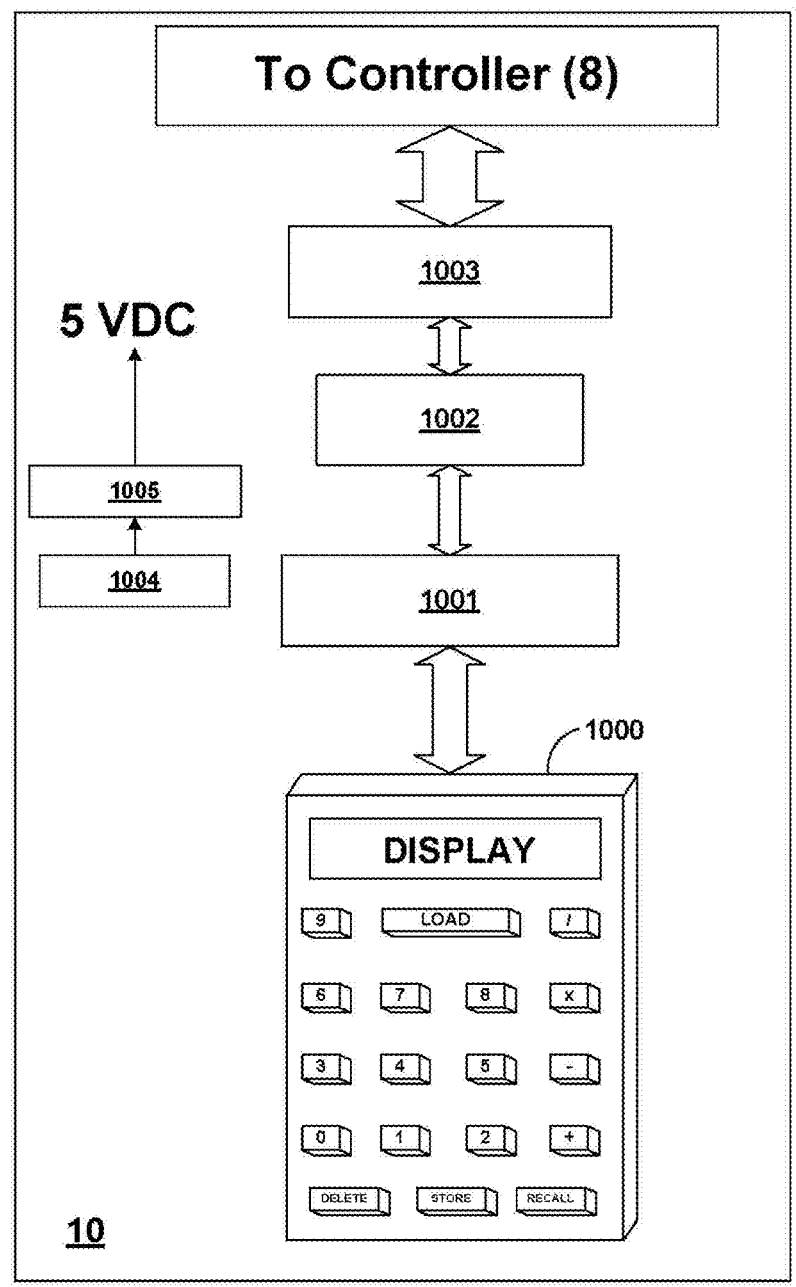
FIG. 36 schematically illustrates a block diagram of a setup/initialization controller for an EOMR, according to an exemplary embodiment of the present disclosure.

FIG. 36 is a block diagram illustrating a setup/initialization controller 10 of an EOMR 2000, according to an exemplary embodiment of the present disclosure. The setup/initialization controller 10 is the interface device that is principally used during the initial set-up and initialization of the present disclosure. Once successful setup and initiation has been completed, the setup/initialization controller 10 can be disconnected from the EOMR 2000. In the unlikely event that any subsequent troubleshooting is needed, the setup/initialization controller 10 device can be reconnected to the EOMR 2000.

Some of the key variables that need to be installed during setup/initialization are: (a) the total number of meters being monitored in this installation, which may be updated if configuration is modified; (b) the predetermined "data-transfer-possible" time-of-day; and (c) current utility-usage for each meter # being monitored as manually read from the dials 12 of this meter #. A more complete list of these 'initialization-parameters' is discussed in detail below.

The "address" and "data" inputs to the setup/initialization controller 10 are created via an I/O entry device 1000 which has a keyboard and a display and can then be loaded to the controller 8 and the 8-microprocessor 6 as required. In a similar manner, during troubleshooting, specific data at specific addresses can be extracted from the EOMR 2000 by use of the setup/initialization controller 10. From the I/O entry device 1000 a bidirectional data stream exists to/from the data/address latch 1001 then a bidirectional data stream exists to/from to the R/W control 1002, and then a bidirectional data stream exists to/from to the data/address R/W control 1003. From there this point, a bidirectional data stream has been established for address and data to the controller 8. During troubleshooting, the address and data travels in a reversed direction. The results are displayed on the I/O entry device 1000. The internal, self contained power supply for this unit comes from a small, internal, +9 VDC Battery 1004 followed by a 5 Volt Regulator 1005.

Referring now collectively to FIGS. 1-36, the present disclosure will now be described in additional detail. The EOMR 2000 accommodates two levels of meter monitoring. In the "basic" monitoring-level installation, the EOMR 2000 utilizes from one to eight EORIS's 15, one for each meter being monitored, and in "large" monitoring-level installation, the EOMR 2000 utilizes from one to sixty-four EORIS's 15, one for each meter being monitored.

The EORIS 15 monitors the location of the pointer 14 associated with a dial 12, for example the last, [$10^1$] dial 12, of each of the meters being monitored. The EORIS's 15 consist of two internal parts. The first internal part, the IED 16, shines/projects a pulsating stream of narrow illuminating IR beams 18 toward the face-plate 13 of the last [$10^1$] dial 12 focused to strike the illuminated area 20. This illuminating IR beam 18 will either (a) bounces back from the face-plate 13 as a relatively strong reflected IR beam 19, or (b) bounces back from the pointer 14 as a relatively weak reflected IR beam 19. In both cases, these reflected IR beams 19 are detected by the second internal part the EORIS 15, the infrared phototransistor 17 which in turn generates an analog voltage whose amplitude is directly proportionate to the intensity of reflected IR beam 19 that has been detected.

The significance of the above relationships to an EOMR 2000 in accordance with the present disclosure is best understood by examining the three states depicted in FIGS. 8-10. It is noted that the pointer 14 is rotating in a clockwise direction. The first state detected by the EOMR 2000, as shown in FIG. 8, is detected when the pointer 14 is not blocking the illuminating IR beam 18 from striking the illuminated area 20 and thus the illuminating IR beam 18 strikes the IR-reflective white/silver surface of the face-plate 13, which has more IR reflectivity, relative to the pointer 14, and therefore the resultant intensity of the reflected IR beam 19 will be relatively high compared to an IR beam reflected off of the pointer 14. This high level of the reflected IR beam 19 striking the detector area of the infrared phototransistor 17 will, in turn, result in the amplitude of its output analog voltage being relatively HIGH.

The second state detected by an EOMR 2000 in accordance with the present disclosure, as shown in FIG. 9, is detected when the pointer 14 has rotated somewhat as a result of additional utility-usage and is now blocking the illuminating IR beam 18 from striking the illuminated area 20. Instead, the illuminating IR beam 18 strikes the IR-absorptive black pointer 14. Because of the relatively poor reflectivity of the pointer 14, the resultant relatively low IR intensity level of the reflected IR beam 19 will strike the detector area of the infrared phototransistor 17 which will, in turn, result in the amplitude of its output analog voltage being relatively LOW.

The third state detected by an EOMR 2000 in accordance with the present disclosure, as shown in FIG. 10, is detected when pointer 14 has rotated some more as a result of additional utility-usage and is now no longer blocking the illuminating IR beam 18 from striking the illuminated area 20. Thus, the illuminating IR beam 18 strikes the reflective white/silver surface of the face-plate 13 which has relatively good IR reflectivity, compared to the pointer 14, and therefore the resultant intensity of the reflected IR beam 19 will be relatively high. This relatively high IR intensity level of the reflected IR beam 19 striking the detector area of the infrared phototransistor 17 will, in turn, result in the amplitude of its output analog voltage being relatively HIGH. As such, there may be a clear association between the outputted voltages derived the infrared phototransistor 17 and the position of the pointer 14 as it rotates around the last dial 12 and the real-time that these voltage samples were made.

Specifically, the high voltage taken at a first time $T_1$, and then somewhat later the low voltage taken at a second time $T_2$, and then somewhat later high voltage taken at third time $T_3$ provides information that is can be directly related to the pointer 14 essentially making one complete rotation. This complete rotation of the pointer 14 carries a direct and well knows specific and precise relationship, using the scale-factor of this specific meter # as stored in the microprocessor 6, with the actual utility-usage data as recorded on the meters being monitored.

As indicated earlier, these analog voltages generated in the infrared phototransistor 17 are converted by the A/D converter 3 to their 8-bit digital equivalents, sent via the PIA 5, to the 8-bit microprocessor 6 for additional processing wherein the aforementioned relationships between the voltages a continuously tracked resulting in a current measure of the utility-usage currently displayed on the meters being monitored. When this accumulated count representing utility-usage is added to the stored utility-usage loaded when the EOMR 2000 was initially installed, or to when utility-usage shown at the last usage update, total utility-usage is developed. To complete the process, upon receipt of a 'valid/confirmed access-code' request from the utility company billing-office, via a standard phone line, at a pre-arranged specific time-of-day, the present disclosure proposed herein will send this total utility-usage, meter-by-meter, as the case may be, back to the utility billing-office via the same phone line.

In the preferred implementation, the EORIS 15 as utilized in the proposed disclosure is operated in its standard implementation and in its standard interconnection as shown in FIGS. 12, 27, and 28. As stated earlier, there are several alternative parts to the preferred HOA1180-003 that are acceptable. Such an example alternate part would be HOA 1180-002. In addition, two structural variations are also fully acceptable for use in an EOMR 2000, in accordance with the present disclosure. The first structural variation, described in FIG. 4b, has the IR illuminating device and the IR detection device packaged in separate small plastic cases. The second structural variation, described in FIG. 6b, has the EORIS 15 mounted directly to the face-plate 13 over the dial 12, for example, the last dial 12. All these functional and structural variations are fully acceptable in various embodiments of the present disclosure.

Te BCD to decimal decoder 2 is commercially available and the present disclosure utilizes it in a fully conventionally manner. An example of this device is the 74LS42. However, any equivalent device will be fully acceptable for use in accordance with the present disclosure. The detail translation for the BCD to decimal conversion is depicted in FIG. 26. It is hereby noted, however, that in the present disclosure, this device uses only three, (A-B-C), of the available four (A-B-C-D) control lines to select from one to up to eight cathodes 193 from up to eight IED's 16. FIGS. 24 and 27 show the interface between these eight cathodes 193 and the BCD to decimal decoders 2. Specifically, FIG. 26 illustrates the eight inputs to this device as: (a) the cathode 193 from the EORIS 15 of meter #1 selected/activated at Pin #1 (0; (b) the cathode 193 from the EORIS 15 of meter #2 is selected/activated at Pin #2; (c) the cathode 193 from the EORIS 15 of meter #3 is selected/activated at Pin #3 2; (d) the cathode 193 from the EORIS 15 of meter #4 is selected/activated at Pin #4 3; (e) the cathode 193 from the EORIS 15 of meter #5 is selected/activated at Pin #5 4; (f) the cathode 193 from the EORIS 15 of meter #6 is selected/activated at Pin #6 5; (g) the cathode 193 from the EORIS 15 of meter #7 is selected/activated at Pin #7 6; and (h) the cathode 193 from the EORIS 15 of meter #8 is selected/activated at Pin #9 7.

A feature of the present disclosure is the utilization of a sequence-serialized 'sample-data' approach controlled by the 8-bit microprocessor 6, to operate the interface with the EORIS's 15. In the "basic installation" this 'sample-data' monitoring is achieved by having the BCD to decimal decoder 2, sequentially selecting one of eight EORIS's 15, as directed by the 3-Bit control line (A-B-C) data, received from the PIA 5, as generated by the 8-bit microprocessor 6. Having thus directed, the BCD to decimal decoder 2 applies a "ground" to the cathode 193 side of the IED's 16 (See FIGS. 24 and 27), thereby turning the IED 16 on and causing the IED 16 to generate an illuminating IR beam 18. This activation of the selected one to eight IED's 16 is maintained for a very short period of time, e.g., approximately four milliseconds, creating a narrow pulse of infrared energy focused on the illuminated area 20 on the face-plate 13 below/behind the rotating pointer 14 of a dial 12, for example, the last dial 12.

FIGS. 12 and 27 show a more detailed processing schematic that shows the interconnections between the BCD to decimal decoder 2 and the IED's 16 for up to eight meters. FIGS. 13 through 15 provide a set of detailed timing diagrams for this 'sample-data' approach.

Although FIGS. 12 and 27 were used earlier to discuss the "basic installation" and only shows detailed processing interconnection schematic for eight meters, a very similar, but expanded, processing interconnection schematic would apply to the "large installation" for sixty-four meters shown in FIG. 2. For each group of eight EORIS's 15, the present disclosure requires one additional BCD to decimal decoder 2 and one additional A/C converter 3. In the full-up "large installation," eight BCD to decimal decoders 2 and eight A/C converters 3 are needed to achieve the sixty-four meter monitoring capability. The other units in the proposed disclosure do not have to be replicated because the proposed design assures that all processing is performed by high speed digital devices that can easily support the monitoring of sixty-four meters. This capability of the proposed disclosure is further supported in analyzes of the processing load time-margin as it applies to both the "basic" and the "large" installations.

FIG. 13 shows a timing diagram for the slot-timing detail of the present disclosure. FIG. 13 forms the first in a series of four timing diagrams for the steps involved in the EOMR 2000 processing of the electro-optical signals that are used to monitor the rotation and location of the pointer 14 over the dial 12. The basic time element in the proposed disclosure is the 'slot' 28. The slot 28 is 4.0 milliseconds in duration. The IED 16 is given an emitted diode stabilization time 29 shown as 0.20 milliseconds in the timing diagram. This emitted diode stabilization time 29 is followed by a processing time of 0.2 milliseconds for A/D conversion—select input & convert 30 to convert the analog voltage from the infrared phototransistor 17 to its digital equivalent $V_1$. The timing sequence then provides 0.1 milliseconds to store $V_1$ 31 in the 8-bit microprocessor 6. This entire sequence is called the $1^{st}$ sample. The second sequence begins with of 0.2 milliseconds processing time for A/D conversion—select input & convert 32 to convert the analog voltage from the infrared phototransistor 17 to its digital equivalent $V_2$. The timing sequence then provides 0.1 milliseconds to Store $V_2$ 33 in the 8-bit microprocessor 6. This entire sequence is called the $2^{nd}$ Sample. The third sequence begins with 0.2 milliseconds processing time for A/D conversion—select input & convert 34 to convert the analog voltage from the infrared phototransistor 17 to its digital equivalent $V_3$. The timing sequence then provides 0.1 milliseconds to store $V_3$ 35 in the 8-bit microprocessor 6. This entire sequence is called the $3^{rd}$ Sample. In order to eliminate the effects of 'noise' that is typical high speed digital processing, the proposed disclosure averages these three voltages, $V_1+V_2+V_3$ to develop averages $V_{Avt1}$ 36. To further mitigate the effects of occasionally encountered system noise, the present disclosure discards any of the three voltages [$V_1$ or $V_2$ or $V_3$] 37 that differ by more than 25% from the average voltage $V_{Avt1}$ 36 leaving Averages $V_{Avt2}$ 38. The resultant, $V_{sample\ \#1}$, is stored 39 in the 8-bit microprocessor 6. The result of this timing analysis shows that there is 1.4 milliseconds or 35% of spare time 40 remaining.

Further analysis of the necessary processing time for a "basic installation" that supports eight meters is shown in FIG. 14 which develops the sample-timing details for the 'sample' that represents the processing activity for three successive slots 28. As described in relation of the processing shown in FIG. 13, at the end of the first slot 28, the measurement in slot #N [$V_{Sample\ \#1}$] 41 has been developed, and this takes 4.0 milliseconds. This process is repeated for the second slot 28 in developing the measurement in slot #N [$V_{Sample\ \#2}$] 42 and this takes an additional 4.0 milliseconds. In the third slot 28, further averaging of the data samples is performed where the average of these two voltages ($V_{Sample\ \#1}$ and $V_{Sample\ \#2}$) 43 is developed and stored in the 8-bit microprocessor 6 as $V_{Final}$ and this takes an additional 4.0 milliseconds. The trace 44 shows the entire 3 slot process associated with this meter as taking 12 milliseconds, i.e., 3×4.0 milliseconds The trace 45 shows the total processing time duration for the "basic installation" which supports eight meters as requiring 96.0 milliseconds, i.e., 8×12.0 milliseconds=96 milliseconds.

FIG. 15 shows the overall multiple-meter slot timing for eight meters as would be the case in the 'basic installation'. As explained earlier in FIG. 14, the present disclosure provides for multiple sampling and averaging of all data collected thereby significantly reducing the effects of electrical noise inherent in all data sampling systems. FIG. 15 provides a simplified overview for eight meters being monitored. The sampling of the first meter, meter #1 or $V_{Sample\#1}$, is shown in trace 46a as taking 12.0 milliseconds. Similarly, the sampling of the second meter, meter #2 or $V_{Sample\#2}$, is shown in trace 46b as also taking 12.0 milliseconds. Similarly, the sampling of the third meter, meter #3, $V_{Sample\#3}$, is shown in trace 46c as also taking 12.0 milliseconds. In order to simplify the sketch, meter #4 through meter #7 are not explicitly shown but it is clear that they have the same timing sequence. FIG. 15 then shows meter #8, or $V_{Sample\#8}$, in trace 46h. Each of these meters being monitored has a substantially identical processing sequence, and each one requires 12 milliseconds to complete. The overall timing for eight meters requires eight 'samples' wherein each 'sample' consists of three slots 28. Therefore, a total of twenty four slots 28 would be required for processing eight electricity, gas, and/or water meters. This equates to a total time of 96.0 milliseconds, i.e., twenty-four slots 28=24×4 milliseconds or eight samples or 8×12 milliseconds=96 milliseconds.

FIG. 16 shows a timing diagram for the "large installation" of sixty-four EOMR's 100 as previously detailed in FIG. 2. As has been shown in FIG. 14, the timing trace for one group, namely meter #1 through meter #8, would require three sample periods 41 or a total of 96 milliseconds. For each additional group of eight meters, namely, group #2 being meter #9 through meter #16, group #3 being meter #17 through meter #24, group #4 being meter #25 through meter #32, group #5 being meter #33 through meter #40, group 6 being meter #41 through meter #48, group 7 being meter #49 through meter #56, and group 8 being meter #57 through meter #64, an additional 96 milliseconds are required 47. Thus, the total processing time for eight groups of eight meters each, or sixty-four meters, would require 8×96 milliseconds or 768 milliseconds 48. On a one second processing-time baseline, this shows a time margin of 0.232 seconds, i.e., 1.0 second−0.768 second=0.232 seconds, or 23.2% of spare time 49.

In summary, as has just been shown, for both the "basic" and the "large" installations, the present disclosure provides significant positive processing-time margins. Specifically, utilizing the 'sample-data' monitoring approach, in the "basic installation" for eight meters, EOMR's 100 according to the present disclosure provides a processing-load time margin, i.e., a reserve, of 35%, and in the "large installation" for sixty-four meters, EOMR's 100 in accordance with the present disclosure provide a processing-load time margin, i.e., a reserve, of more than 23%.

It is noted that, although the timing traces detailed in FIGS. 13-16 are precise, they are derived based on using a reasonable and readily available set of digital devices. It is fully recognized that there are many other similar devices that may/will have slightly different processing time throughputs and this would therefore result in somewhat different timing traces. However, as this set of four timing-traces show, the present disclosure assures that there is a very significant processing-time margin even in the sixty-four "large installation" case. It is thus clear that the EOMR 2000 can and will work in a similar manner if some or if all of the specific devices shown are replaced with an equivalent set of other similar devices. The exact devices shown in this description of the present disclosure have been selected to provide an easily understood and coherent example for a reasonable implementation of an exemplary embodiment of the present disclosure.

Additional details concerning the schematic and block diagram interconnection between the EORIS's 15 and the BCD to decimal decoder 2 are provided in FIG. 27, as described above. The BCD to decimal decoder 2 utilized in the EOMR 2000 is operated in its standard implementation and its standard interconnection as shown in FIG. 27. As stated earlier, the BCD to decimal decoder 2 described in the present disclosure is a commercially available 74LS42 (or equivalent). Since this device is used in the present disclosure in a fully conventional and interconnected manner, it should be understood that any equivalent device to the one described would be fully acceptable.

The A/D converter 3 is located inside the control box 90 of the EOMR 2000. The A/D converter 3 is a commercially available device. An acceptable example of this A/D converter 3 is the ADC0808. However, any equivalent device will be fully acceptable for use in accordance with the EOMR 2000 of the present disclosure. In the present disclosure, the A/D converter 3 is used to convert up to eight analog voltages that are generated in the infrared phototransistor 17 into their 8-bits digital equivalent. These one to eight analog signals are inputted to the 8 channel multiplexing analog switches 300, and under control of the octal-selection line (A-B-C) received from the PIA 5, as generated by the 8-bit microprocessors 6, are sequentially selected to be converted to their 8-bit digital equivalents. FIG. 1 shows an overview block-diagram of the "basic installation" of the EOMR 2000 Similarly, in the "large installation" of the EOMR 2000, up to sixty-four EORIS's 15 generate up to sixty-four analog voltage outputs. These analog voltages, in groups of eight each, are sequentially routed under the control of the same 3-Bit control lines (A, B, C) discussed earlier, into the internal 8-channel multiplexing analog switches 300 of up to eight additional A/D converters 3. These devices are part of the additional hardware needed in expanding from the "basic installation" to reach the "large installation" wherein up to sixty-four analog voltages are converted, group by group, to their 8-bit digital equivalents.

FIG. 28 shows the interface between all the emitters 195 of the infrared phototransistor 17 and the inputs of the A/D converters 3 for the 'basic installation.' Specifically, FIG. 28 shows: (a) the emitters 195 of the infrared phototransistor 17 from meter #1 inputted to Pin #26 1N0; (b) the Emitters 195 of the infrared phototransistor 17 from meter #2 is inputted to Pin #27 1N1; (c) the Emitters 195 of the infrared phototransistor 17 from meter #3 is inputted to Pin #28 1N2; (d) the Emitters 195 of the infrared phototransistor 17 from meter #4 is inputted to Pin #1 1N3; (e) the Emitters 195 of the infrared phototransistor 17 from meter #5 is inputted to Pin #2 1N4; (f) the Emitters 195 of the infrared phototransistor 17 from meter #6 is inputted to Pin #3 1N5; (g) the Emitters 195 of the infrared phototransistor 17 from meter #6 is inputted to Pin #4 1N6; and (h) the Emitters 195 of the infrared phototransistor 17 from meter #7 is inputted to Pin #5 1N7. The resultant 8-bit digital equivalents developed from the analog voltage outputs generated by the infrared phototransistors 17 are sent by the tri-state output latch buffer 301 to the PIA 5.

FIG. 28 shows the specific pin numbers associated with these 8-bit digital values. Specifically they are: (a) $2^{-1}$ on Pin 21; (b) $2^{-2}$ on Pin 20; (c) $2^{-3}$ on Pin 19; (d) $2^{-4}$ on Pin 18; (e) $2^{-5}$ on Pin 8; (f) $2^{-6}$ on Pin 15; (g) $2^{-7}$ on Pin 14; and (h) $2^{-8}$ on Pin 17. These 8-bit digitized voltages are sent, under the control of the same 3-Bit control lines (A-B-C) discussed earlier to the 8-bit microprocessor 6 where 'noise-reduction' and 'signal-averaging' processing is applied. These 'noise-reduction' and 'signal-averaging' processing routines are detailed in a set of subroutines whose flowcharts are detailed in FIGS. 17-23. After this processing, these digitized voltages are stored in memory locations associated with the meters from which these voltages were derived.

Additional details regarding the schematic and block diagram interconnection between the EORIS's 15 and the A/D converter 3 are provided in FIG. 28. The A/D converter 3 utilized in the EOMR 2000 is operated in its standard implementation and in its standard interconnection as shown in FIG. 28. As stated earlier, the A/D converter 3 described in the present disclosure is a commercially available ADC0808 (or equivalent). Any device substantially equivalent to the one described would be fully acceptable for the A/D converter 3 of the present disclosure.

The power supply 4 is located inside the control box 90 of the EOMR 2000 and provides all the +5 VDC power utilized by all the units with exception of the setup/installation controller 10, which has its own separate built-in +5 VDC power supply. As shown in FIG. 29, the first module in the power supply 4 in an automatic battery charger 400 whose input is conventional 110 VAC to 240 VAC 50 Hz-60 HZ). In the "basic installation" there is only a single battery 401a to be charged. This is a 12 VDC Battery 401 and is rated at 7 ampere—hours (AH). In the "large installation," there is room for three optional, additional, batteries 401b, 401c, 401d, as described above. This battery section is followed by a standard commercially available one-chip 5 VDC regulator 402 that provides a stable well regulated clean 5 VDC output. This regulator is a commercially available one-chip regulator that has a current rating of 1 Amp. A suitable example of the 5 VDC regulator 402 is the LM 7805.

When operating on battery-only power, which would be the case in the event of an AC power outage, for the "basic installation" with a single battery 401a, full operation of the proposed present disclosure can be sustained for up to approximately 132 hours, i.e., approximately 5.5 days. In this "basic installation," if there are concerns of frequent and/or extended power outages, one can use the large control box 91, which has physical space for up to three additional batteries. Therefore, if three additional batteries 401b, 401c, 401d are installed, full operation can be maintained for an additional 396 hours, thus providing a total of 528 hours or approximately 22 days. As explained above, EOMR's 100 according to the present disclosure use sampled-data sequential design, as shown in FIG. 2. Thus, none of the data-processing units need to be replicated in going from the 'basic installation to the "large installation," thereby minimizing the drain on the battery. Therefore, even for the "large installation" operating with a single battery 401a, in the event of a power outage, full operation can be sustained for up to approximately 110 hours, i.e., approximately 4.5 days. Furthermore, in the "large installation," if there are heightened concerns of frequent, extended power outages, one can add three additional batteries, 401b, 401c, 401d, and in so doing can extend full operation for an additional 330 hours, thereby providing a total of 440 hours or approximately 18.3 days of full operation. Additional details were described above with reference to FIG. 29.

The peripheral interface adapter (PIA) 5 is located inside the control box 90. A commercially available example of this PIA 5 device is the Motorola 6821, however, any equivalent device would be fully acceptable for use in an EOMR 2000 according to the present disclosure. The PIA 5 is the main two-way 8-bit interface between the 8-bit microprocessor 6 and the A/D converter 3, and the BCD to decimal decoder 2. The PIA 5 has multiple input/output (I/O) registers and is suitable to control, monitor and distribute the digital data flowing into and out of the 8-bit microprocessor 6 that is the "brain" of the present disclosure. Additional details are provided with reference to FIG. 30 above.

The specific functional configuration of the PIA 5 can be programmed during initial EOMR 2000 setup by the controller 8. Specifically, the unit provides: (a) the principle I/O to the PIA 5 from the 8-bit microprocessor 6 and the controller 8 is routed through a set of data bus buffer 500; (b) the data direction register A 501 and the data direction register B 510; (c) the output register A 503 and the output register B 506; (d) the control register A 502 and the control register B 509; (e) the peripheral interface A 504 and the peripheral interface B 507; (f) the bus input register 505; and (g) the chip select and R/W control 508. As shown in FIG. 30, the data I/O between the PIA 5 and the 8-bit microprocessor 6 for these signals are: (a) D0 Pin 33; (b) D1 Pin 32; (c) D2 Pin 31; (d) D3 Pin 30; (e) D4 Pin 29; (f) D5 Pin 28; (g) D6 Pin 27; and (h) D7 Pin 26. Similarly, the principle inputs to the PIA 5 from the A/D converter 3 are the digitized 8-bit voltages from the EORIS's 15. These inputs are routed through the peripheral interface A 504. They are: (a) PA0 Pin 2; (b) PA1 Pin 3; (c) PA2 Pin 4; (d) PA3 Pin 5; (e) PA4 Pin 6; (f) PA5 Pin 7; (g) PA6 Pin 8; and (h) PA7 Pin 9. The PIA 5 also provides the one of eight control lines [A-$2^0$; B-$2^1$ and C-$2^2$] on Pin 10, Pin 11 and Pin 12 that sequentially selects which of the cathodes from the IED 16 are to be taken to ground, and which of the emitters of the infrared phototransistor 17 are to be routed to the A/D converter 3.

The peripheral interface adapter (PIA) 5 utilized in the EOMR 2000 is operated in its standard implementation and in its standard interconnection as shown in FIG. 30. As stated earlier, the PIA 5 described in the present disclosure is a commercially available Motorola 6821 (or equivalent).

The 8-bit microprocessor 6 is located inside the control box 90 of the EOMR 2000, is a commercially available device, and the present disclosure utilizes the 8-bit microprocessor 6 in a fully conventionally manner. A suitable commercial example of this 8-bit microprocessor 6 device is the Motorola 6800. However, any equivalent 8-bit microprocessor device would be fully acceptable for use in an EOMR 2000 according to the present disclosure.

The 8-bit microprocessor 6 in the present disclosure is the computational device that (a) keeps 12/24 real time, (b) generates slot-timing 24 interrupts as shown in FIGS. 13-16, and (c) executes the subroutines described in FIGS. 17-23. The 8-bit microprocessor 6 has a two-way bidirectional interface carrying data and control with the PIA 5 which, in-turn, controls the BCD to decimal decoder 2 and the A/D converter 3. It also has a two-way bidirectional interfaces carrying data and control with the static RAM 7 and with the controller 8.

The 8-bit microprocessor 6 continuously analyzes the ongoing stream of digital voltages from the A/D converter 3. As described above, the analysis of a sequence of HIGH-LOW-HIGH voltages outputted by the infrared phototransistor 17 shows a direct relation to the intensity of the reflected IR beam 19. This change in IR intensity is in turn directly related to the location of the pointer 14 as it rotates around a dial 12, for example, the last dial 12. The accumulation of the number of times that the HIGH-LOW-HIGH sequence occurs for this meter # is related to the number of times that the pointer 14 for this meter has made a complete rotation. As long as the timing of the EOMR 2000 is set correctly, each HIGH-LOW-HIGH sequence represents one rotation of the pointer 14. Similarly, the accumulated number of the complete rotations of the pointer 14 of the dial 12 for a particular utility meter being monitored is directly related to and equal to the total utility-usage that has been measured by this meter. Additional details are described above with reference to FIGS. 12 and 31.

Other major inputs and outputs to the 8-bit microprocessor 6 from the PIA 5 have been defined in FIGS. 28 and 30. FIG. 31 provides a description of the remaining major input between the 8-bit microprocessor 6 and the static RAM 7. As shown in the FIG. 31, these are the ADDRESS inputs and the DATA inputs. The ADDRESS inputs from the static RAM 7 are: (a) A0 at Pin 9; (b) A1 at Pin 10; (c) A2 at Pin 11; (d) A3 at Pin 12; (e) A4 at Pin 13; (f) A5 at Pin 14; (g) A6 at Pin 15; (h) A7 at Pin 16; (i) A8 at Pin 17; (j) A9 at Pin 18; and (k) A10 at Pin 19. Similarly, the DATA inputs from the static RAM 7 are: (a) D0 at Pin 33; (b) D1 at Pin 32; (c) D2 at Pin 31; (d) D3 at Pin 30; (e) D4 at Pin 29; (f) D5 at Pin 28; (g) D6 at Pin 27; and (h) D7 at Pin 26.

The control logic that provides for the one to eight selection for both the BCD to decimal decoder 2 and the tri-state latch buffer 301 in the A/D converter 3 is distributed via the PIA 5, and it is originated in the 8-bit microprocessor 6. As shown in FIG. 31 these three signal lines are provided at Pin 18, Pin 20, and Pin 21.

The 8-bit microprocessor 6 utilized in the EOMR 2000 is a commercially available Motorola 6800 (or equivalent). It should be understood, however, that any equivalent device to the one described would be fully acceptable.

The static RAM 7 is a commercially available 2048×8-bit memory device and the EOMR 2000 uses the static RAM 7 in a conventional manner. Examples of such a device are the HM6116LP, HM611LP-3, and HM611LP-4. Any equivalent device would be fully acceptable for use in an EOMR 2000 made or used in accordance with the present disclosure.

FIG. 32 provides a simplified block-diagram of the static RAM 7. The unit contains a row decoder 700 that accepts inputs A0 through A6 and the column decoder I/O 705 accepts inputs A7 through A10. The input data control 703 drives the column I/O 704. Both the row decoder 700 and the column I/O 704 access the 128×128 memory matrix 701. In addition, as shown in FIG. 32, inputs I/O 0 through I/O 8 drive the input data control 703. The controller 8 provides I/O to load the contents of the static RAM 7 to the 8-bit microprocessor 6. FIG. 33 shows the major outputs from the static RAM 7 to the 8-bit microprocessor 6. The ADDRESS outputs are: (a) A0 at Pin 8; (b) A1 at Pin 7; (c) A2 at Pin 6; (d) A3 at Pin 23; (e) A4 at Pin 4; (f) A5 at Pin 3; (g) A6 at Pin 2; (h) A7 at Pin 1; (i) A8 at Pin 23; (j) A9 at Pin 22; and (k) A10 at Pin 19. Similarly, the DATA outputs are: (a) I/O$_0$ at Pin 9; (b) I/O$_1$ at Pin 10; (c) I/O$_2$ at Pin 11; (d) I/O$_3$ at Pin 13; (e) I/O$_4$ at Pin 14; (f) I/O$_5$ at Pin 15; (g) I/O$_6$ at Pin 161; and (h)I/O$_7$ at Pin 17.

The flow-diagrams presented in FIGS. 17-23 describe some subroutines executed by software, the instructions for which are in the static RAM 7. It is estimated that 1200-1500 8-bit words would be needed for the execution and storage requirements required in the "large installation" case for sixty-four meters and somewhat less than that for the "basic" 8 meters case. With this device having been sized at 2048 words (of 8-bit width), a significant amount of memory margin is anticipated.

The controller 8 contains the bidirectional digital control and interface between the peripheral interface adapter 5; the 8-bit microprocessor 6; the static RAM 7; the modem interface 9; and the setup/initialization controller 10. During the initial setup of the EOMR 2000, the controller 8 loads the software program from the static RAM 7 into the 8-bit microprocessor 6 and loads all meter-specific parameters into static RAM 7. After initial set-up, upon receipt of a verified update-request from the utility billing-office, the controller 8 interfaces with the 8-bit microprocessor 6 and the modem interface 9 to send the stored utility-usage data to the utility billing-office.

The controller 8 contains an input/output control 800 that is the main bidirectional interfaces with the outside world. This input/output control 800 has a bidirectional interface with the read/write control 801, which has a bidirectional interface with the address register 802, which has a bidirectional interface with the data register 803. The controller 8, as utilized in the EOMR 2000, is a general purpose bidirectional R/W interface device. This controller is conventional and a number of alternate controller configurations are equally acceptable. It is hereby noted that the EOMR 2000 does not have any special high-speed or complex interface requirements, therefore any general purpose 8-bit bidirectional R/W interface device would suffice and therefore no specific, or overly detailed implementation is offered. The purpose of selecting a candidate selected configuration, in a generalized manner, is to illustrate the overall concept.

The modem interface 9 is located inside the control box 90 and is designed with a small number of standard commercially available digital devices. The modem interface 9 is used as a typical two-way interface controller with a standard analog phone line. FIG. 35 depicts an overview block diagram of the modem interface 9. Within the modem interface 9, the ring/tip interface 905 is connected directly to the tip/ring lines of the standard phone line 11. The ring/tip interface 905 feeds the ring detector 904, which monitors the ring/tip interface 905. However, this ring/tip interface 905 is only activated to pick-up the line upon receipt of an enable pulse detector interrupt from the controller 8. This interrupt is originated in the 8-bit microprocessor 6 that has the "time of day timing loop" subroutine, as described above with reference to FIG. 21. The time of day timing loop subroutine (a) keeps conventional 12 hr or 24 hr time; and (b) constantly monitors a time-of-day to see if the time is, for example, between 3:00 am to 4:00 am. If the time-of-day condition is met, a 'data-transfer-possible' 142 interrupt is generated, as mentioned above with reference to FIG. 21. After this interrupt is received by the enable pulse detector 903, the ring detector 904 is activated and it begins to monitor and respond to the ring/tip interface 905 that has been monitoring the "tip" and "ring" of the standard phone line 11.

This operates as follows: If the current day is the day when the utility company billing-office is scheduled to request an update, and if the current time is the appropriate time-of-day, for example, within the 3:00 am to 4:00 am window set forth above, the utility company billing-office initiates call to the standard phone line 11. The ring detector 904 having been activated "picks-up" the phone. The computer/modem at the utility company billing-office generates the agreed-to "access code." In the EOMR 2000, the demodulator 902 sends this data to the R/W address and data control 900, which sends the access code data, via the controller 8, to the 8-bit microprocessor 6. Having received this data, the 8-bit microprocessor 6 enters the subroutines detailed in FIG. 22 in an attempt to validate the presented "access code."

Upon the receipt of a successful and validated request, the 8-bit microprocessor 6 enters the subroutine described in FIG. 23, fetches, and subsequently sends the utility-usage data for all the meters being monitored, via the controller 8, back to the modem interface 9. It is noted herein that the data sent back can be for just the single meter being monitored or for sixty-four meters being monitored. The R/W address and data control 900 receives this data and sends it to the modulator 901, which converts this digital data to the standard-phone analog format and sends it to the ring/tip interface 905, which in turn sends the data to the standard phone line 11 to be received by the modem/computers at the utility company billing-office.

It is to be noted that the EOMR 2000 performs all these two-way data transfers with the modem interface 9 in an off-line manner. This means that the EOMR 2000, even during these update periods, when two-way data transfers between the modem interface 9 and the utility company billing-office are taking place, continues monitoring off all meters.

The modem interface 9, as utilized in the EOMR 2000, is a general purpose bidirectional R/W modem interface for use with a typical analog phone line. This unit contains standard, commercially available modulator/demodulator [MODEM] interface devices. Any general purpose 8-bit bidirectional R/W interface device for use with a typical phone line would serve the EOMR 2000 I/O needs in an adequate manner.

In the illustrated embodiment, the setup/initialization controller 10 is not located in the control box 90, instead being enclosed within its own case. It should be understood that this embodiment is exemplary. The setup/initialization controller 10, as depicted in FIG. 36, is the interface device that is used during EOMR 2000 installation. Once successful setup and initiation has been completed, the setup/initialization controller 10 can be disconnected from the EOMR 2000. In the unlikely even that subsequent troubleshooting is needed, the setup/initialization controller 10 device can be reconnected to the EOMR 2000. During the installation, certain key parameters needed for proper operation are entered. Among these parameters are: (a) the total number of meters being monitored in this installation, a number that can be updated if configuration is modified; (b) the initial $V_{Ref}$, i.e., reference voltage, for each meter being monitored from the infrared phototransistor 17 generated from a reflected IR beam 19 from the white/silver portion of the face-plate 13 on the meter; (c) the predetermined "access-code(s) for these meters; (d) the predetermined "data-transfer-possible" time-of-day; (e) the predetermined "failure-codes" in the event that successful communication with the utility billing-office cannot be established; (f) current utility-usage for each meter being monitored as manually read from the dials 12; and (g) the 'scale-factor' for this particular meter # that relates one complete rotation of the pointer 14 for last dial 12 to the specific utility-usage, e.g., kWh for electricity, cubic feet for gas, gallons for water, and the like, that has been recorded.

The inputs to the setup/initialization controller 10 are created via an I/O entry device 1000. Once the 'data' and the related 'address' information is entered via the keyboard, a LOAD command is generated which results in this address/data being stored in the data address latch 1001. A WRITE command is then fetched from the R/W control 1002, which permits the data/address R/W control 1003 to write this data at the appropriate address in the controller 8, and the 8-bit microprocessor 6 as appropriate. This process is repeated, word/address by word/address, until all the setup and initialization data has been successfully entered.

In the event that some specific data is needed during troubleshooting, the sequence described above is repeated except in this case it is reversed wherein, a READ command is generated which results in this address/data READ request being generated in the data/address R/W control 1003 and is sent to the controller 8. The controller 8 responds to this request, fetches the data from the 8-bit microprocessor 6. The requested data is sent to the R/W control 1002, which in turn sets the WRITE line to 'active' and send the data to the data/address latch 1001, which in turn displays it on the I/O entry device 1000 display. This process is repeated, word/address by word/address, until all the requested data has been fetched and displayed on the I/O entry device 1000. It is noted that whenever a sequence of troubleshooting is performed, the EOMR 2000 is essentially in an "off-line" condition. During this troubleshooting interval, the meter-meter is not monitoring the utility meters. Therefore, after troubleshooting is successfully completed, a complete setup and re-initialization must be redone.

The setup/initialization controller 10, as utilized in the EOMR 2000, is a general purpose bidirectional R/W interface device. As depicted in FIG. 36, the setup initialization controller 10 is shown in a conceptual implementation. Any general purpose 8-bit two-way bidirectional R/W interface device would be acceptable to the proposed disclosure since the EOMR 2000 does not have any special speed or interface requirements.

In providing a description of the elements of the EOMR 2000, it is important to note that this disclosure uses electronic and software elements in which all of the devices defined or their equivalents are needed for proper operation. As such, in some embodiments there are no sub-elements involved. As such, the EORIS 15, the BCD to decimal decoder 2, the A/D converter 3, the peripheral interface adapter (PIA) 5, the 8-bit microprocessor 6, would be "main-elements," and the power supply 4, the static RAM 7, the controller 8, the modem interface 9, and the setup/initialization controller 10 may be "support-elements" in some embodiments.

While various contemplated embodiments of the present disclosure have been disclosed, described, and illustrated above, numerous variations of the systems and methods disclosed herein are contemplated. In discussing 'alternate variations' of the present disclosure it is noted that all the infrared optical devices/parts and all the digital devices/parts defined and described herein in this specification are commercially available and in all cases there are a great many fully-equivalent substitute devices/parts that are acceptable for use in the EOMR 2000.

There are, however, two 'structural variations' of particular note. The first structural variation with substantially identical functional features is in the selection of the specific packaging for the IR illumination and the IR detection devices used in the EOMR 2000 according to the present disclosure. Whereas, in the baseline/preferred version, the EORIS 15 contain both the IED 16 and infrared phototransistors 17 in single small package as shown in FIG. 4a, in this first structural variation, shown in FIG. 4b, the "infrared-illumination" function is performed by a separate infrared diode 22 housed in a separate small plastic case 25 and the "infrared-detection" function performed by a separate infrared detector 24 is also housed in a similar, separate small plastic case 25.

Since these two devices are housed in separate plastic cases, the present disclosure provides an adjustment mechanism to determine the point on the face-plate 13 where the illuminating IR beam 18 will strike thus specifically defining, the location of the illuminated area 20. It is clear that this same adjustment mechanism also permits the angle that the infrared detector 24 will be focused on to be changed. This adjustment mechanism is the adjustment screw 27 and the fixed plastic strap 26. The adjustment screw 27 is turned counter-clockwise, i.e., loosened, to move the focal point closer to the front of the meter. As the adjustment screw 27 is turned clockwise, i.e., tightened, the focal point is moved further away from the front of the meter. Obviously the threads on the adjustment screw 27 may be reversed without departing from the scope of the present disclosure. The above-described adjustments allow the installation of the EOMR 2000 in situations where the distance between the meter glass/plastic dial-cover 21 and the face-plate 14 is difficult to ascertain in advance.

The second structural variation of note is selecting where the infrared reflective sensor 15 is mounted. While in the baseline/preferred version, the EORIS 15 is mounted on the outside of the meter glass/plastic dial-case 21 as shown in FIG. 6a, this second structural variation, shown in FIG. 6b, has the infrared reflective sensor 15 inside or under the meter glass/plastic dial-case 21, and attached, with a suitable adhesive or connector, for example, two-sided tape 23, to the face-plate 13 over the last dial 12. This variation is principally applicable in the case of electrical meters where it is practical to remove/re-position the meter glass/plastic dial-case 21. It is noted that the EOMR's 2000 made and used in accordance with the present disclosure, may be used with meter, e.g., an electric, gas, and/or water meter, that can accommodate inside-the-case or outside-the-case mounting. The user chooses whether to mount the EOMR 2000 inside-the-case or outside-the case.

EOMR's 2000 made and/or used in accordance with the present disclosure operate on "geared-type" utility meters. As a utility meter of the "geared-type" measures and accumulates utility-usage, the pointer 14 of each of the dials 12 rotates. Furthermore, in these "geared-type" meters, the last rotating pointer 14 from the last dial 12 is geared to 'drive' the rotation of the previous pointer 14 from the previous dial 12, and so on, as explained above.

Specifically, as the pointer 14 over the "last" dial 12 makes one complete rotation, the pointer 14 over the "next-to-the last" dial 12 rotates or moves to the next 'tick-mark' on the dial 12. Similarly, as the pointer 14 over the "next-to-last" dial 12 makes one complete rotation, the pointer 14 on the adjacent (middle) dial 12 rotates to the next tick-mark, and as the pointer 14 over the middle dial makes one complete rotation, the pointer 14 on the second dial 12 rotates to the next tick-mark, and finally, as the pointer 14 over the first dial 12 makes one complete rotation, the pointer 14 on the first dial 12 rotates to the next tick-mark. This was described above with reference to FIG. 3.

It is herein again noted, as was noted early in this specification, that an EOMR 2000 made and/or used in accordance with the present disclosure does not require or need five dials 12. Rather, the EOMR 2000 operates perceptively with only a single dial 12 with a single pointer 14 rotating around the single dial 12. The selection of five dials 12 is made solely for purposes of illustrating the principles of the present disclosure, and to facilitate an overall understanding of the concepts of the present disclosure. Similarly, meters with more than five dials 12 may be fitted with an EOMR 2000 according to the present disclosure.

The known relationship between the pointers 14 in dial-type utility meters plays a critical role in the operation of EOMR's 2000 made and/or used in accordance with the present disclosure. The present disclosure thus provides the ability to automatically collect, from a remote-location, accumulated utility-usage as displayed on dials 12 of utility meters of the 'rotary-dial-type', wherein it is only necessary to monitor and accumulate the rotation-activity of a single pointer, for example, the last pointer 14, of a single dial 12, for example, the last dial 12 of the meter (s) being monitored.

Furthermore, in the preferred implementation, the infrared reading device utilized in an EOMR 2000 made and/or used in accordance with the present disclosure is mounted on the outside surface of the meter glass/plastic dial-cover 21. As such, use of the EOMR 2000 does not require any modification of the meter being monitored. Thus, the present disclosure greatly simplifies the complexity of the meter reading device, greatly reduces the installation difficulty and related expense and further reducing the acquisition and maintenance costs, while at the same time increasing the overall reading device reliability.

Two installation levels are provided by the present disclosure. The "basic installation" level, illustrated in the functional block diagram of FIG. 1 can monitor utility-usage from up to eight utility meters, e.g., electricity, gas, and/or water meters, concurrently. For this "basic installation," the present disclosure requires the installation of up to eight simple inexpensive EORIS's 15 devices, one at each of the meters being monitored, and a four-wire bundle from each of the EORIS's 15 that is routed to the control box 90 where the remaining electronic units shown in FIG. 1 are located. This configuration is shown in FIG. 11a.

The "large installation" level of the EOMR 2000, illustrated in the functional block diagram of FIG. 2, can monitor utility-usage from up to sixty-four utility meters, e.g., electricity, gas, and/or water meters, concurrently. For this "large installation," the present disclosure requires the installation of up to sixty-four simple, inexpensive EORIS's 15 devices, one at each of the meters being monitored, and a four-wire bundle from each of the EORIS's 15 that is routed to the large control box 91 where the remaining electronic devices shown in FIG. 2 are located. This configuration is shown in FIG. 11b.

From a technical overview perspective, the present disclosure utilizes electronic parts that include infrared electro-optical parts, conventional digital parts and a microprocessor. The meter reading process uses a very narrow, rapidly repeated, infrared electro-optical beam to continuously monitor, measure and accumulate the number of rotations made by the pointer 14 around the last dial 12 of a rotary-dial utility meter, e.g., an electricity, gas, and/or water meter. By using this rapid sequence time shared approach, which occurs in the milliseconds range, the same processing hardware can monitor up to eight meters in the "basic installation" and monitor up to sixty-four meters in the "large installation." The processing time needed to accommodate the monitoring of sixty-four are presented in timing detail illustrated and described with reference to FIG. 13, and in the description of the supporting subroutines illustrated and described with reference to FIGS. 17-23.

Additionally, using a conventional telephone line, the EOMR 2000 can receive a unique and verifiable pre-arranged access code from the utility company billing-office requesting an update of accumulated electric, gas or water utility-usage. Thereafter, the EOMR 2000 can respond to the utility billing-office, on the same standard telephone line, if desired, with the requested updated utility usage information. The initiation and response to this utility-usage update request from the utility office billing-office is shown in the flowcharts presented in FIGS. 22 and 23. It should be understood that the use of a standard telephone line for receipt and/or transmission of the various data communications described herein allows for additionally simplified retrofitting of the EOMR's 2000 disclosed herein, as additional data lines and/or other communications hardware and/or media are not needed.

It is again noted that many elements described herein are commercially available infrared electro-optical parts. For example, the EORIS's 15, located in the infrared section 1, and a small number of commercially available digital parts including: (a) the BCD to decimal decoder 2; (b) the A/D converter 3; the peripheral interface adapter (PIA) 5 and (c) the 8-bit microprocessor 6 are commercially available parts, as described above. In addition, a number of commercially available digital parts used as support elements to provide bidirectional interface, control, and memory between the main elements and the outside world are commercially available. These parts include: (a) a battery supported power supply 4 unit that provides DC power to all the units in the proposed disclosure; (b) the static RAM 7; (c) the controller 8; (d) the modem interface 9; and (e) the setup/initialization controller 10. As explained above, the separate stand-alone setup/initialization controller 10 may be used only during an initial set up and/or during troubleshooting.

The interconnections between the main elements and support elements units are implemented in a fully standard manner. These facts attest to the novelty and uniqueness of the present disclosure. No special parts, no special interconnections, and no special requirements are needed. Yet overall, the proposed disclosure offers a unique set of features and benefits not offered by other known meter readers offered to date.

The EORIS 15 contains two key elements, as described with reference to FIG. 5. The first element, the infrared illuminator, implemented in some embodiments as the IED 16, generates an illuminating IR beam 18 focused toward the illuminated area 20 located on the face-plate 13 under the last dial 12. The second element, the infrared detector, is implemented in some embodiments as the infrared phototransistor 17, which is positioned to pick up the reflected IR beam 19. This IR energy has been reflected from either the illuminated area 20 (most of the time), or from the pointer 14, when the pointer 14 rotates around the dial 12 and over the illuminated area 20. At such times, the illuminating IR beam 18 is bounced/reflected back to the infrared phototransistor 17 as the reflected IR beam 19.

These two cases are the key to the operation of the EOMR's 2000 disclosed and described herein. The intensity of an IR beam that has been reflected from the surface of the white/silvery face-plate 13 will generally be stronger than the intensity of an IR beam that has been reflected from a black/absorptive surface such as the pointer 14. Furthermore, the infrared phototransistor 17 outputs an analog voltage that is directly proportionate to the intensity to the reflected IR beam 19 that it has detected.

To provide a more complete explanation, and to enhance the clarity of the key and unique features of the present disclosure, a more detailed description of all the key process-steps is presented. The process begins when these IED's 16 are activated, i.e., turned-on, by having the cathode-terminals of the IED's 16 taken, sequentially and for a very short time, e.g., 4 milliseconds, to ground by the BCD to decimal decoder 2 under the control of the one to eight decoder control lines, as received, via the PIA 5, from the 8-bit microprocessor 6.

This short time activation of the IED's 16 turns on an IR Beam 192 thereby generating the illuminating IR beam 18 for a very short burst of IR energy. This burst of IR energy is focused on the illuminated area 20 on the face-plate 13 of the last dial 12, and thereby also is aimed to reflect back from this face-plate 13 toward the detection section of the infrared phototransistors 17 whose analog output voltage is directly proportionally to the intensity of the intensity of the reflected IR beam 19 that it has detected.

For a better understanding of the unique features of the present disclosure, three cases are of particular importance. In the first case of interest, the IR Beam 192 and the subsequently generated illuminating IR beam 18 strike the reflective white/silver face-plate 13 thereby generating a strong reflected IR beam 19, which will impinge on the detector portion of the infrared phototransistors 17.

The second case of interest occurs after some additional utility-usage has been recorded by the meter and as a result, the pointer 14 has rotated such that at least a portion of the pointer 14 is now within the illuminated area 20. At this point, the IR beam 192 and the subsequently generated illuminating IR beam 18 strike the absorptive black surface of the pointer 14, thereby generating a weak reflected IR beam 19 that is reflected back to the detector portion of the infrared phototransistors 17.

The third case of interest occurs after some further additional utility-usage has been recorded by the meter and as a result the pointer 14 has rotated such that the pointer 14 is no longer blocking the illuminated area 20. Rather, the pointer 14 is again over the white/silver face-plate 13. At this point, the IR beam 192 and the subsequently generated illuminating IR beam 18 again strike the reflective white/silver face-plate 13, thereby again generating a strong reflected IR beam 19 that will impinge on the detector portion of the infrared phototransistors 17. When a strong reflected IR beam 19 impinges on the detector portion of the infrared phototransistors 17, a high analog voltage is produced at the emitters 195 of the phototransistors 17. Conversely, when a weak reflected IR beam 19 impinges on the detector portion of the infrared phototransistors 17 a low analog voltage is produced at the emitters 195 of the phototransistors 17.

The aforementioned pulsating string of outputted analog voltages are sequentially loaded into the A/D converter 3, under control of the same one of eight decoder control lines that had controlled the sequence used for IED 16 activation and were provided via the PIA 5 as originally computed by the 8-bit microprocessor 6. These analog voltages are then converted to their 8-bit digital equivalents, processed with noise-reduction and signal-averaging algorithms and stored in selected memory locations specifically associated with the meters from which they were derived. FIGS. 25 and 28 provide schematic illustrates of the interconnection/interface between the EORIS's 15 and the BCD to decimal decoder 2.

This pulsating set of digital voltages associates with the rotational state and position of the pointer 14 from the last dial 12 as driven by the utility-usage of the given meters being monitored are examined in the 8-bit microprocessor 6 looking for an occurrence of a HIGH-LOW-HIGH sequence. Specifically, by analyzing the digitized voltages as they cycle from "high-voltage" representing a strong reflected IR beam 19 coming from a reflections from the white/silver surface of the meter-face 13 to the "low-voltage" representing a weak reflected IR beam 19 coming from a reflections from the black absorptive surface of the pointer 14, an accumulation or count of these rotations is developed.

A single sequence of a transition from a HIGH voltage to a LOW voltage and then back again to a HIGH voltage is a direct indication that the pointer 14 for this last dial 12 has in fact made one rotation. Thus, by continuously accumulating the voltage transitions, i.e., from HIGH to LOW and back to HIGH, a measure of total utility usage is developed. Furthermore, there is a direct relationship between the number of these rotations that the pointer 14 has made and the amount of utility-usage that has been recorded by this meter. Furthermore, when this utility-usage is added to the initial utility-usage shown on this meter at installation, or to utility-usage recorded and stored at the last update, current total utility-usage can be determined. These three cases are illustrated and described in more detail above with reference to FIGS. 8-10, and the related processing is illustrated and described above with reference to FIGS. 17-23.

In summarizing the applicability and the key features and benefits of the present disclosure, it is noted that millions upon millions of rotary "geared-type" utility meters, e.g., electricity, gas, and/or water meters, are in use throughout the world to measure and accumulate utility-usage. To gather information for billing purposes, each of the utility companies using such meters generally must send a person to manually record usage readings associated with each different utility. As such, this approach may require a different person being used to record the readings from each meter used at a location, one person to record the usage on the electricity meter, one different person to record the usage on the gas meter, and another different person to record the usage on the water meter. When this is coupled with the often encountered situation wherein access to the utility meter locations is not necessarily available at the same time that the meter reader makes a visit, the cost of gathering utility-usage data becomes disproportionately high.

It is in order to address some of these limitations that numerous disclosures have been made that permit the remote, automatic reading of rotary-type utility meters. However, these disclosures typically use complex and expensive mechanical schemes, or complex and expensive electro-mechanical schemes, or complex and expensive magnetic schemes, or complex and expensive electro-optical schemes, or complex and expensive electronic schemes or various combinations of these complex and expensive schemes. This unnecessarily complexity is often driven by the fact that these approaches are designed to "read" ALL the dials of the meter in question in order to record total accumulated utility-usage. Furthermore, most of the proposed schemes require opening and modifying the meters in questions.

The present disclosure avoids many problems associated with the art of meter reading. The present disclosure provides a simple, easy to install, and inexpensive device to be installed on the exterior of meter glass/plastic dial-cover 21 at each meter to be monitored thus not requiring any internal modification or opening of the existing meter.

Additionally, the present disclosure utilizes a design based on a high-speed, infrared pulsed and time shared sampling approach that permits up to eight meters being concurrently monitored in the "basic installation" by using eight EORIS's 15, one at each meter. Similarly, the present disclosure provides for monitoring of up to sixty-four meters in the "large installation" by using sixty-four EORIS's 15. As such, the present disclosure dramatically reduces the complexity, installation costs, and maintenance costs, and increases the overall reliability of the EOMR 2000 device.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

I claim:

1. A electro-optical meter reading device (EOMR) for remotely reading a utility meter, the EOMR comprising:
    a control unit in communication with an optical unit, the control unit comprising:
        an interface adapter configured to communicate with the optical unit;
        a processor configured to perform the functions of the control unit; and
        a network interface configured to communicate a meter reading to a remote location;
    the optical unit comprising:
        an electro-optical reflective infrared sensor configured to:
            transmit an infrared pulse, wherein the infrared pulse is directed to a portion of a utility meter face associated with a last dial of the utility meter;
            receive a reflected portion of the infrared pulse; and
            output a voltage, wherein the voltage changes based upon the amount of the infrared pulse reflected by the meter face; and
        an interface, the interface being configured to transmit the voltage to the control unit.

2. The EOMR of claim 1, wherein the control unit is configured to simultaneously monitor up to eight optical units communicating with the control unit via an analog to digital converter.

3. The EOMR of claim 2, wherein the control unit is configured to simultaneously monitor up to sixty-four optical units communicating with the control unit via an analog to digital converter.

4. The EOMR of claim 2, wherein:
    each of the up to eight optical units communicates with the control unit via an analog to digital converter;
    the control unit employs digital multiplexing to accommodate the simultaneous monitoring of the up to eight optical units; and
    the control unit is configured to receive a signal from all of the up to eight optical units in less than a tenth of a second.

5. The EOMR of claim 3, wherein:
    each of the up to sixty-four optical units communicates with the control unit via an analog to digital converter;
    the control unit employs digital multiplexing to accommodate the simultaneous monitoring of the up to sixty-four optical units; and
    the control unit is configured to receive a signal from all of the up to sixty-four optical units in less than eight tenths of a second.

6. The EOMR of claim 4, further comprising a power supply.

7. The EOMR of claim 5, further comprising a power supply.

8. The EOMR of claim 6, wherein the power supply comprises a battery configured to be trickle-charged by an AC power source.

9. The EOMR of claim 7, wherein the power supply comprises a battery configured to be trickle-charged by an AC power source.

10. The EOMR of claim 8, wherein the EOMR and the power supply are configured such that the EOMR functions normally for over 120 hours in the event of an AC power loss to a trickle-charging circuit associated with the power supply.

11. The EOMR of claim 9, wherein the EOMR and the power supply are configured such that the EOMR functions normally for over 110 hours in the event of an AC power loss to a trickle-charging circuit associated with the power supply.

12. The EOMR of claim 8, wherein the power supply comprises up to four batteries configured to be trickle-charged by an AC power source, wherein the EOMR and the power supply are configured such that the EOMR functions normally for over 520 hours in the event of an AC power loss to a trickle-charging circuit associated with the power supply.

13. The EOMR of claim 9, wherein the power supply further comprises four batteries configured to be trickle-charged by an AC power source, wherein the EOMR and the power supply are configured such that the EOMR functions normally for over 430 hours in the event of an AC power loss to a trickle-charging circuit associated with the power supply.

14. The EOMR of claim 1, wherein the optical unit is configured to be attached at a meter face cover.

15. The EOMR of claim 13, wherein the optical unit is configured to be attached at a meter face cover.

16. A electro-optical meter reading device (EOMR) for remotely reading a utility meter, the EOMR comprising:
- a control unit in communication with sixty-four optical units simultaneously monitored by the control unit, wherein:
  - each of the sixty-four optical units communicates with the control unit via an analog to digital converter;
  - the control unit employs digital multiplexing to accommodate the simultaneous monitoring of the sixty-four optical units; and
  - the control unit is configured to sequentially receive a signal from all sixty-four of the monitored optical units in less than eight tenths of a second;
- the control unit comprising:
  - a peripheral interface adapter configured to communicate each of the sixty-four optical units via an analog to digital converter;
  - a processor configured to perform the functions of the control unit; and
  - a network interface configured to provide two-way communication with a remote location;
- each of the sixty-four optical units comprising:
  - an electro-optical reflective infrared sensor configured to:
    - transmit an infrared pulse, wherein the infrared pulse is directed to a portion of a utility meter face associated with a last dial of the utility meter;
    - receive a reflected portion of the infrared pulse; and
    - output a voltage, wherein the voltage changes based upon the amount of the infrared pulse reflected by the meter face; and
  - an interface, the interface being configured to transmit the voltage to the control unit; and
- a power supply comprising a battery configured to be trickle-charged by an AC power source, wherein:
  - the EOMR and the power supply are configured such that the EOMR functions normally for over 430 hours in the event of an AC power loss to a trickle-charging circuit associated with the power supply.

* * * * *